United States Patent
Oh et al.

(10) Patent No.: US 7,394,510 B2
(45) Date of Patent: Jul. 1, 2008

(54) ARRAY SUBSTRATE HAVING COT STRUCTURE FOR USE IN LIQUID CRYSTAL DISPLAY DEVICE AND METHOD OF FABRICATING THE SAME

(75) Inventors: Chang-Ho Oh, Dae-gu (KR); Woong Kwon Kim, Gyeonggi-do (KR); Seung Ryull Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 373 days.

(21) Appl. No.: 10/874,339

(22) Filed: Jun. 24, 2004

(65) Prior Publication Data
US 2004/0263722 A1 Dec. 30, 2004

(30) Foreign Application Priority Data
Jun. 25, 2003 (KR) ............... 10-2003-0041697

(51) Int. Cl.
G02F 1/1335 (2006.01)
(52) U.S. Cl. .............. 349/106; 349/39; 349/110
(58) Field of Classification Search ............. 349/106, 349/39, 110
See application file for complete search history.

(56) References Cited
U.S. PATENT DOCUMENTS
6,900,856 B2 * 5/2005 Kim et al. ............ 349/44

| 2004/0001170 | A1* | 1/2004 | Chang et al. | 349/106 |
| 2004/0114060 | A1* | 6/2004 | Kim et al. | 349/44 |
| 2004/0125277 | A1* | 7/2004 | Kim et al. | 349/106 |
| 2004/0183989 | A1* | 9/2004 | Kim et al. | 349/155 |

* cited by examiner

Primary Examiner—David Nelms
Assistant Examiner—Thanh-Nhan P Nguyen
(74) Attorney, Agent, or Firm—Birch, Stewart, Kolasch & Birch, LLP

(57) ABSTRACT

An array substrate device has a color filter-on-thin film transistor (COT) structure for use in a liquid crystal display device. The array substrate device includes a gate line disposed in a first direction on a substrate; a data line disposed over the substrate in a second direction, the data line perpendicularly crossing the gate line to define a pixel region; a thin film transistor near a crossing of the gate and data lines, the thin film transistor including a gate electrode, a semiconductor layer, a source electrode and a drain electrode; a capacitor electrode overlapping the gate line; a color filter having an island pattern corresponding to the pixel region, the color filter exposing portions of the drain electrode and the capacitor electrode; and a pixel electrode disposed over the cover filter, corresponding to the pixel region, and contacting the portions of the drain electrode and the capacitor electrode.

9 Claims, 58 Drawing Sheets

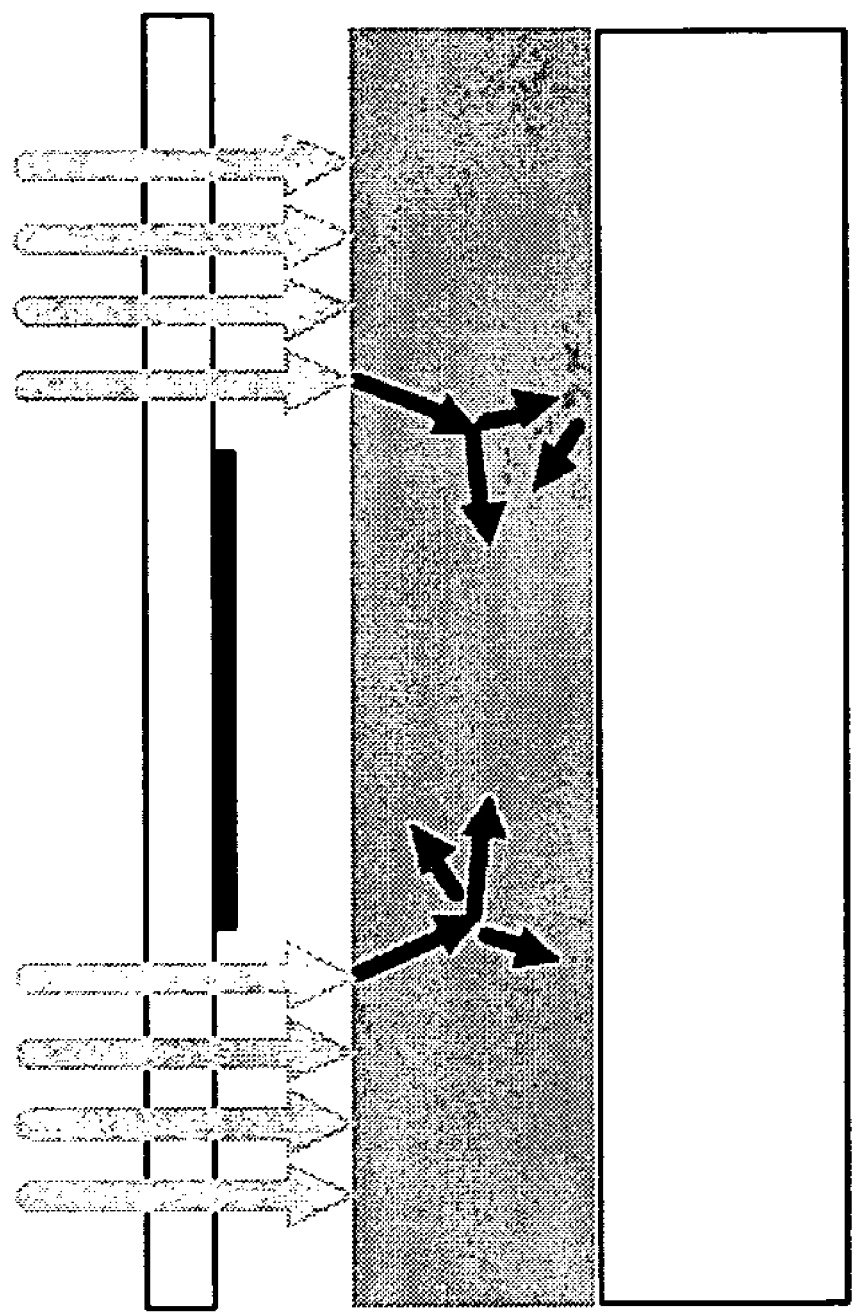

ARRAY SUBSTRATE HAVING COT STRUCTURE FOR USE IN LIQUID CRYSTAL DISPLAY DEVICE AND METHOD OF FABRICATING THE SAME

This application claims the benefit of the Korean Application No. P2003-0041697 filed on Jun. 25, 2003, which is hereby incorporated by reference.

BACKGROUND OF THE INVENTION

1. Field of the Invention

The invention pertains to a liquid crystal display device, and more particularly, to an array substrate having a color filter on a thin film transistor structure and a method for fabricating the same. Although the invention is suitable for a wide range of applications, it is particularly suitable for increasing the aperture ratio and simplifying the fabrication process.

2. Description of the Related Art

Flat panel display devices are thin, light weight, and have low power consumption, and they have been used for portable display devices. Among the various types of flat panel display devices, liquid crystal display (LCD) devices find wide use in laptop computers and desktop computer monitors because of their superiority in resolution, color image display, and display quality.

Optical anisotropy and polarization characteristics of liquid crystal molecules are utilized to generate desirable images. Liquid crystal molecules have specific alignment directions that result from their own peculiar characteristics. The specific alignment directions can be modified by electric or magnetic fields that are applied to the liquid crystal molecules. In other words, an electric fields applied upon the liquid crystal molecules can change the alignment of the liquid crystal molecules. Due to the optical anisotropy, the incident light is refracted according to the alignment of the liquid crystal molecules.

Specifically, the LCD devices include upper and lower substrates having electrodes that are spaced apart and face into each other. A liquid crystal material is interposed between the substrates. Accordingly, when a voltage is applied to the liquid crystal material through the electrodes of each substrate, the alignment direction of the liquid crystal molecules is changed in accordance with the applied voltage, thereby displaying images. By controlling the applied voltage, the LCD device varies the light transmittances to display image data.

Liquid crystal display (LCD) devices find wide applications in office automation (OA) and video equipment due to their characteristics such as light weight, slim design, and low power consumption. Among different types of LCD devices, active matrix LCDs (AM-LCDs) having thin film transistors and pixel electrodes arranged in a matrix form provide high resolution and superior moving images. A typical LCD panel has an upper substrate, a lower substrate, and a liquid crystal layer interposed between the substrates. The upper substrate (referred to as a color filter substrate) includes a common electrode and color filters. The lower substrate (referred to as an array substrate) includes thin film transistors (TFT's), such as switching elements, and pixel electrodes.

As previously described, an LCD device operates on the principle that the alignment direction of liquid crystal molecules varies with applied electric fields between the common electrode and the pixel electrode. Accordingly, the liquid crystal molecules function as an optical modulation element having variable optical characteristics that depend upon the polarity of the applied voltage.

FIG. 1 shows an expanded perspective view illustrating a related art active matrix liquid crystal display device. As shown in FIG. 1, the LCD device 11 includes an upper substrate 5 (referred to as a color filter substrate) and a lower substrate 22 (referred to as an array substrate) sandwiching a liquid crystal layer 14. On the upper substrate 5, a black matrix 6 and a color filter layer 8 form an array matrix including multiple red (R), green (G), and blue (B) color filters surrounded by the black matrix 6. Additionally, a common electrode 18 is formed on the upper substrate 5 and covers the color filter layer 8 and the black matrix 6.

On the lower substrate 22, thin film transistors T are formed in an array matrix corresponding to the color filter layer 8. Gate lines 13 and data lines 15 perpendicularly cross one another such that each TFT T has a location adjacent to each intersection of the gate lines 13 and the data lines 15. Furthermore, pixel electrodes 17 are formed on a pixel region P defined by the gate lines 13 and the data lines 15 of the lower substrate 22. A transparent conductive material having high transmissivity, such as indium tin oxide (ITO) or indium zinc oxide (IZO), forms the pixel electrode 17.

FIG. 1 also shows a storage capacitor C disposed to correspond to each pixel P and connected in parallel to each pixel electrode 17. The storage capacitor C includes a portion of the gate line 13 as a first capacitor electrode, a storage metal layer 30 as a second capacitor electrode, and an interposed insulator (shown as reference numeral 16 of FIG. 2). Since the storage metal layer 30 connects to the pixel electrode 17 through a contact hole, the storage capacitor C electrically contacts the pixel electrode 17.

The related art LCD device shown in FIG. 1 operates by applying a scanning signal to the gate electrode of the thin film transistor T through the gate line 13, and a data signal is applied to the source electrode of the thin film transistor T through the data line 15. As a result, the liquid crystal molecules of the liquid crystal material layer 14 align and arrange by the operation of the thin film transistor T, and this alignment controls the incident light passing through the liquid crystal layer 14 to display an image. Namely, the electric fields induced between the pixel and common electrodes 17 and 18 re-arrange the liquid crystal molecules of the liquid crystal material layer 14 so that the incident light can accordingly be converted into the desired images.

When fabricating the LCD device 11 of FIG. 1, the upper substrate 5 is aligned with and attached to the lower substrate 22. In this process, the upper substrate 5 may misalign with respect to the lower substrate 22, and light leakage may occur in the completed LCD device 11 due to a marginal error in attaching the upper and lower substrates 5 and 22.

FIG. 2 is a schematic cross-sectional view taken along line II-II of FIG. 1, illustrating a pixel of the related art liquid crystal display device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed between the substrates. The upper and lower substrates 5 and 22 are often referred to as a color filter substrate and an array substrate, respectively, because the color filter layer 8 is formed upon the upper substrate, and array elements, such as TFT and pixel electrodes, are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 38. Between the gate electrode 32 and the active layer 34, a gate insulation layer 16 protects the gate electrode 32 and the gate line 13. As shown in FIG. 1, the gate electrode 32 extends from the gate line 13 and the source electrode 36 extends from the data line 15. All of the gate, source, and drain electrodes 32, 36, and 38 are formed of a metallic material while the active layer 34 is formed of silicon. A passivation layer 40 protects the thin film transistor T. In the pixel region P, the pixel electrode 17 formed of a transparent conductive material is disposed on the passivation layer 40 and contacts the drain electrode 38 and the storage metal layer 30.

Meanwhile, as mentioned above, the gate electrode 13 acts as a first electrode of the storage capacitor C and the storage metal layer 30 acts as a second electrode of the storage capacitor C. The gate electrode 13 and the storage metal layer 30 thus constitute the storage capacitor C along with the interposed gate insulation layer 16.

FIG. 2 also shows the upper substrate 5 that is spaced apart from the lower substrate 22 and is also over the thin film transistor T. On the rear surface of the upper substrate 5, a black matrix 6 is disposed in a position corresponding to the thin film transistor T, the gate line 13 and the data line 15. The black matrix 6 is formed on the entire surface of the upper substrate 5 and has openings corresponding to the pixel electrode 17 of the lower substrate 22, as shown in FIG. 1. The black matrix 6 prevents a light leakage in the LCD panel except for the portion for the pixel electrode 17. The black matrix 6 protects the thin film transistor T from the light in order to prevent generation of a photo-current in the thin film transistor T. The color filter layer 8, which is formed on the rear surface of the upper substrate 5, covers the black matrix 6. Each of the color filters 8 has one of the red 8a, green 8b, and blue 8b colors and corresponds to one pixel region P where the pixel electrode 17 is located. A common electrode 18 formed of a transparent conductive material is disposed on the color filter layer 8 over the upper substrate 5.

In the related art LCD panel discussed above, the pixel electrode 17 has a one-to-one correspondence with one of the color filters. Furthermore, in order to prevent cross-talk between the pixel electrode 17 and the gate and data lines 13 and 15, the pixel electrode 17 is spaced apart from the data line 15 by a distance A and from the gate line 13 by a distance B, as shown in FIG. 2. The open spaces A and B between the pixel electrode 17 and the data and gate line 15 and 13 cause malfunctions such as light leakage in the LCD device. Namely, the light leakage mainly occurs in the open spaces A and B so that the black matrix 6 formed on the upper substrate 5 should cover the open spaces A and B. However, when the upper substrate 5 is arranged with the lower substrate 22 or vice versa, a misalignment may occur between the upper substrate 5 and the lower substrate 22. Therefore, the black matrix 6 is extended to completely cover the open spaces A and B. That is, the black matrix 6 is designed to provide an aligning margin to prevent a light leakage. However, when extending the black matrix, the aperture ratio of a liquid crystal panel reduces as much as the aligning margin of the black matrix 6. Moreover, if there are errors in the aligning margin of the black matrix 6, light leakage still occurs in the open spaces A and B, and deteriorates the image quality of an LCD device.

SUMMARY OF THE INVENTION

Accordingly, the invention pertains to an array substrate having a color filter on a thin film transistor (COT) structure for a liquid crystal display device that substantially obviates one or more of problems due to limitations and disadvantages of the related art.

An object of the present invention is to provide an array substrate having a color filter on a thin film transistor (COT) structure for a liquid crystal display device, which provides a high aperture ratio.

Another object of the invention is to provide a method for fabricating an array substrate having a COT structure for a liquid crystal display device, that simplifies the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

The invention, in part, pertains to an array substrate having a color filter-on-thin film transistor (COT) structure, for use in a liquid crystal display device that includes a gate line disposed in a first direction on a substrate; a data line disposed over the substrate in a second direction, the data line perpendicularly crossing the gate line to define a pixel region; a thin film transistor near a crossing of the gate and data lines, the thin film transistor including a gate electrode, a semiconductor layer, a source electrode and a drain electrode; a capacitor electrode overlapping the gate line; a color filter having an island pattern corresponding to the pixel region, the color filter exposing portions of the drain electrode and the capacitor electrode; and a pixel electrode disposed over the cover filter, corresponding to the pixel region and contacting the portions of the drain electrode and the capacitor electrode.

The array substrate can also include a second insulating layer underneath the color filter, the second insulating layer covering the source and drain electrodes and the capacitor electrode, and the second insulating layer has a drain contact hole exposing the portion of the drain electrode and a capacitor contact hole exposing the portion of the capacitor electrode; a second insulating layer underneath the color filter, the second insulating layer covering the source and drain electrodes and the capacitor electrode, and the second insulating layer has a first drain contact hole exposing the portion of the drain electrode and a first capacitor contact hole exposing the portion of the capacitor electrode; a black matrix over the second insulating layer, the black matrix corresponding in position to the thin film transistor and the gate and data line except a portion of the gate line overlapped by the capacitor electrode; a third insulating layer covering the black matrix and the color filter; wherein the third insulating layer has a second drain contact hole corresponding to the first drain contact hole and a second capacitor contact hole corresponding to the first capacitor contact hole; and the pixel electrode is on the third insulating layer and in contact with the drain electrode through the first and second drain contact holes and with the capacitor electrode through the first and second capacitor contact holes.

Another aspect of the invention, in part, pertains to an array substrate device having a color filter-on-thin film transistor (COT) structure for use in a liquid crystal display device, that includes a gate line disposed in a first direction on a substrate; a data line disposing over the substrate in a second direction, the data line perpendicularly crossing the gate line to define a pixel region; a capacitor electrode overlapping the gate line; a thin film transistor near a crossing of the gate and data lines, the thin film transistor including a gate electrode, a semiconductor layer, a source electrode and a drain electrode, and the drain electrodes extends along through the pixel region and is connected to the capacitor electrode; a color filter having a rectangular island pattern corresponding to the pixel region, the color filter fully covering the thin film transistor and exposing a portion of the capacitor electrode; and a pixel electrode disposed over the cover filter, corresponding to the pixel region, and contacting the portion and the capacitor electrode. The drain electrode can have an "L" shape.

Another aspect of the invention, in part, pertains to an array substrate device having a color filter-on-thin film transistor (COT) structure for use in a liquid crystal display device that includes a gate line disposed in a first direction on a substrate; a data line disposed over the substrate in a second direction, the data line perpendicularly crossing the gate line to define a pixel region; a capacitor electrode overlapping the gate line; a thin film transistor near a crossing of the gate and data lines, the thin film transistor including a gate electrode, a semiconductor layer, a source electrode and a drain electrode, and the drain electrode extends along through the pixel region and is connected to the capacitor electrode; a color filter having a rectangular island pattern corresponding to the pixel region, the color filter having an opening exposing a portion of the thin film transistor, and the color filter exposes a portion of the capacitor electrode; a black matrix corresponding to the gate and data line except a portion of the gate line overlapped by the capacitor electrode, and the black matrix is fit into the color filter's opening to cover the exposed portion of the thin film transistor; and a pixel electrode disposing over the cover filter, corresponding to the pixel region, and contacting the portion and the capacitor electrode.

Another aspect of the invention, in part, pertains to an array substrate device having a color filter-on-thin film transistor (COT) structure for use in a liquid crystal display device, that includes a gate line disposed in a first direction on a substrate; a data line disposed over the substrate in a second direction, the data line perpendicularly crossing the gate line to define a pixel region; a capacitor electrode overlapping the gate line; a thin film transistor near a crossing of the gate and data lines, the thin film transistor including a gate electrode, a semiconductor layer, a source electrode, and a drain electrode, and the drain electrodes extends along through the pixel region and is connected to the capacitor electrode; a black matrix corresponding to the gate and data line except a portion of the gate line overlapped by the capacitor electrode and leading to the semiconductor layer of the thin film transistor; a first pixel electrode corresponding to the pixel region, the first pixel electrode contacting the capacitor electrode and overlapping edge portions of the black matrix; a color filter disposed over the first electrode and having a rectangular island-shaped pattern shape so as to correspond the pixel region, the color filter having an opening exposing a portion of the black matrix over the semiconductor layer, wherein the color filter exposes peripheral portions of the first pixel electrode; and a second pixel electrode disposed over the cover filter in the pixel region, and the second pixel electrode contacts the peripheral portions of the first pixel electrode. The drain electrode can have an "L" shape.

Another aspect of the present invention, in part, pertains to a method of forming an array substrate having a color filter-on-thin film transistor (COT) structure for use in a liquid crystal display device, that includes forming a gate line and a gate electrode over a substrate; forming a semiconductor layer over the gate electrode; forming a data line, a source electrode, a drain electrode and a capacitor electrode over the substrate, the data line perpendicularly crossing the gate line to define a pixel region, the source and drain electrode overlapping portions of the semiconductor layer, the capacitor electrode overlapping the gate line, thereby forming the thin film transistor near a crossing of the gate and data lines, and the thin film transistor includes the gate electrode, the semiconductor layer, the source electrode and the drain electrode; forming a color filter into an island pattern shape to correspond to the pixel region, the color filter exposing portions of the drain electrode and the capacitor electrode; and forming a pixel electrode over the color filter to correspond to the pixel region, and the pixel electrode contacts the portions of both the drain electrode and the capacitor electrode.

The method, in part, further includes forming a first insulating layer over the substrate to cover the gate line and the gate electrode, the first insulating layer being interposed between the gate electrode and the semiconductor layer and between the gate line and the capacitor electrode, wherein the capacitor electrode, and the gate line and the first insulating layer constitute a storage capacitor; forming a second insulating layer over the first insulating layer to cover the data line, the source and drain electrodes and the capacitor electrode; patterning the second insulating layer to form a first drain contact hole exposing the portion of the drain electrode and to form a first capacitor contact hole exposing the portion of the capacitor electrode; forming a black matrix over the second insulating layer, the black matrix corresponding in position to the thin film transistor and the gate and data line except a portion of the gate line overlapped by the capacitor electrode; forming a third insulating layer covering the black matrix and the color filter; and patterning the third insulating layer to have a second drain contact hole corresponding to the first drain contact hole and a second capacitor contact hole corresponding to the first capacitor contact hole, and the pixel electrode is on the third insulating layer and in contact with the drain electrode through the first and second drain contact holes and with the capacitor electrode through the first and second capacitor contact holes.

Another aspect of the present invention, in part, pertains to a method of forming an array substrate device having a color filter-on-thin film transistor (COT) structure for use in a liquid crystal display device, that includes forming a gate line and a gate electrode over a substrate; forming a semiconductor layer over the gate electrode; forming a data line, a source electrode, a drain electrode and a capacitor electrode over the substrate, the data line perpendicularly crossing the gate line to define a pixel region, and the source and drain electrode overlaps portions of the semiconductor layer, the capacitor electrode overlapping the gate line, thereby forming the thin film transistor near a crossing of the gate and data lines, and the thin film transistor includes the gate electrode, the semiconductor layer, the source electrode and the drain electrode, and wherein the drain electrodes extends along through the pixel region and is connected to the capacitor electrode; forming a color filter into a rectangular island shaped pattern shape to correspond to the pixel region, the color filter fully covering the thin film transistor and exposing a portion of the capacitor electrode; and forming a pixel electrode over the cover filter to correspond to the pixel region, and the pixel electrode contacts the portion and the capacitor electrode.

Another aspect of the present invention, in part, pertains to a method of forming an array substrate device having a color filter-on-thin film transistor (COT) structure for use in a liquid crystal display device that includes forming a gate line and a gate electrode over a substrate; forming a semiconductor layer over the gate electrode; forming a data line, a source electrode, a drain electrode and a capacitor electrode over the substrate, the data line perpendicularly crossing the gate line to define a pixel region, the source and drain electrode overlapping portions of the semiconductor layer, and the capacitor electrode overlapping the gate line to thereby form the thin film transistor near a crossing of the gate and data lines, and the thin film transistor includes the gate electrode, the semiconductor layer, the source electrode and the drain electrode, and wherein the drain electrodes extends along through the pixel region and connects to the capacitor electrode; forming a color filter into a rectangular island pattern shape to correspond to the pixel region, the color filter having an opening exposing a portion of the thin film transistor, and the color filter exposes a portion of the capacitor electrode; forming a black matrix to correspond to the gate and data line except a portion of the gate line overlapped by the capacitor electrode, and to fill into the opening to cover the portion of the thin film transistor; and forming a pixel electrode over the color filter to correspond to the pixel region, and pixel electrode contacting the portion and the capacitor electrode.

Another aspect of the present invention, in part, pertains to a method of forming an array substrate device having a color filter-on-thin film transistor (COT) structure for use in a liquid crystal display device, that includes forming a gate line and a gate electrode over a substrate; forming a semiconductor layer over the gate electrode; forming a data line, a source electrode, a drain electrode and a capacitor electrode over the substrate, the data line perpendicularly crossing the gate line to define a pixel region, the source and drain electrode overlapping portions of the semiconductor layer, the capacitor electrode overlapping the gate line, thereby forming the thin film transistor near a crossing of the gate and data lines, and the thin film transistor includes the gate electrode, the semiconductor layer, the source electrode and the drain electrode; forming a black matrix to correspond to the gate and data line except a portion of the gate line overlapped by the capacitor electrode and to correspond to the semiconductor layer of the thin film transistor; forming a first pixel electrode to correspond to the pixel region, the first pixel electrode contacting the capacitor electrode and overlapping edge portions of the black matrix; forming a color filter over the first electrode in a rectangular island pattern shape so as to correspond the pixel region, the color filter having an opening exposing a portion of the black matrix over the semiconductor layer, wherein the color filter exposes peripheral portions of the first pixel electrode; and forming a second pixel electrode over the cover filter in the pixel region, and the second pixel electrode contacts the peripheral portions of the first pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 6B depicts a cross sectional view showing a mask process of forming a contact hole in the color filter layer;

DETAILED DESCRIPTION

Reference will now be made in detail to the illustrated embodiments of the present invention, examples of which are illustrated in the accompanying drawings. Wherever possible, the same reference numbers will be used throughout the drawings to refer to the same or like parts.

Figure 1:
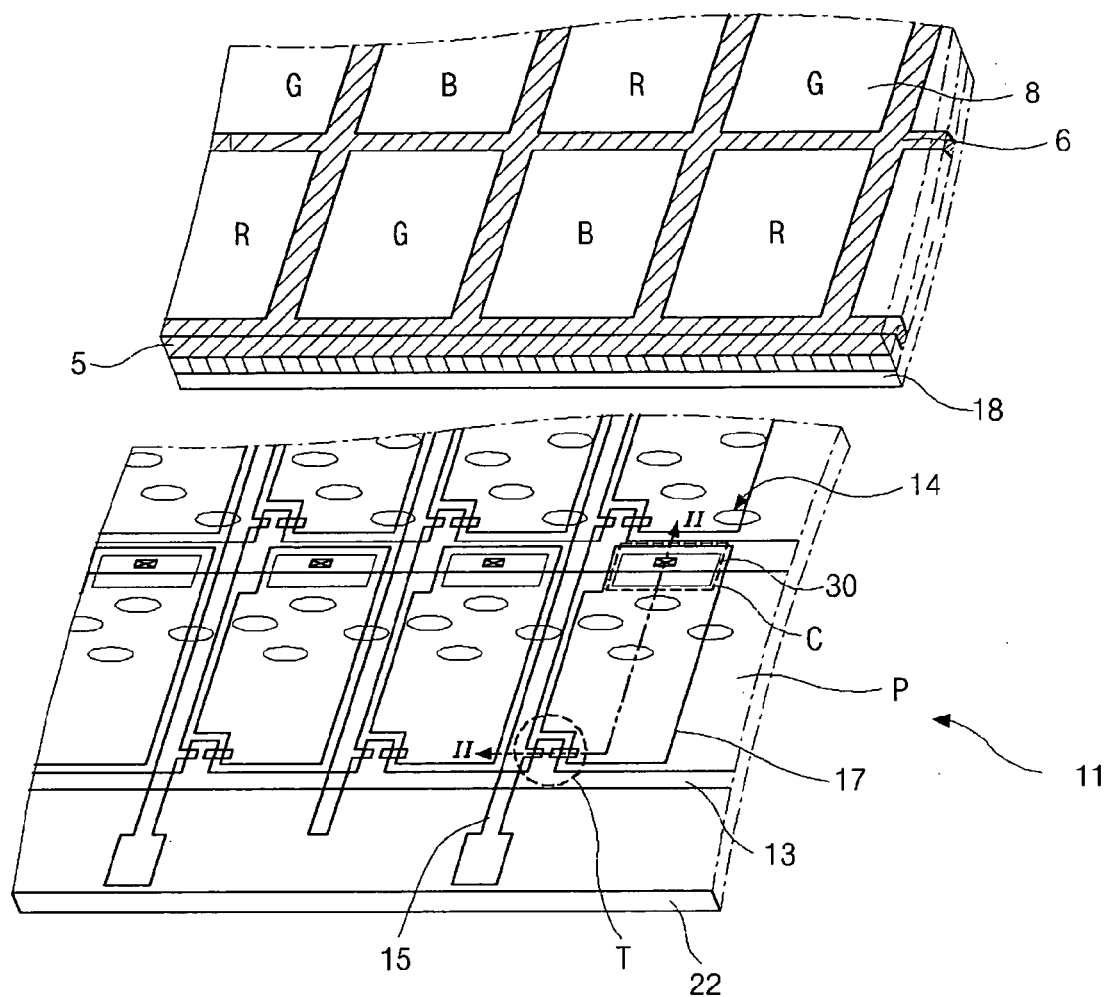
FIG. 1 shows an expanded perspective view illustrating a related art liquid crystal display device.
Figure 2:
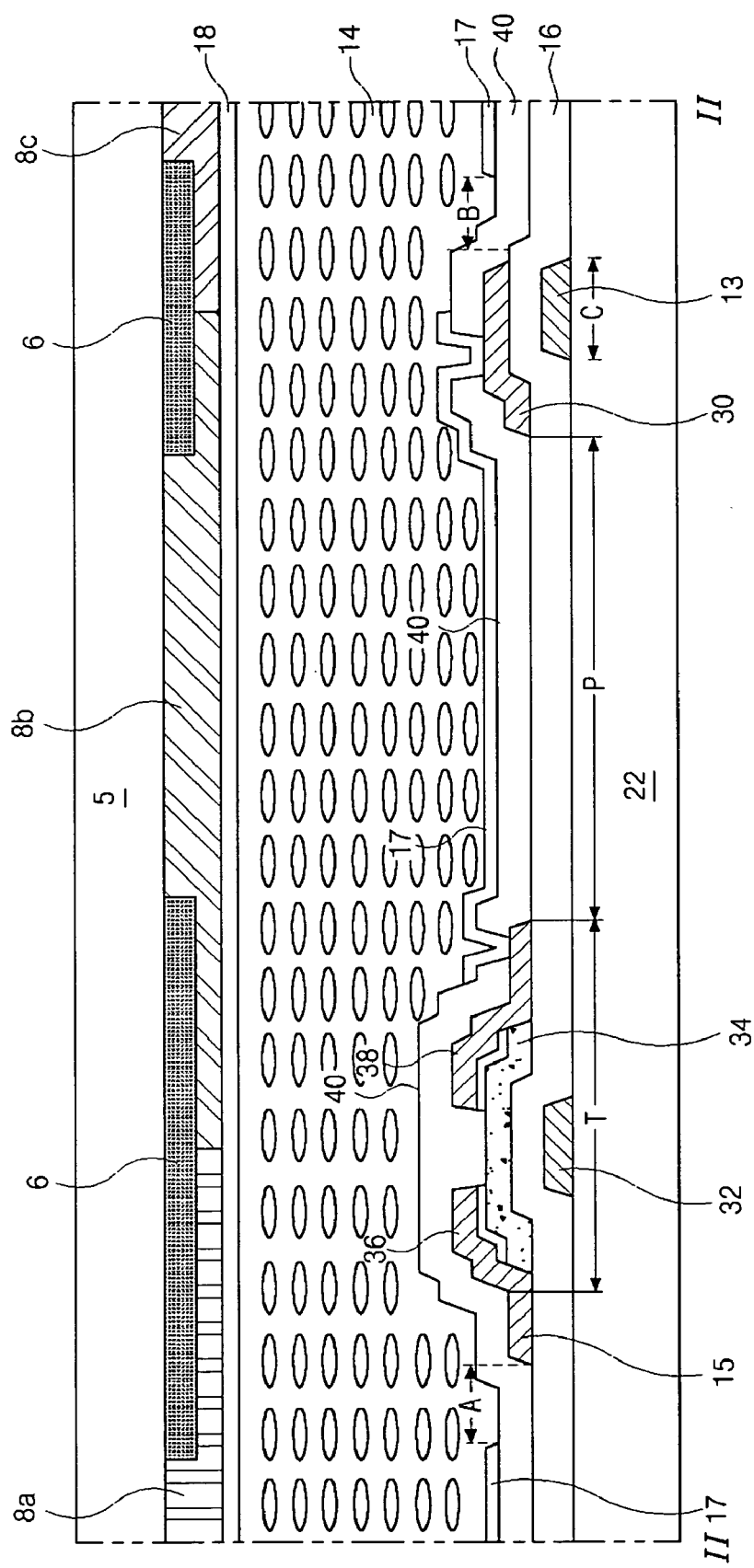
FIG. 2 shows a schematic cross-sectional view taken along line II-II of FIG. 1, illustrating a pixel of the related art liquid crystal display device.
Figure 3:
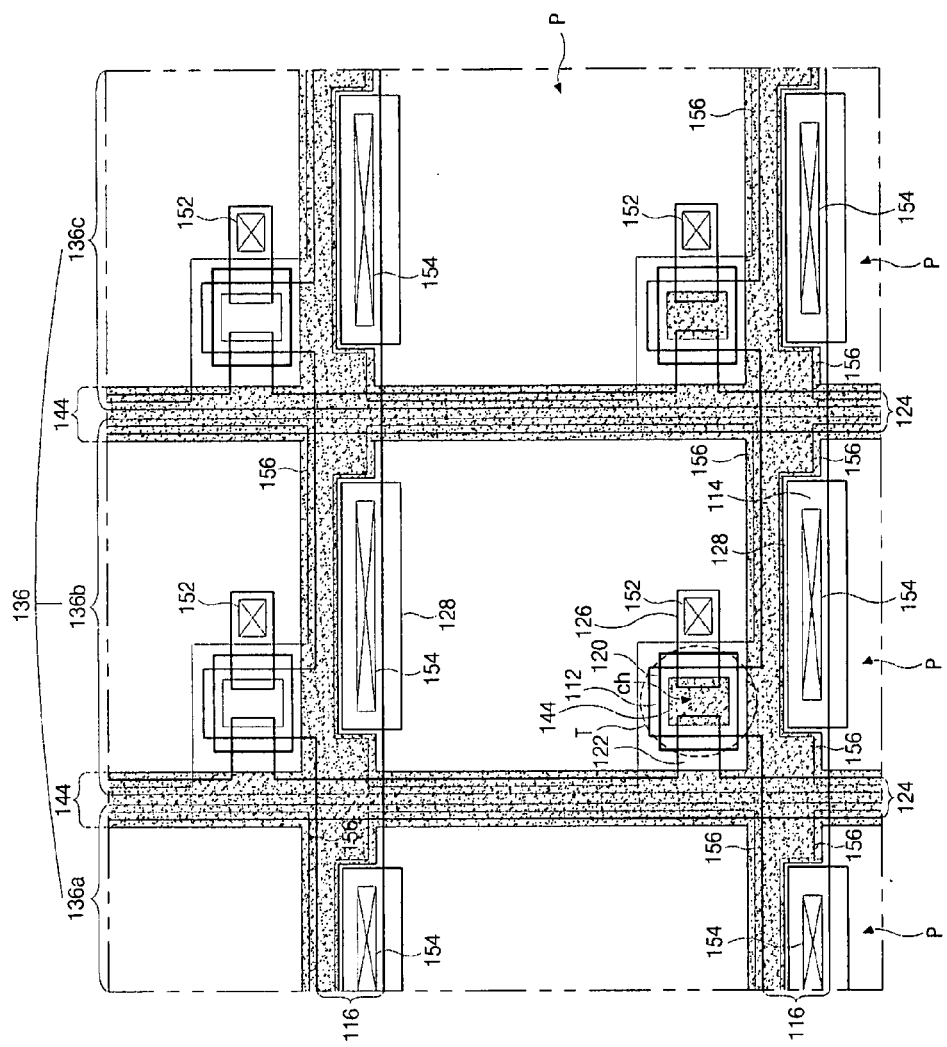
FIG. 3 shows a partial enlarged plane view of an array substrate having a color filter on a thin film transistor structure according to a first embodiment of the present invention.

FIG. 3 shows a partial enlarged plane view of an array substrate having a color filter on a thin film transistor structure according to a first embodiment of the invention.

FIG. 3 depicts an array substrate that includes multiple gate lines 116 disposed in a transverse direction and multiple data lines 124 disposed in a longitudinal direction. The gate lines 116 and the data lines 124 cross one another and define pixel regions P. A thin film transistor T is formed at each intersection of the gate line 116 and the data line 124. The thin film transistor T includes a gate electrode 112, an active layer 120, a source electrode 122, and a drain electrode 126. A channel ch, through which carriers are transferred, is formed between the source and drain electrodes 122 and 126. A capacitor electrode 128 overlaps a portion 114 of the gate line 116 and constitutes a storage capacitor along with the overlapped portion 114 and with an interposed insulator. The storage capacitor electrode 128 functions as one electrode of the storage capacitor and the overlapped portion 114 of the gate electrode line 116 functions as the other electrode of the storage capacitor.

In the pixel regions P defined by the gate and data lines 116 and 124, one finds a color filter layer 136 having a plurality of color filters 136a, 136b, and 136c. In the invention, the color filter layer 136 is a stripe type such that the pixel regions P in neighboring in up-and-down direction have the same color. Each of the color filters 136a, 136b and 136c has both drain contact holes 152 exposing the drain electrodes 126 and capacitor contact holes 154 exposing the capacitor electrode 128. Additionally, a pixel electrode 156 is disposed corresponding to each pixel region P. The pixel electrode 156 contacts the drain electrode 126 and the capacitor electrode 128, respectively, through the drain contact hole 152 and through the capacitor contact hole 154. The pixel electrode 156 overlaps portions of the neighboring data lines 124 in order to increase an aperture ratio. Also, an insulator having a low dielectric constant is interposed between the pixel electrode 156 and the data line 124.

Meanwhile, a black matrix 144 is disposed over the gate and data lines 116 and 124. The black matrix 144 also covers the thin film transistor T while also covering the channel ch such that it prevents an undesirable photo current from occurring in the active layer 120. The array substrate of FIG. 3 therefore has a color filter on a thin film transistor (COT) structure. In such a COT structure, the black matrix 144 and the color filters 136a-136c are formed over the array substrate. Namely, the color filters 136a-136c corresponds to the pixel region P, and the black matrix 144 corresponds to the thin film transistors T as well as the gate and the data lines 116 and 124 so that it prevents a light leakage in the LCD device. The black matrix 144 blocks the light incident to the thin film transistors T, and it also protects the thin film transistors T from any external impact.

FIGS. 4A-4F depict plan views illustrating the process steps of forming the array substrate of FIG. 3, and FIGS. 5A-5F show cross-sectional views taken along lines V-V of FIGS. 4A-4F, respectively, illustrating the process steps of fabricating the array substrate having a color filter on a thin film transistor (COT) structure according to the first embodiment of the invention.

Figure 4A:
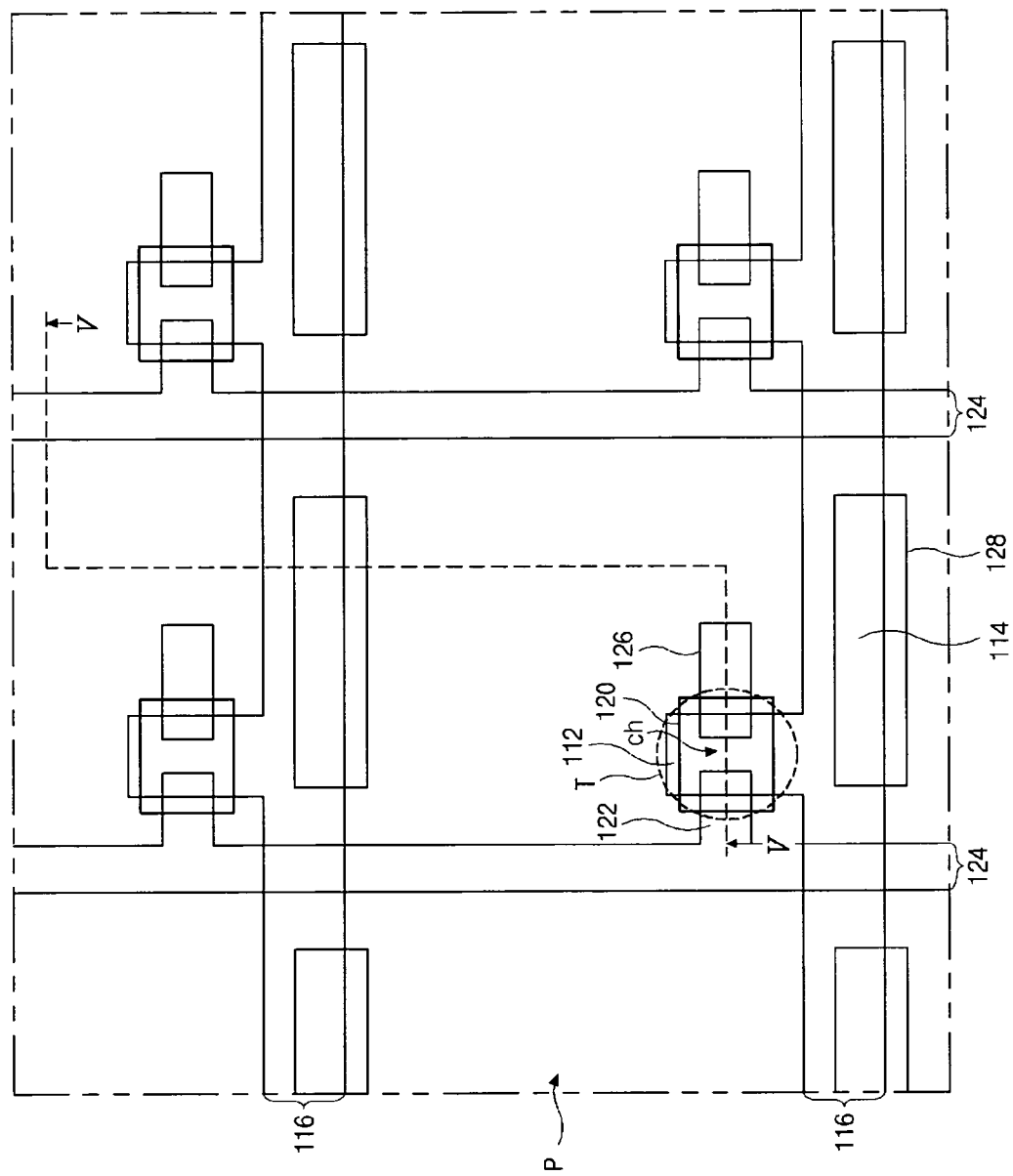
FIGS. 4A-4F show plan views illustrating the process steps of forming the array substrate of FIG. 3.
Figure 5A:
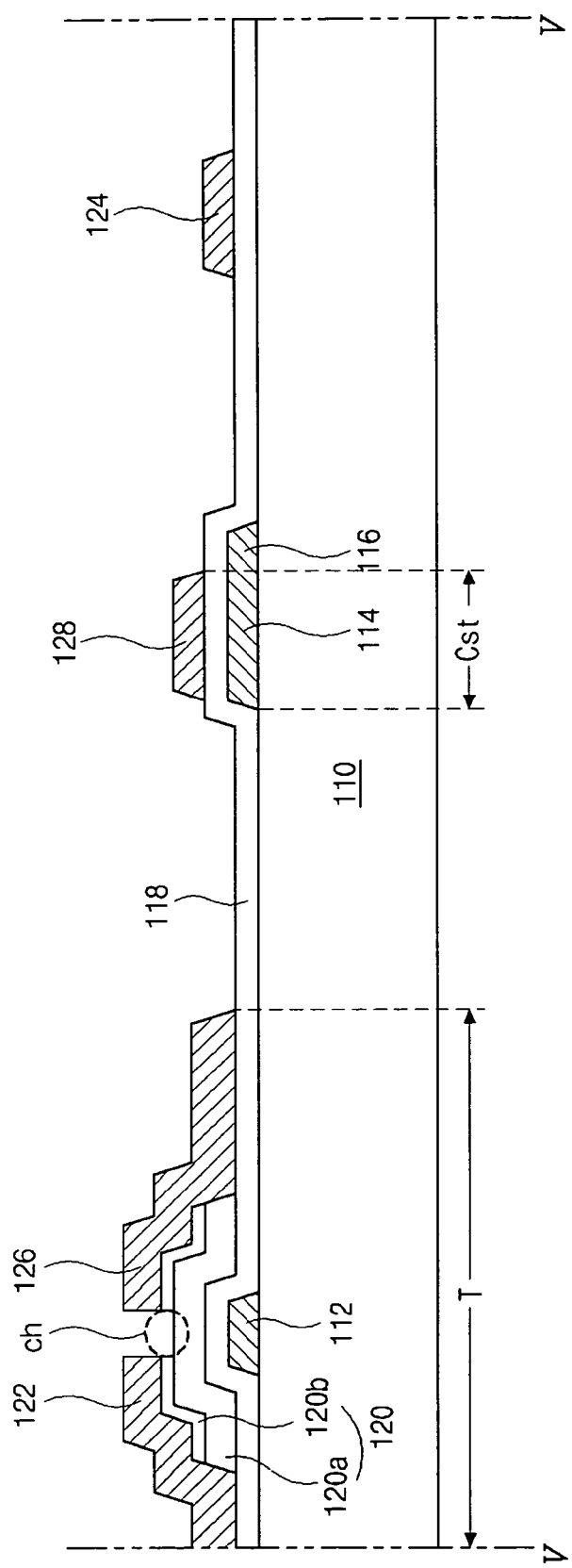
FIGS. 5A-5F show cross-sectional views taken along lines V-V of FIGS. 4A-4F, respectively, illustrating the process steps of fabricating the array substrate having a color filter on a thin film transistor (COT) structure according to the first embodiment of the invention.

In FIGS. 4A and 5A, a first metal layer is disposed over the surface of a substrate 110, and then patterned through a first mask process to form a gate line 116 and a gate electrode 112. Thereafter, a gate insulation layer 118 (a first insulating layer) is formed over the substrate 110 to cover the gate line 116 and the gate electrode 112. The gate insulation layer 118 is preferably formed of an inorganic material, such as silicon nitride ($SiN_x$) and silicon oxide ($SiO_2$). An intrinsic amorphous silicon layer (a-Si:H) and then an $n^+$-doped amorphous silicon layer ($n^+$a-Si:H) are sequentially deposited over the entire surface of the gate insulation layer 118 and then simultaneously patterned through a second mask process to form an active layer 120a and an ohmic contact layer 120b. The active layer 120a is over the gate insulation layer 118, especially over the gate electrode 112, and the ohmic contact layer 120b is then located over the active layer 120a.

After forming the active layer 120a and the ohmic contact layer 120b, a second metal layer is deposited over the substrate 110, and then patterned through a third mask process to form a source electrode 122, a drain electrode 126, a data line 124, and a capacitor electrode 128. The second metal layer may be formed of one of chromium (Cr), copper (Cu), molybdenum (Mo), and an alloy of any combination thereof. The data line 124 crosses the gate line 116 and defines a pixel region P with the gate line 116. The source electrode 122 extends from the data line 124 and contacts one portion of the ohmic contact layer 120b. The drain electrode 126 is spaced apart from the source electrode 122 across the gate electrode 112 and then contacts the other portion of the ohmic contact layer 120b. The capacitor electrode 128 overlaps a portion 114 of the gate line 116. Thereafter, a portion of the ohmic contact layer 120b between the source and drain electrodes 122 and 126 is etched by using the source and drain electrodes 122 and 126 as masks, to complete a thin film transistor T and a storage capacitor $C_{ST}$. As described with reference to FIG. 3, the thin film transistor T includes the gate electrode 112, the active layer 120a, the ohmic contact layer 120b, the source electrode 122, and the drain electrode 126. The storage capacitor $C_{ST}$ includes the portion 114 of the gate line 116, the capacitor electrode 128, and the interposed first insulator 118.

Figure 4B:
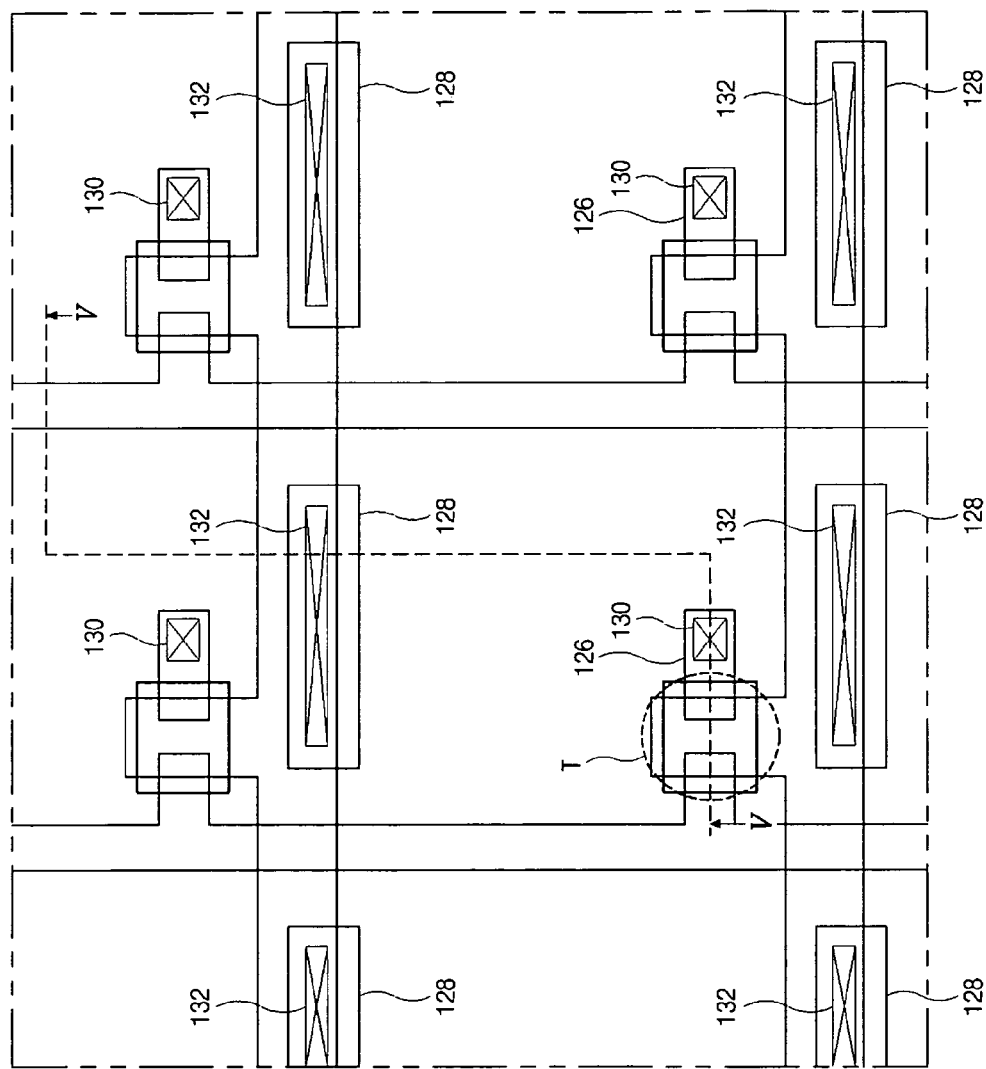
Figure 5B:
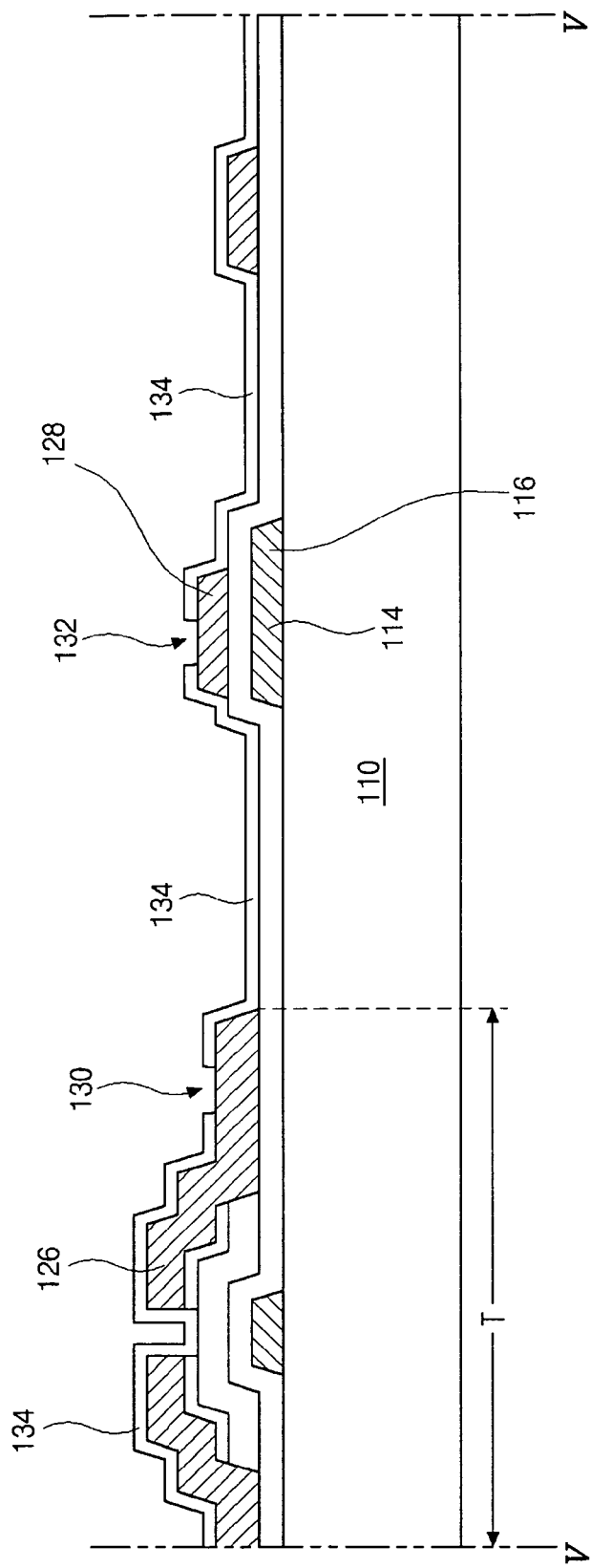

FIGS. 4B and 5B show a second insulating layer 134 being deposited over the entire surface of the substrate 110 to cover the patterned second metal layer. The second insulating layer 134 may be formed of silicon nitride ($SiN_x$) or silicon oxide ($SiO_2$). The second insulating layer 134 enhances the adhesion of an organic layer to be formed during later processing. Namely, the second insulating layer 134 improves the adhesion between the active layer 120a and the later-formed organic layer. Patterning the second insulating layer 134 forms a first drain contact hole 130 and a first capacitor contact hole 132. As shown in FIGS. 4B and 5B, the first drain contact hole 130 exposes a portion of the drain electrode 126, and the first capacitor contact hole 132 exposes a portion of the capacitor electrode 128.

Figure 4C:
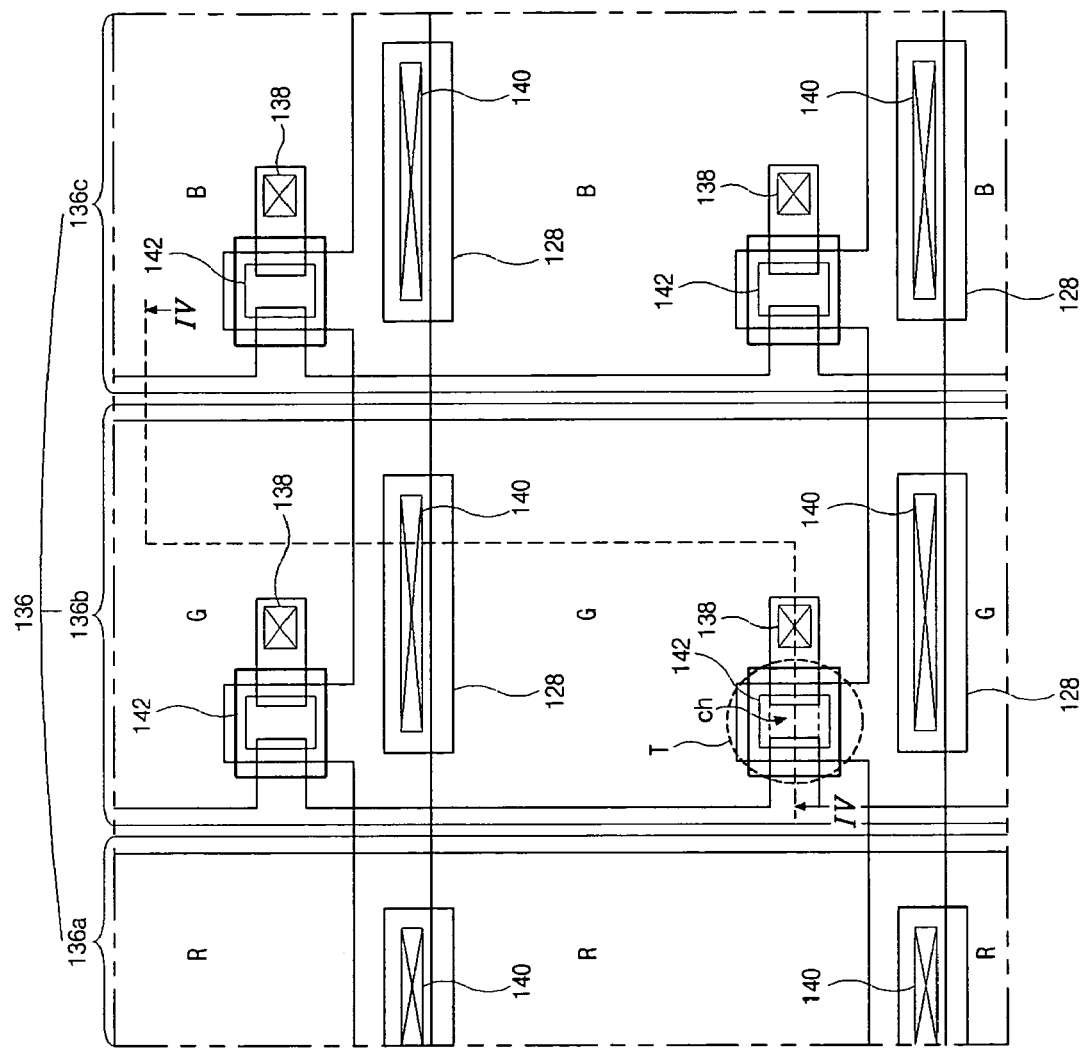
Figure 5C:
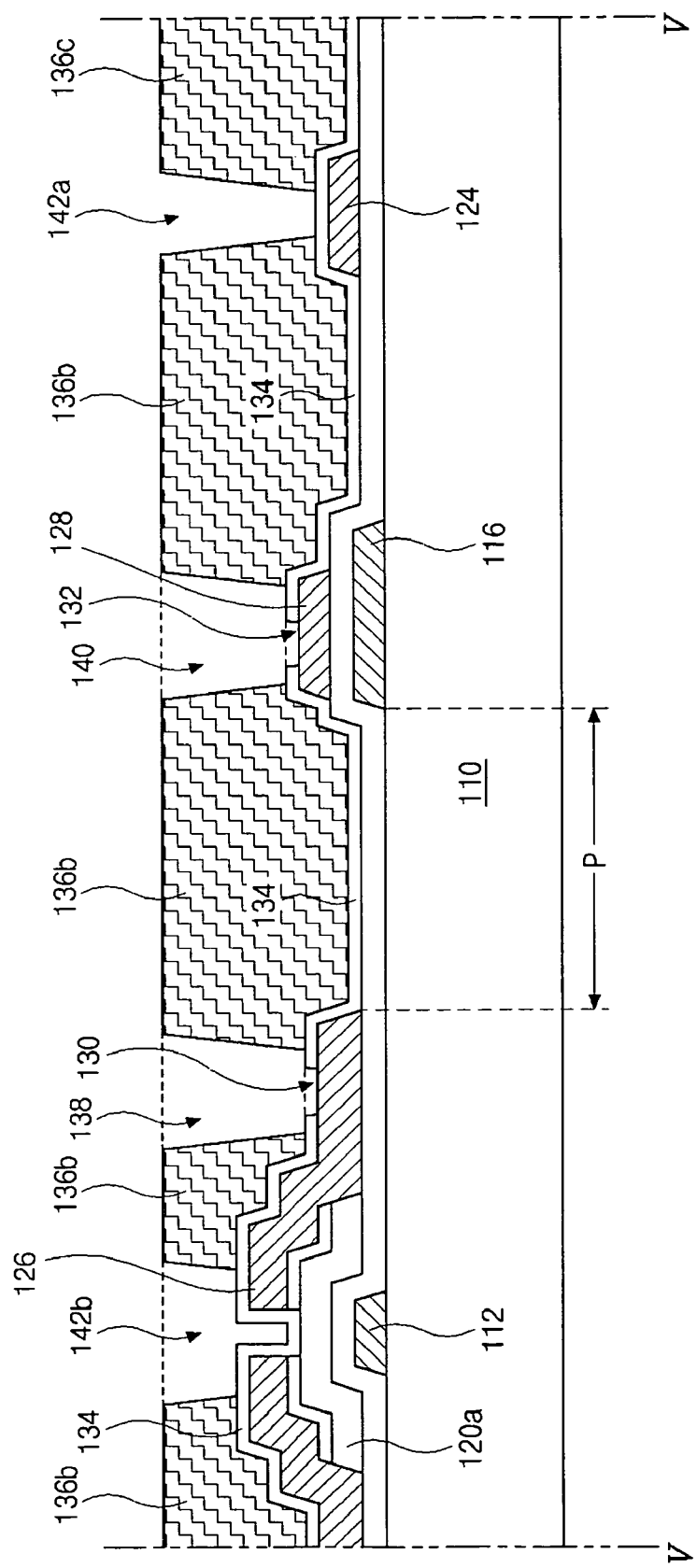

FIGS. 4C and 5C show a color resin being formed on the second insulating layer 134 and then developed to form a color filter layer 136 having red, green and blue color filters 136a, 136b and 136c. Each of the color filters 136a, 136b, and 136c for displaying the full spectrum of colors has a stripe pattern shape such that each color filter 136a, 136b or 136c is formed covering the neighboring pixel regions P in an up-and-down direction. Additionally, each of the color filters 136a-136c has a second drain contact hole 138 and a second capacitor contact hole 140 which corresponds to the first drain and capacitor contact holes 130 and 132, respectively. Thus, the second drain contact hole 138 also exposes the portion of the drain electrode 126, and the second capacitor contact hole 140 also exposes the portion of the capacitor electrode 128. When forming the color filter layer 136, each of the color filters 136a-136c has a first opening 142a corresponding to the data line 124 and a second opening 142b corresponding to the gate electrode 112. The first opening 142a is formed along the data line 124 and the second opening 142b is formed over the active layer 120a. In the invention, the second contact holes 138 and 140 and the openings 142a-

142b are formed during the developing process of forming the color filters 136a-136c, but those contact holes and openings can be formed through another patterning process. Also, although the openings and contact holes are depicted as being tapered, they also can have straight sides.

Figure 4D:
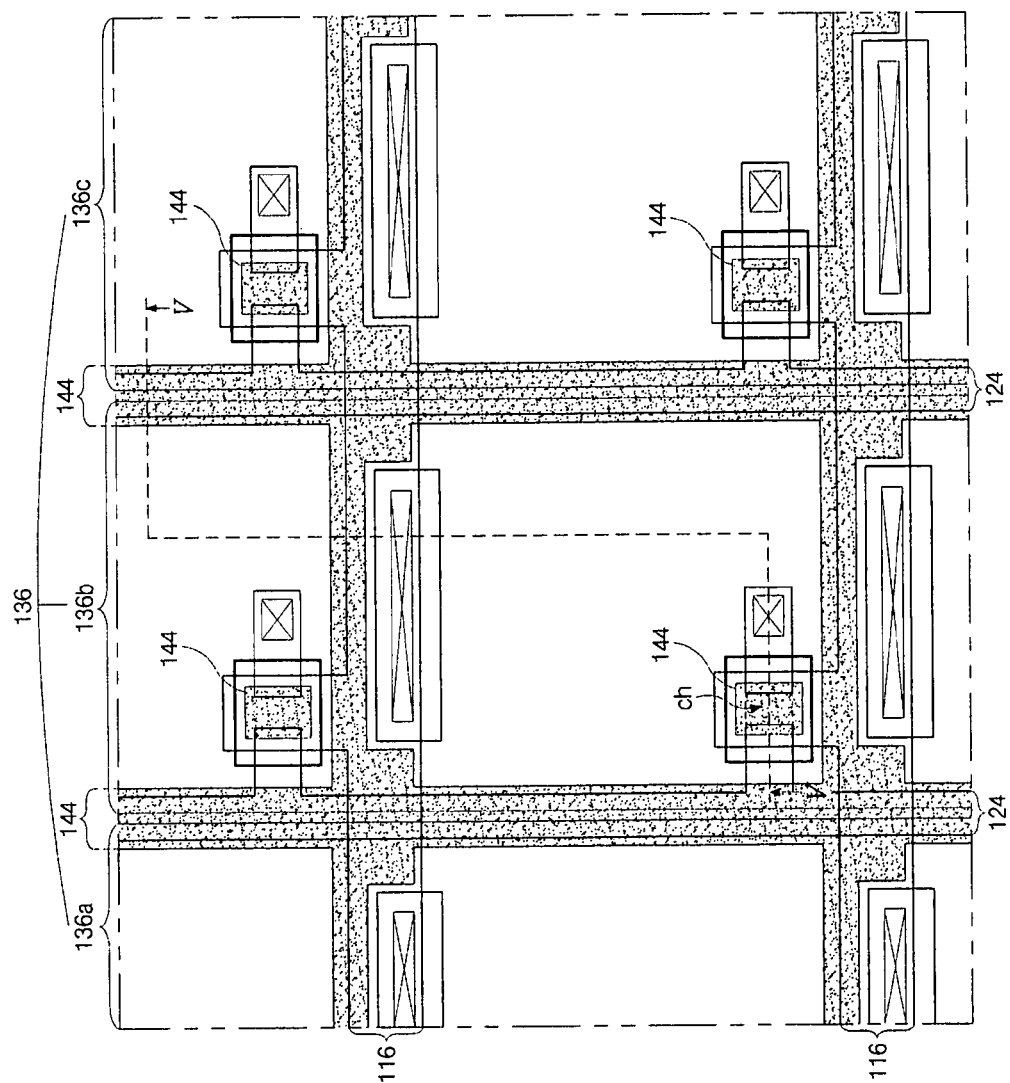
Figure 5D:
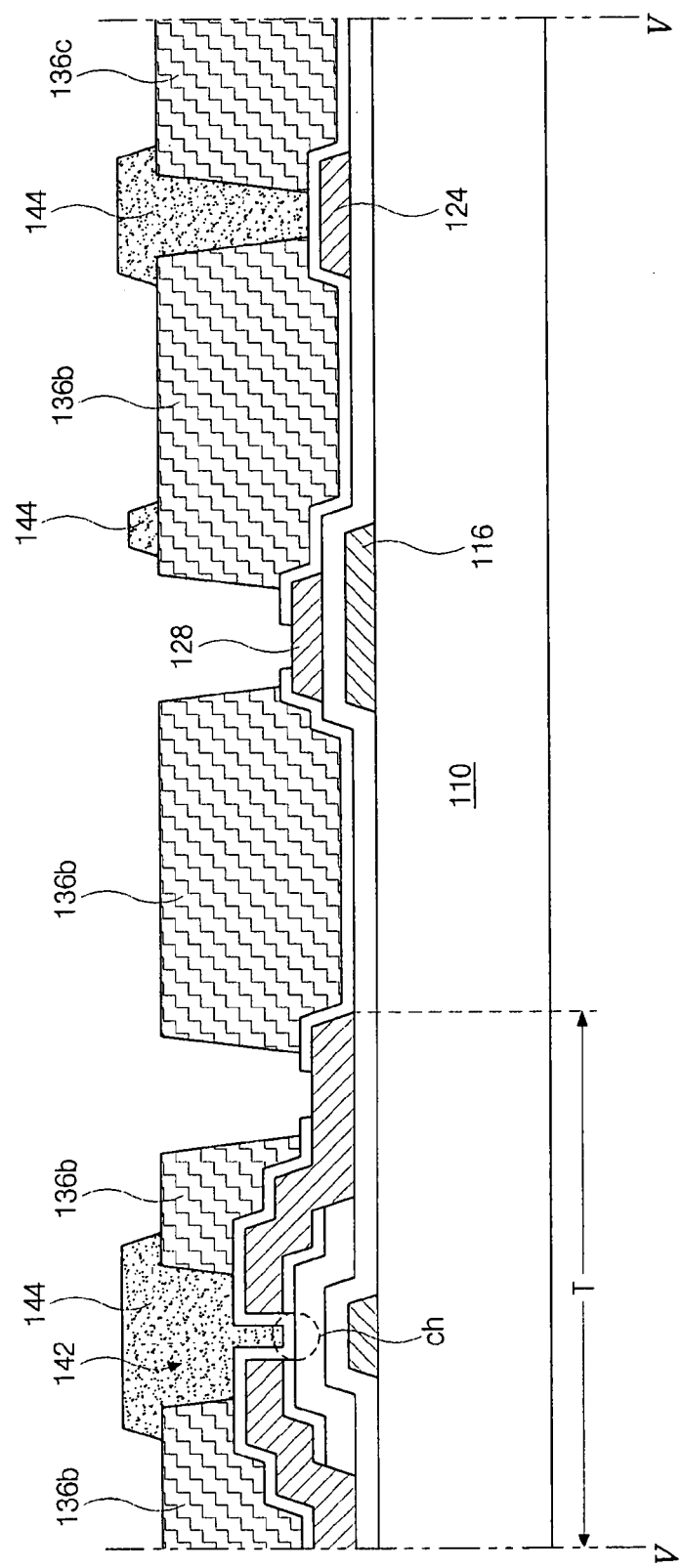

FIGS. 4D and 5D show the step of forming a black matrix 144. An opaque material is formed over the entire substrate 110 so as to cover the color filter layer 136, and then the opaque material is patterned to form the black matrix 144. As shown in FIGS. 4D and 5D, the black matrix 144 is disposed over the gate and data lines 116 and 124 and over the thin film transistor T. A portion of the black matrix 144 over the thin film transistor T protects the thin film transistor T and also blocks incident light to prevent photo current from occurring in the channel ch.

Figure 4E:
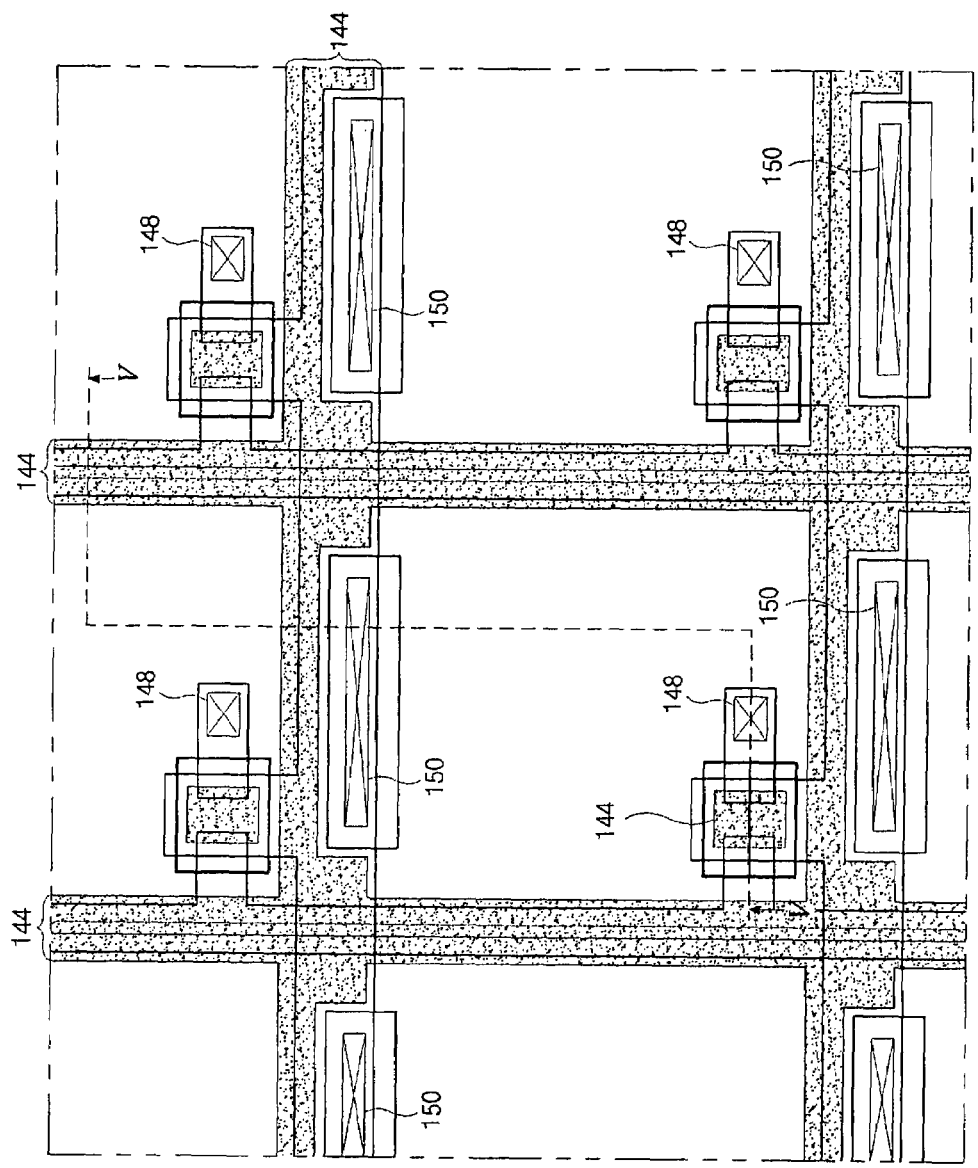
Figure 5E:
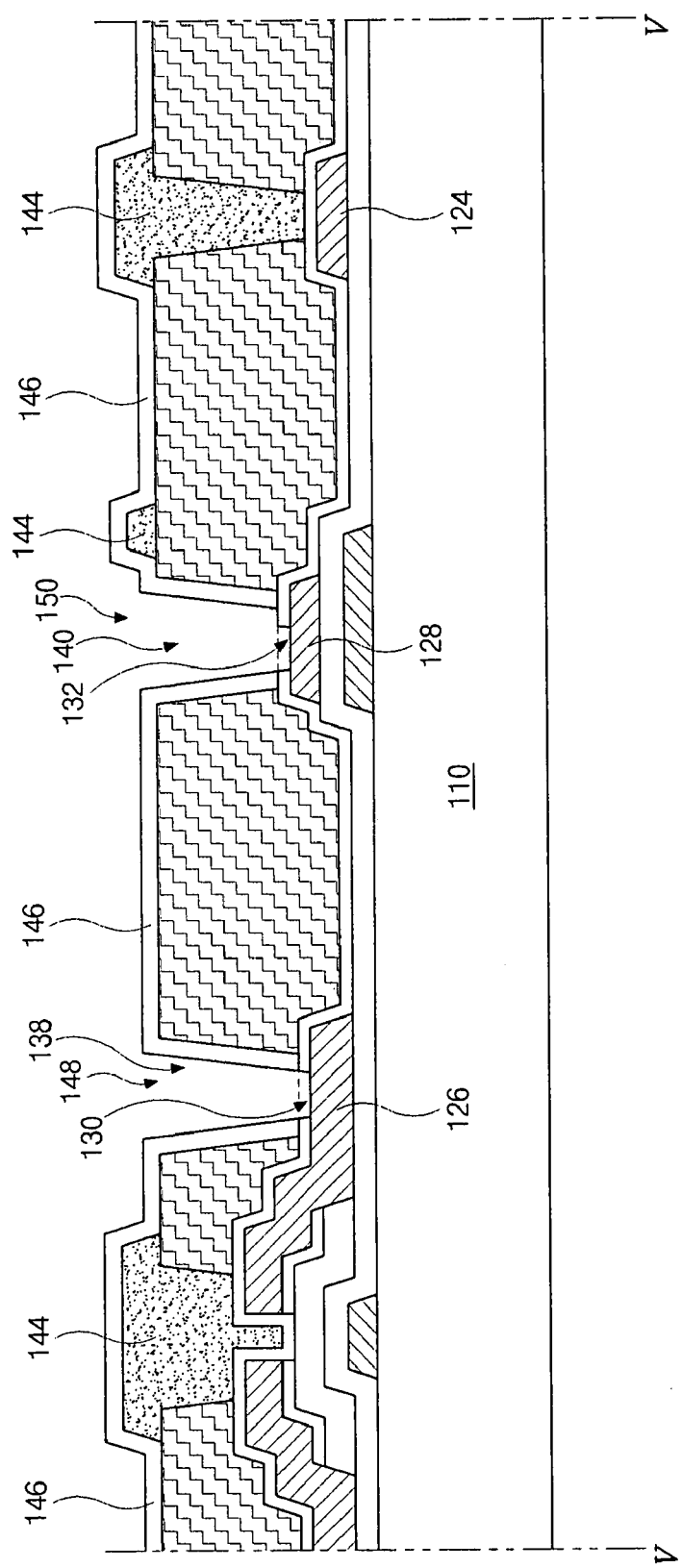

FIGS. 4E and 5E show a third insulating layer 146 having a low dielectric constant that is formed over the entire surface of the substrate 10 to cover the black matrix 144. The third insulating layer 146 may be formed of an inorganic insulating material, such as silicon nitride ($SiN_x$) or silicon oxide ($SiO_2$), or an organic material insulating material, such as benzocyclobutene (BCB), acrylic resin, methacrylic resin or a polyolefin. Thereafter, the third insulating layer 146 is patterned to form a third drain contact hole 148 and a third capacitor contact hole 150. The third drain contact hole 148 corresponds to the second drain contact hole 138 such that it exposes the portion of the drain electrode 126. The third capacitor contact hole 150 corresponds to a third capacitor contact hole 140 such that it exposes a portion of the capacitor electrode 128.

Figure 4F:
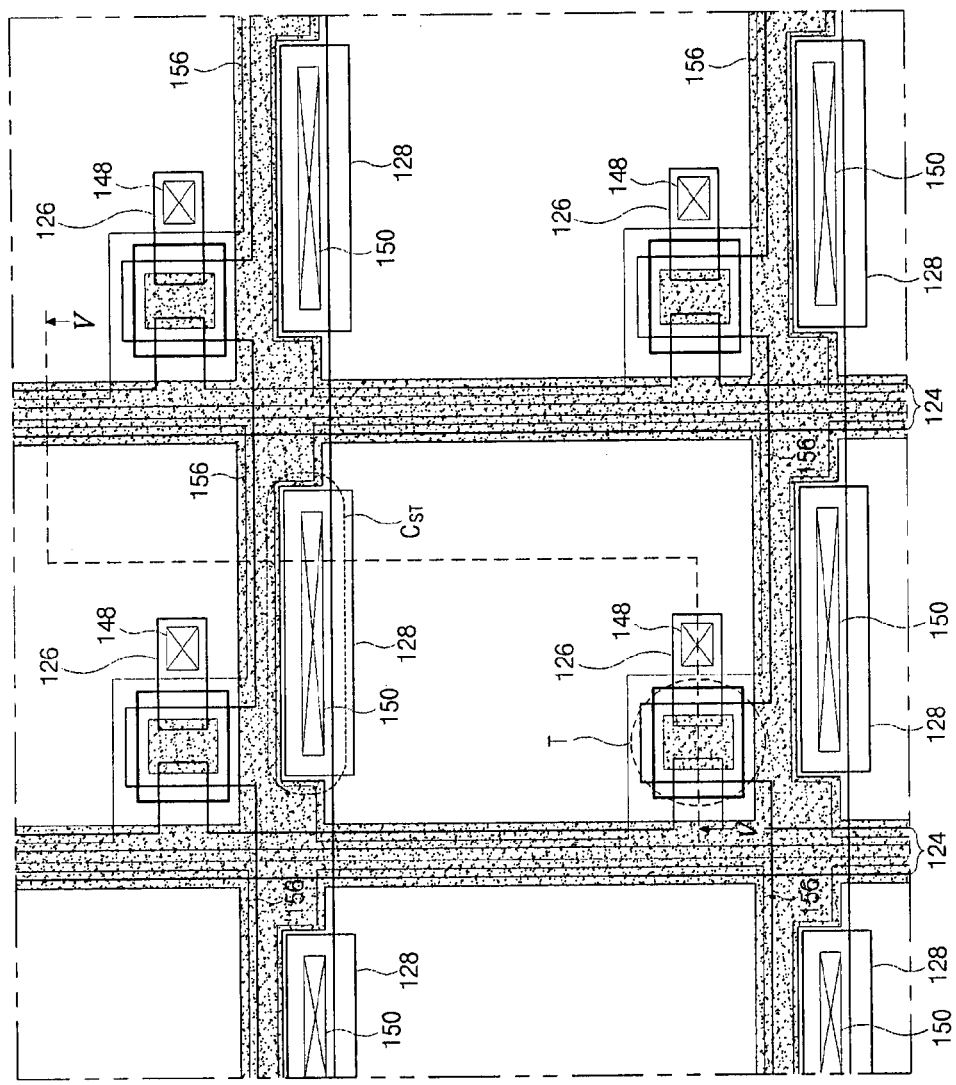
Figure 5F:
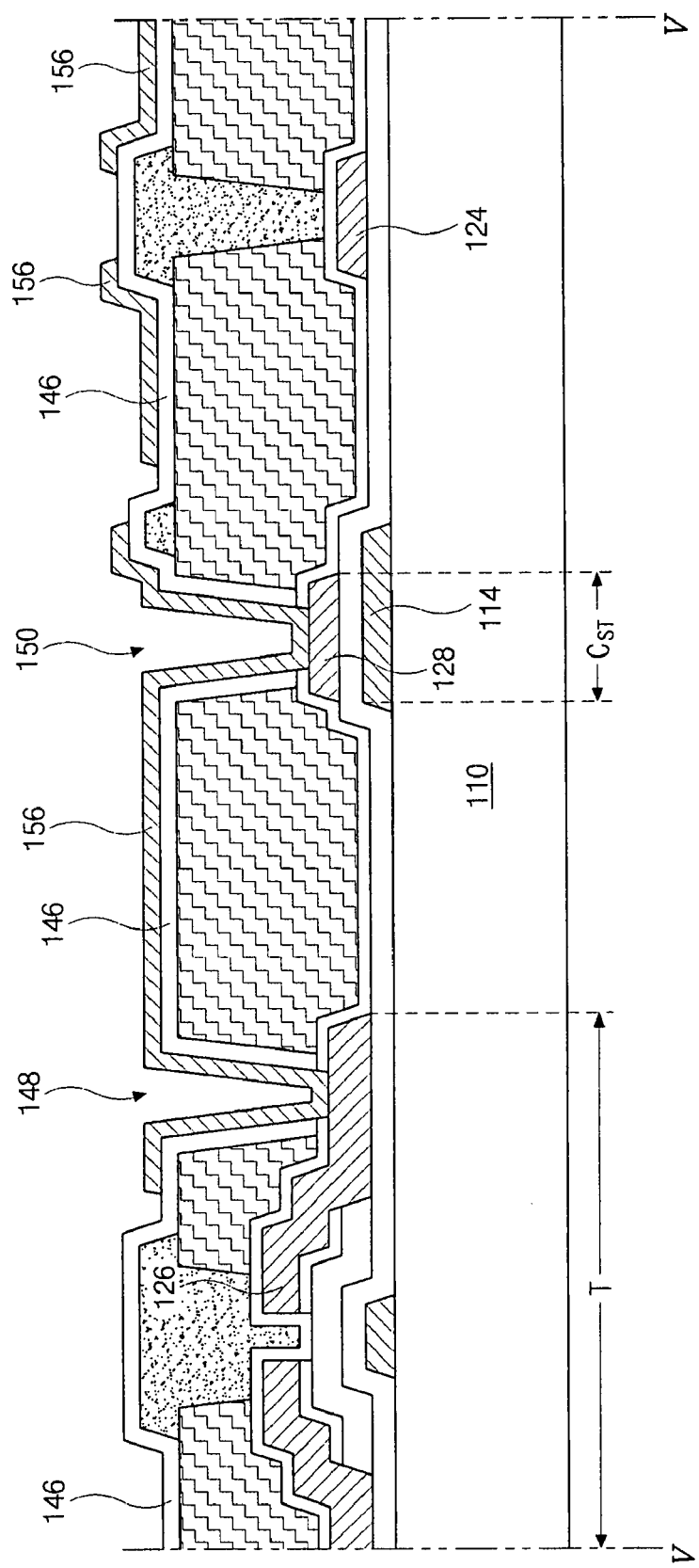

FIGS. 4F and 5F also show a transparent conductive material, such as indium tin oxide (ITO) or indium zinc oxide (IZO), that is deposited over the entire third insulating layer 146 and then patterned to form a pixel electrode 156 corresponding to, i.e., opposite to, the pixel region P. The pixel electrode 156 contacts the drain electrode 126 and the capacitor electrode 128, respectively, through the drain contact hole 148 and through the capacitor contact hole 150. In order to obtain a high aperture ratio, the pixel electrode 156 overlaps portions of the neighboring data lines 124. The capacitor electrode 128 forms a storage capacitor $C_{ST}$ with the overlapped portion 114 of the gate line 116, and the pixel electrode 156 is parallel-connected with the storage capacitor $C_{ST}$ by contacting the capacitor electrode 128.

According to the first embodiment illustrated with reference to FIGS. 3, 4A-4F and 5A-5F, since the color filter layer 136 and the black matrix 144 are formed over the same substrate as the thin film transistor T, misalignment may be prevented. Thus, the aperture ratio maximizes.

However, the first embodiment has the color filter layer 136 between the thin film transistor T and the pixel electrode 156, and the process of forming the contact holes must electrically connect the pixel electrode 156 to the thin film transistor T. Furthermore, it is very difficult to form the contact holes in the color filter layer 136 because the color filter layer 136 is generally a negative type color resin that includes color pigment. Additionally, residual color resin may remain in the contact holes when forming the contact holes, and the negative type color resin causes low resolution due to the included pigment. These problems are alleviated in other embodiments of the invention.

Figure 6A:
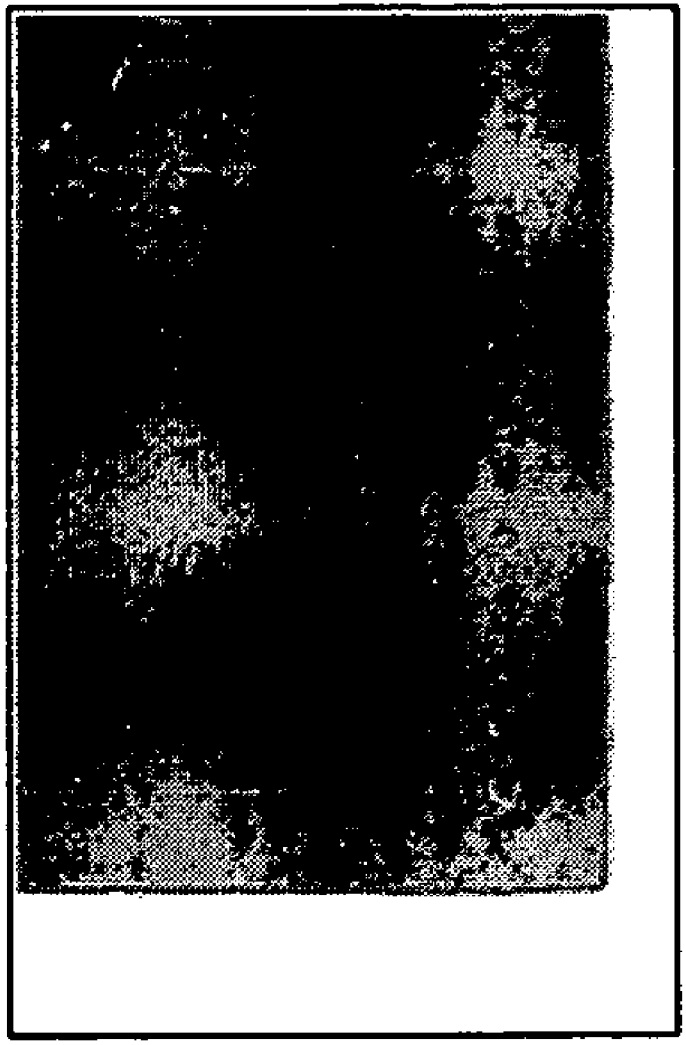
FIG. 6A shows forming a contact hole in the color filter layer.

FIG. 6A shows forming a contact hole in the color filter layer. A pixel 160 is assumed to have a 100×300 µm² size, but the invention is not restricted to this size. If the mask has a hole pattern of several tens micrometers, then the contact hole is not built. Namely, the mask requires a hole pattern of more than about 100 micrometers to form the contact hole. However, such a 100 µm hole pattern is substantially difficult to apply to the hole-forming process as compared to the pixel size (100×300 µm²).

FIG. 6B shows a cross sectional view depicting a mask process for forming a contact hole in the color filter layer. As shown, a color filter layer 172 is formed on a substrate 170, and a mask 180 having a hole pattern 182 is disposed over the color filter layer 172. The hole pattern 182 blocks the light during the light exposure process. When the light irradiates the color filter layer 172 through the mask 180, reactive radicals that are generated in the color filter layer 172 by the photo initiator diffuses laterally even under the hole pattern 182. Therefore, the color filter pattern remaining after developing process represents bad color purity and resolution. Namely, the un-exposed portion of the color filter layer 172 being under the hole pattern 182 is not clearly removed during the developing process because the diffused reactive radical, and then the residual color resin remains, thereby decreasing the resolution of the LCD device.

Figure 7:
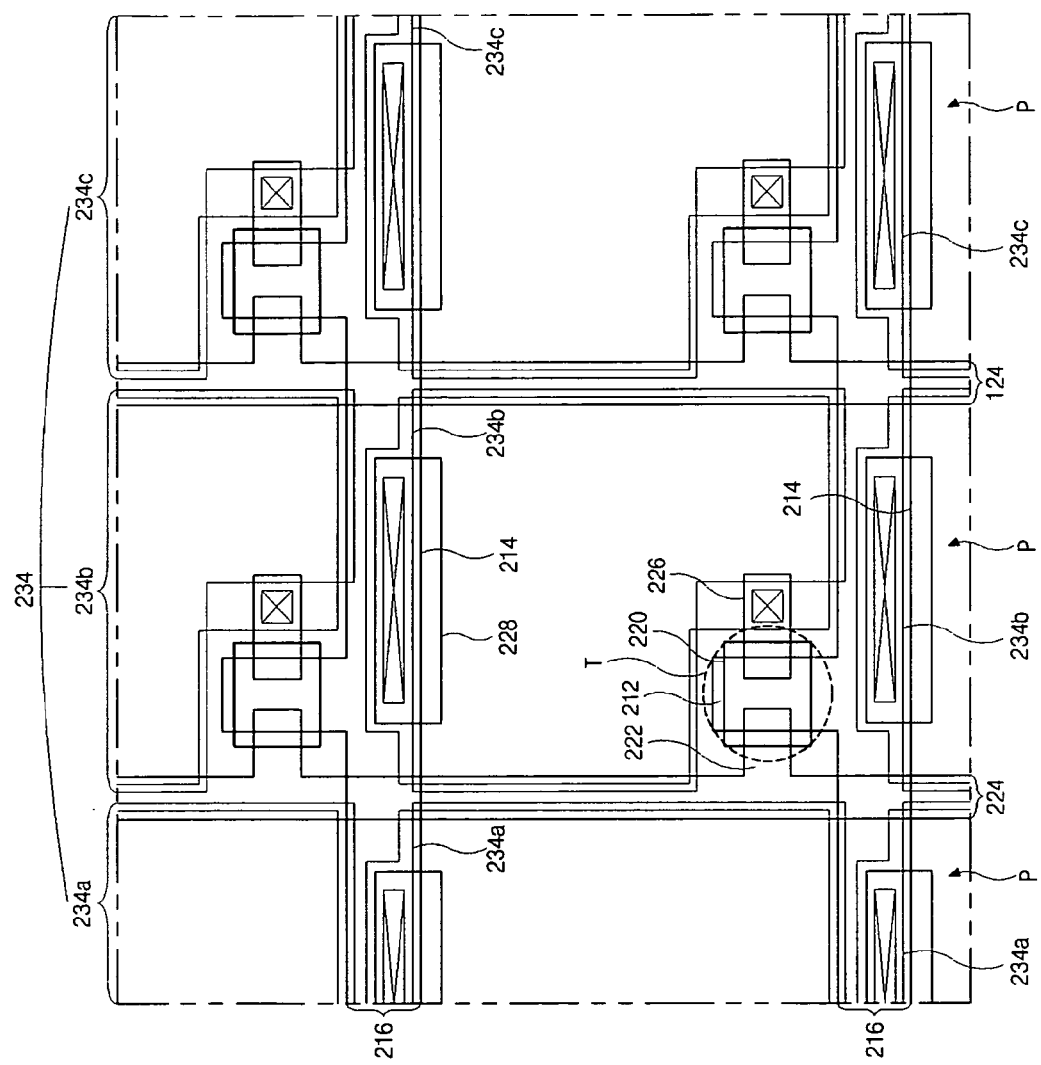
FIG. 7 shows a partial enlarged plane view of an array substrate having a color filter on a thin film transistor structure according to a second embodiment of the invention.

FIG. 7 shows a partial enlarged plane view of an array substrate having a color filter on a thin film transistor structure according to a second embodiment of the present invention.

As shown in FIG. 7, an array substrate includes gate lines 216 disposed in a transverse direction and data lines 224 disposed in a longitudinal direction. The gate lines 216 and the data lines 224 cross one another and define pixel regions P. A thin film transistor T is formed at each intersection of the gate line 216 and the data line 224. The thin film transistor T includes a gate electrode 212, an active layer 220, a source electrode 222, and a drain electrode 226. A capacitor electrode 228 overlaps a portion 214 of the gate line 216, and thus it constitutes a storage capacitor with the overlapped portion 214 of the gate line 216 and with an interposed insulator. The storage capacitor 228 functions as one electrode of the storage capacitor and the overlapped portion 214 functions as the other electrode of the storage capacitor.

A color filter layer 234 having color filters 234a, 234b, and 234c is located in the pixel regions P defined by the gate and data lines 216 and 224. In this second embodiment, each of the color filters 234a-234c corresponds to each pixel region P by being an island shaped pattern such that each color filter exposes the drain electrode 226 and the capacitor electrode 228 (unlike the first embodiment). Therefore, the process of forming the contact holes may be omitted in the second embodiment of the invention.

According to the second embodiment of the invention, the gate lines 216 and the data lines 224 function both as borders of the pixel regions P and as boundaries among the color filters 234a-234c. Furthermore, a black matrix is not formed over the gate and data lines 216 and 224 and over the thin film transistor T in this second embodiment of the invention. Due to the absence of the black matrix, the color filters 234a-234c overlap the neighboring gate and data lines 216 and 224.

FIGS. 8A-8D show plan views illustrating the process steps of forming the array substrate of FIG. 7, and FIGS. 9A-9D show cross-sectional views taken along lines IX-IX of FIGS. 8A-8D, respectively, illustrating the process steps of fabricating the array substrate having a color filter on a thin film transistor (COT) structure according to the second embodiment of the invention.

Figure 8A:
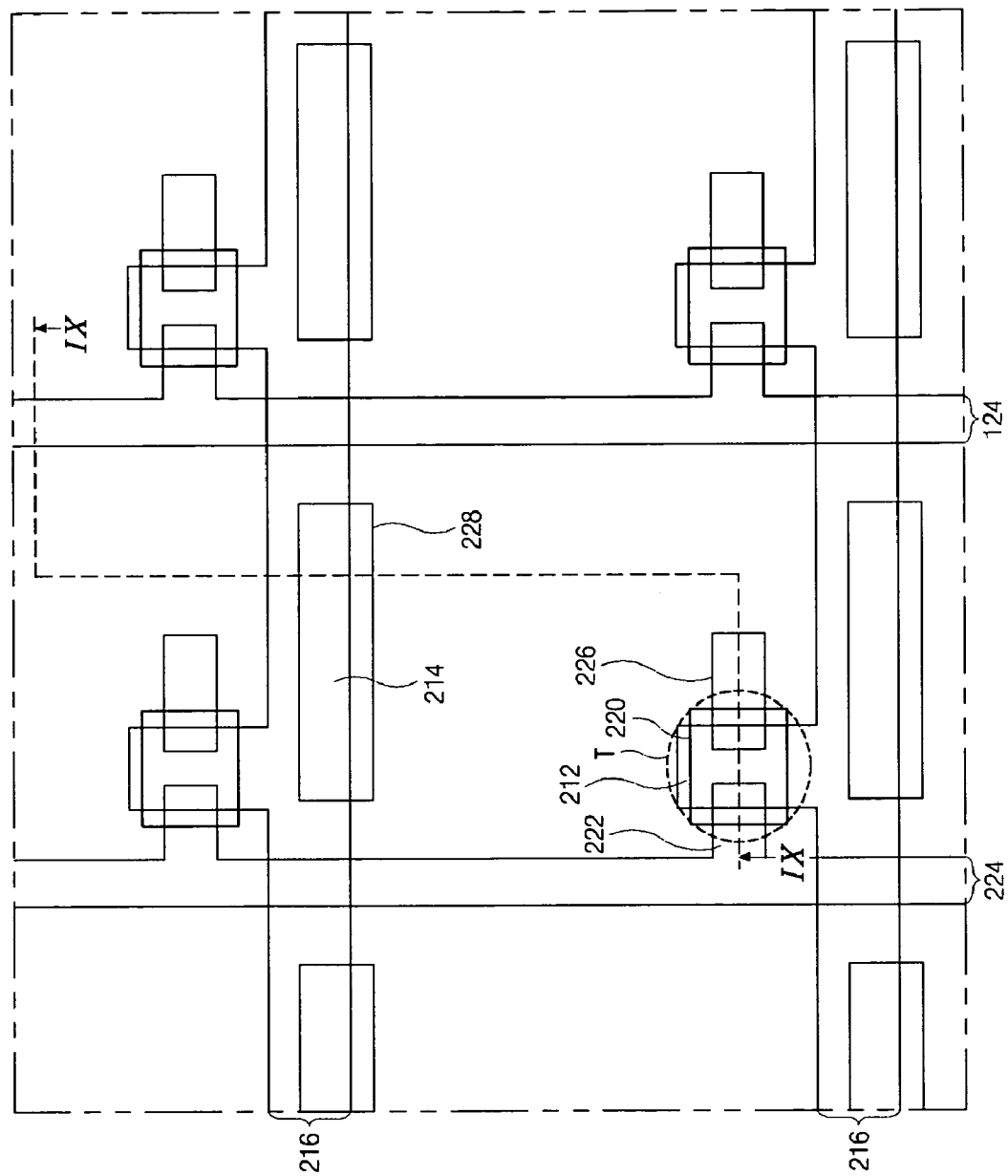
FIGS. 8A-8D show plan views illustrating the process steps of forming the array substrate of FIG. 7.
Figure 9A:
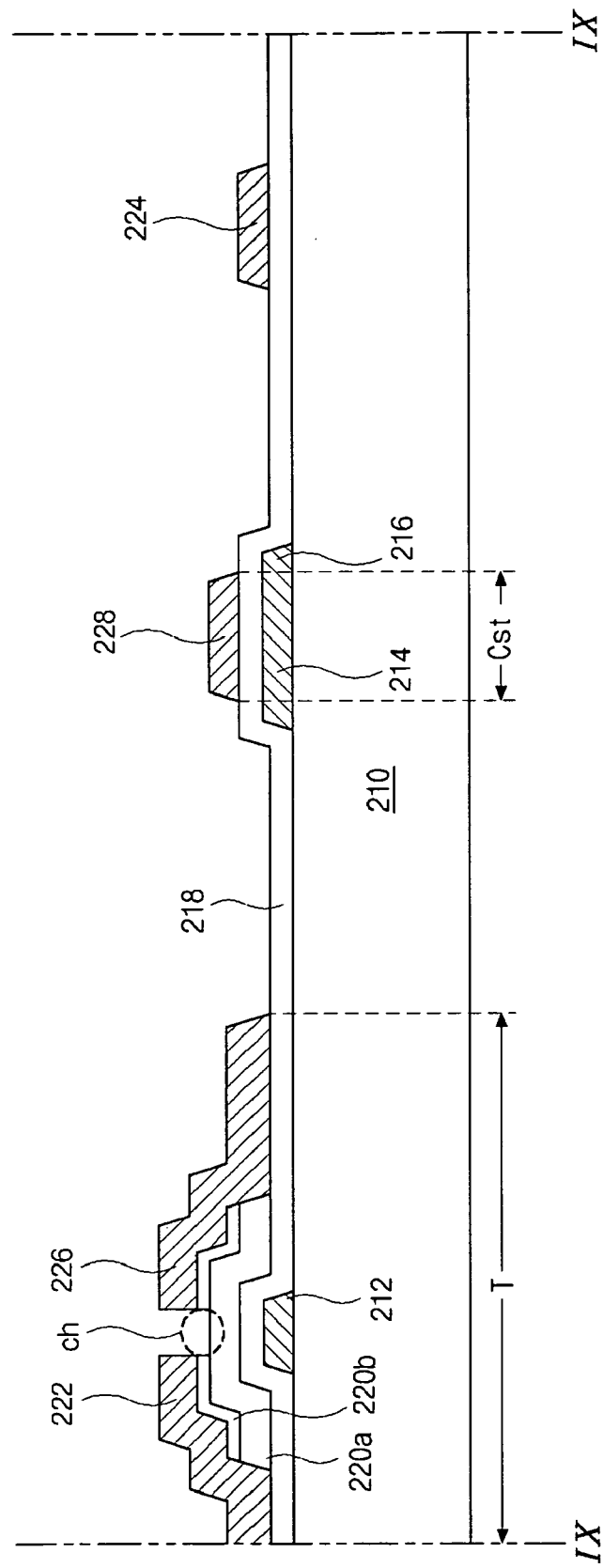
FIGS. 9A-9D show cross-sectional views taken along lines IX-IX of FIGS. 8A-8D, respectively, illustrating the process steps of fabricating the array substrate having a color filter on a thin film transistor (COT) structure according to the second embodiment of the invention.

FIGS. 8A and 9A show a first metal layer that is disposed over the surface of a substrate 210, and then patterned to from a gate electrode 212 and the gate line 216. The gate electrode 212 extends from the gate line 216. Thereafter, a gate insulation layer 218 (a first insulating layer) is formed over the substrate 210 to cover the gate electrode 212 and the gate line 216. An inorganic material, such as silicon nitride ($SiN_x$) or silicon oxide (SiO$_2$), forms the outer insulation layer 218. After forming the first insulating layer 218, an intrinsic amorphous silicon layer (a-Si:H) and then an n$^+$-doped amorphous silicon layer (n$^+$a-Si:H) are sequentially deposited over the entire surface of the gate insulation layer 218, and then the layers are simultaneously patterned to form an active layer 220a and an ohmic contact layer 220b, both of which constitute a semiconductor layer 220. The active layer 220a is over the gate insulation layer 218, especially over the gate electrode 212, and the ohmic contact layer 220b is then located over the active layer 220a.

After forming the active layer 220a and the ohmic contact layer 220b, one deposits a second metal layer over the substrate 210, and then patterns it to form a source electrode 222, a drain electrode 226, a data line 224, and a capacitor electrode 228. The drain electrode can have an "L" shape. The second metal layer may be formed of one of chromium (Cr), copper (Cu), molybdenum (Mo), or an alloy of any combination thereof. The data line 224 crosses the gate line 216 and then defines a pixel region P with the gate line 216. The source electrode 222 extends from the data line 224 and contacts one portion of the ohmic contact layer 220b. The drain electrode 226 is spaced apart from the source electrode 222 across the gate electrode 212, and the drain electrode 226 then contacts the other portion of the ohmic contact layer 220b. The capacitor electrode 228 overlaps a portion 214 of the gate line 216. Thereafter, a portion of the ohmic contact layer 220b between the source and drain electrodes 222 and 226 is etched by using the source and drain electrodes 222 and 226 as masks. Thus, a thin film transistor T and a storage capacitor $C_{ST}$ are complete. As described with reference to FIG. 7, the thin film transistor T includes the gate electrode 212, the active layer 220a, the ohmic contact layer 220b, the source electrode 222, and the drain electrode 226. Also, the storage capacitor $C_{ST}$ includes the overlapped portion 214, the capacitor electrode 228, and the interposed first insulator 218.

Figure 8B:
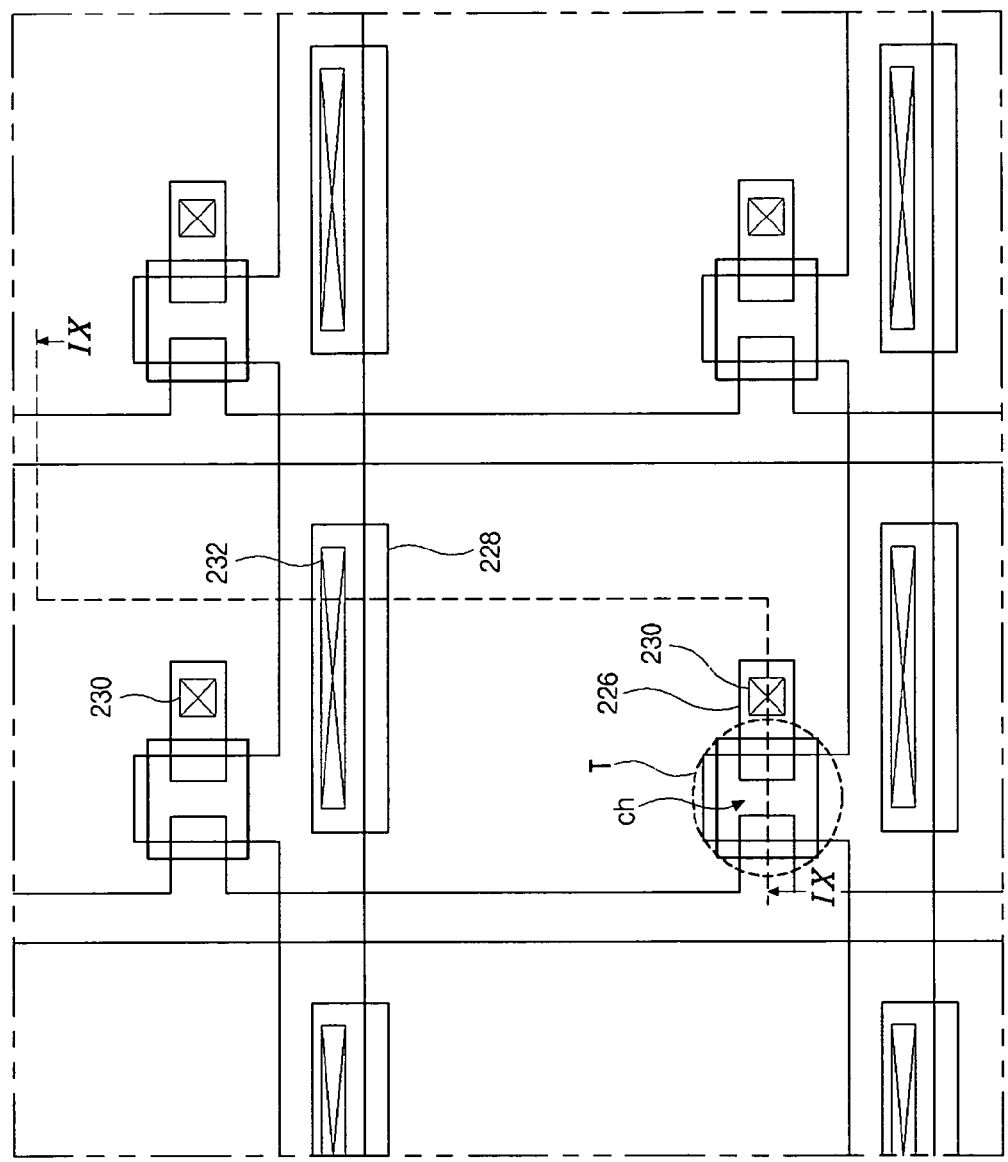
Figure 9B:
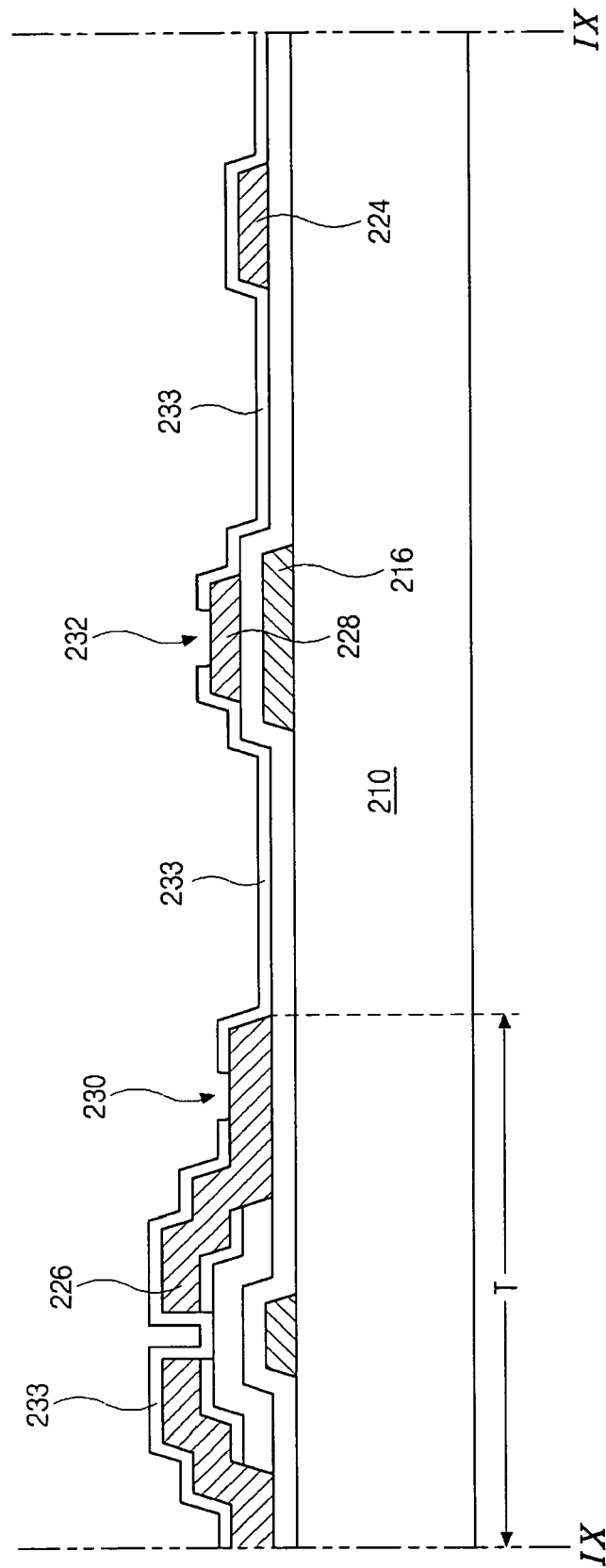

FIGS. 8B and 9B show a second insulating layer 233 that is deposited over the entire surface of the substrate 210 to cover the patterned second metal layer. The second insulating layer 233 may be formed of silicon nitride (SiN$_x$) or silicon oxide (SiO$_2$). The second insulating layer 233 enhances the adhesion of an organic layer to be formed during later processing. Namely, the second insulating layer 233 improves the adhesion between the active layer 220a and the later-formed organic layer, thereby overcoming the related art's tendency to delaminate. Then, the second insulating layer 233 is patterned to form a drain contact hole 230 and a capacitor contact hole 232. As shown in FIGS. 8B and 9B, the drain contact hole 230 exposes a portion of the drain electrode 226, and the capacitor contact hole 232 exposes a portion of the capacitor electrode 228.

Figure 8C:
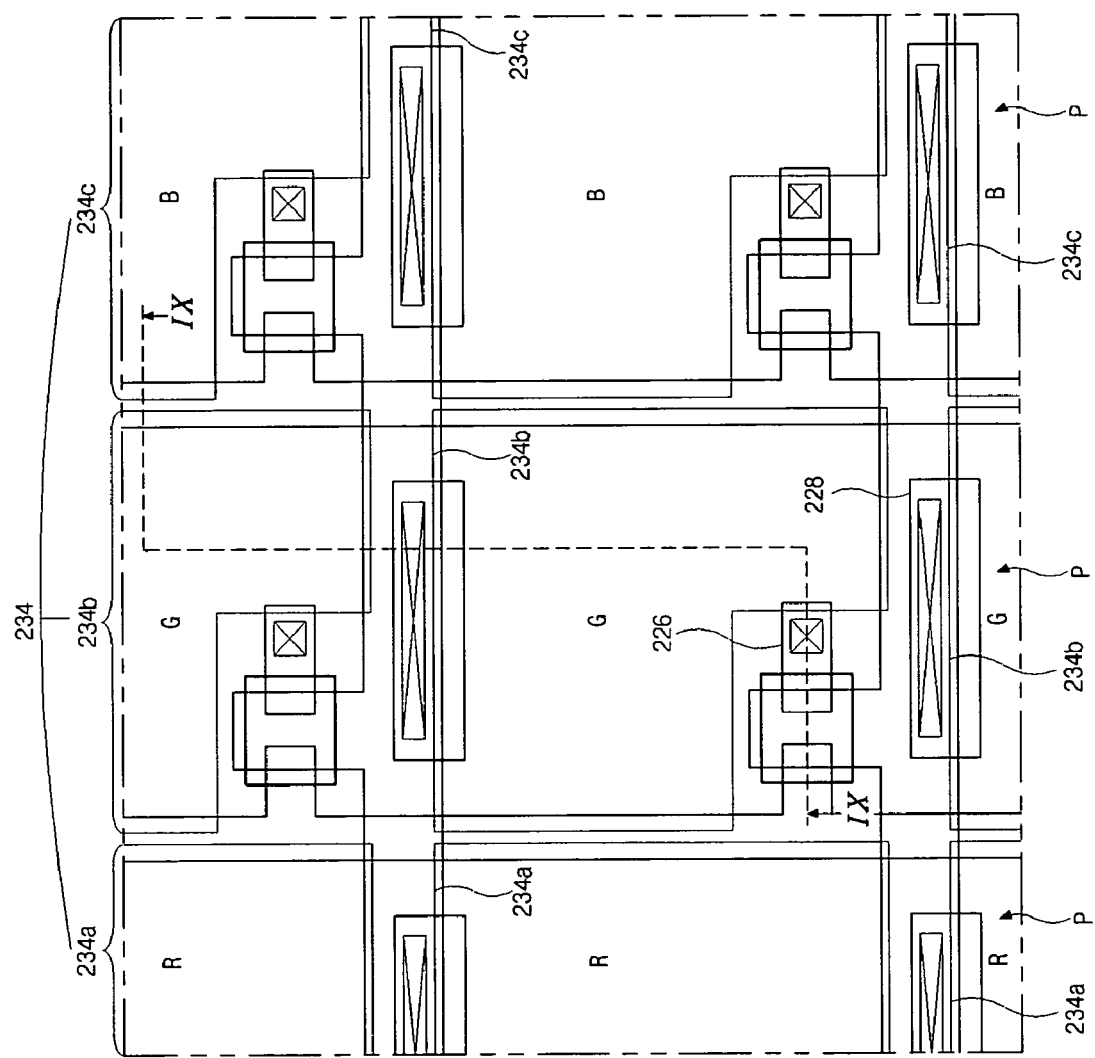
Figure 9C:
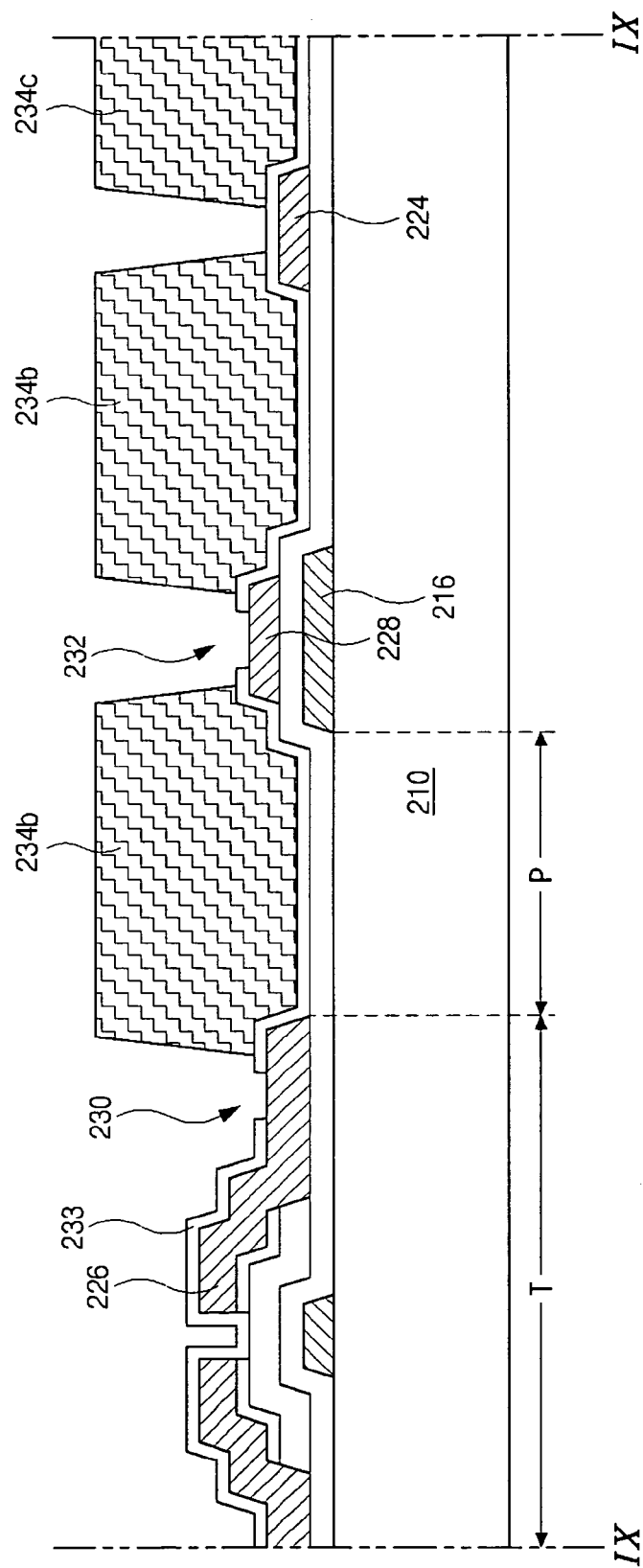

FIGS. 8C and 9C show a color resin that is formed on the second insulating layer 233 and then developed to form a color filter layer 234 having red (R), green (G) and blue (B) color filters 234a, 234b and 234c.

Each of the color filters 234a, 234b, and 234c for displaying the full spectrum of colors has a stripe pattern shape such that each color filter 234a, 234b or 234c covers the pixel regions P with an overlap of the neighboring gate and data lines 216 and 224. Unlike the first embodiment, the color filters 234a-234c do not fully cover the thin film transistor T and the gate and data lines 216 and 224. Each of the color filters 234a-234c exposes the portion of the drain electrode 226 and the portion of the capacitor electrode 228, which were previously exposed by the second insulating layer 233. The color filters 234a-234c are formed through a photolithography process that includes exposure and development processes, such that an additional process of forming additional contact holes is not required in the second embodiment of the present invention. However, the invention is not restricted to photolithography, and other processes, e.g., gravure, can be used.

Figure 8D:
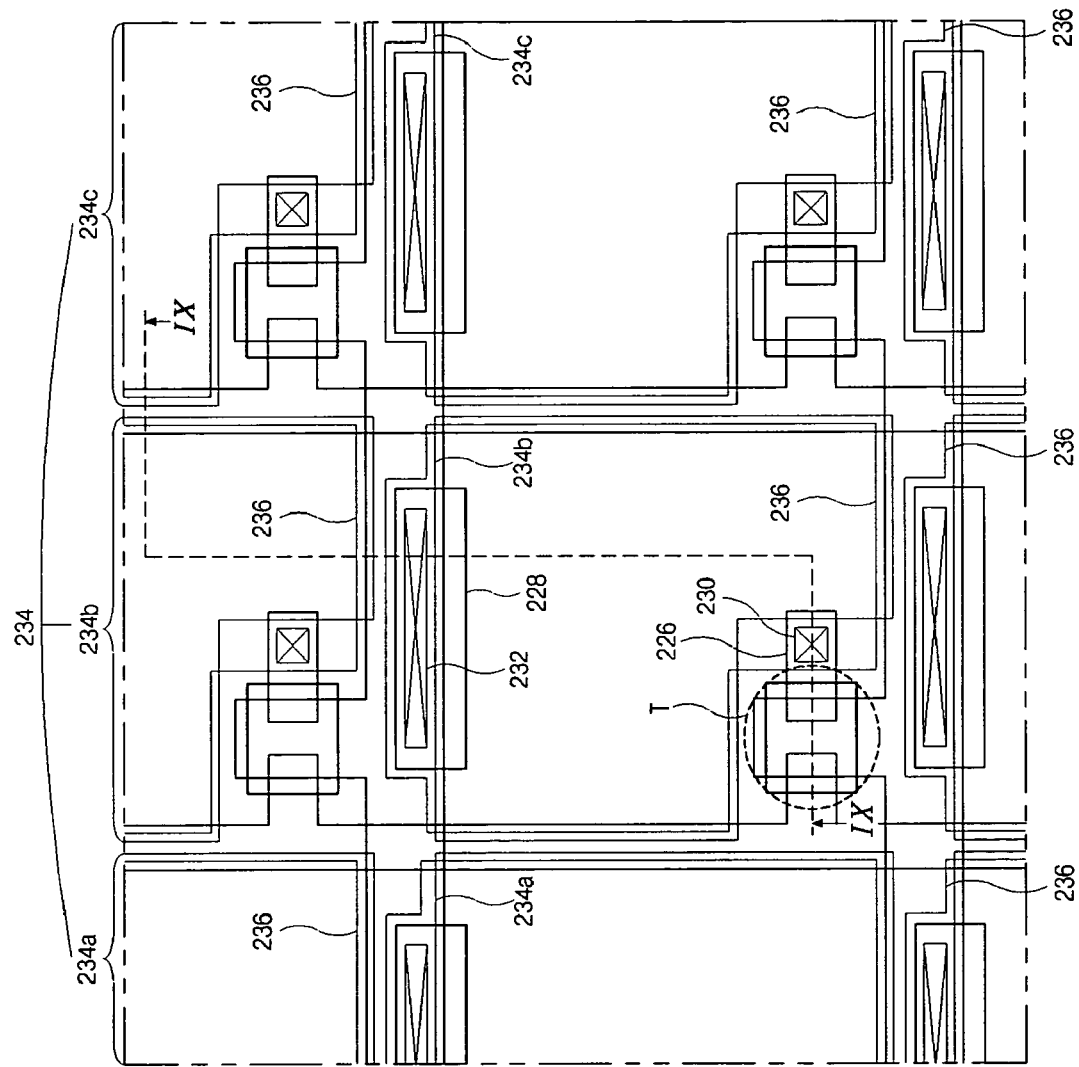
Figure 9D:
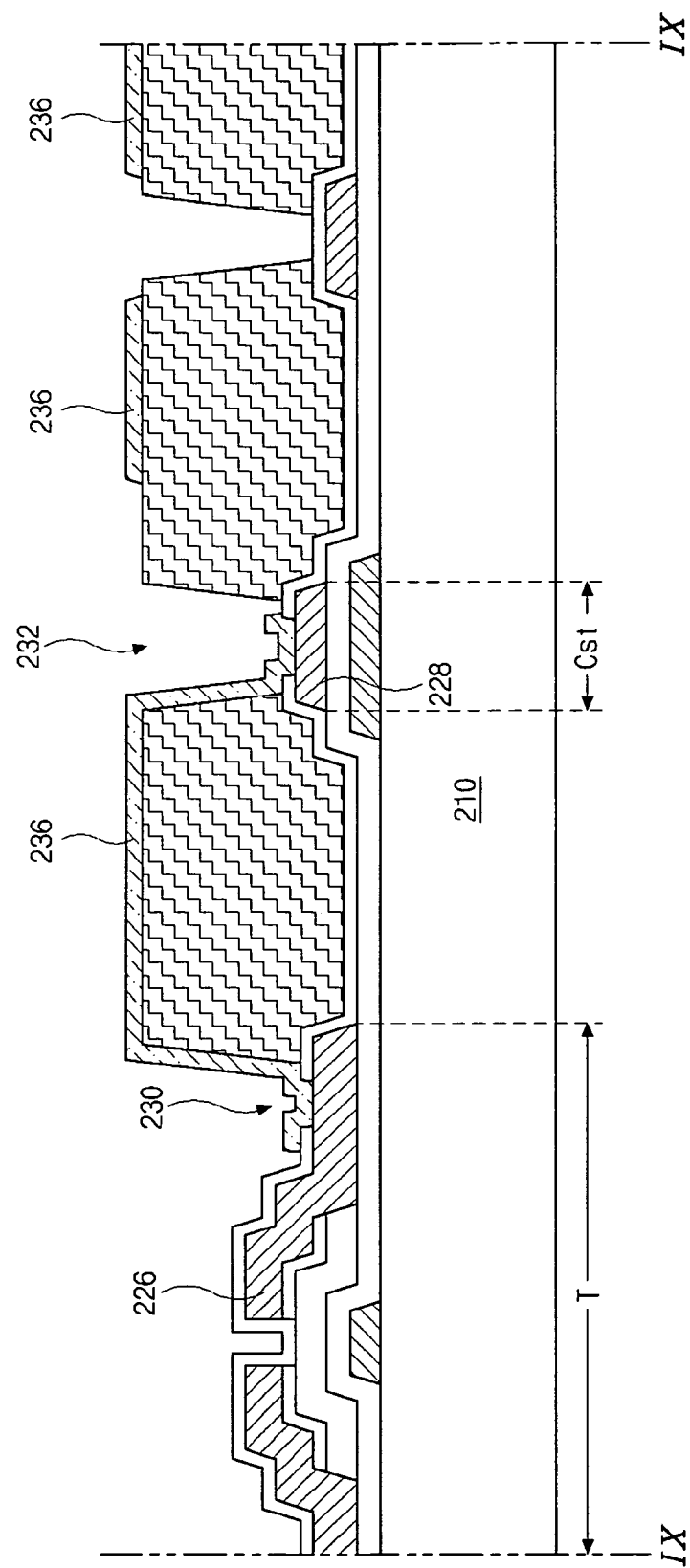

Now in FIGS. 8D and 9D, a transparent conductive material, such as indium tin oxide (ITO) or indium zinc oxide (IZO), is deposited over the entire of the substrate 210 to cover the color filters 234a-234c, and then the transparent conductive material is patterned to form pixel electrodes 236 that each correspond to the pixel region P. The pixel electrode 236 is over each of the color filters 234a-234c, and contacts the drain electrode 226 and the capacitor electrode 228, respectively, through the drain contact hole 230 and through the capacitor contact hole 232. The pixel electrode 236 overlaps the capacitor electrode 228 that forms a storage capacitor $C_{ST}$ with the overlapped portion 214 of the gate line 216. Thus, the pixel electrode 236 is parallel-connected with the storage capacitor $C_{ST}$ by way of contacting the capacitor electrode 228.

The second embodiment of the invention illustrated with reference to FIGS. 7, 8A-8D and 9A-9D, omits the step of forming the black matrix and, the process of forming the array substrate can therefore be simplified. Namely, when compared with the first embodiment, the step of forming the third insulating layer and the step of forming the additional contact holes can be omitted from the whole fabrication process.

Figure 10:
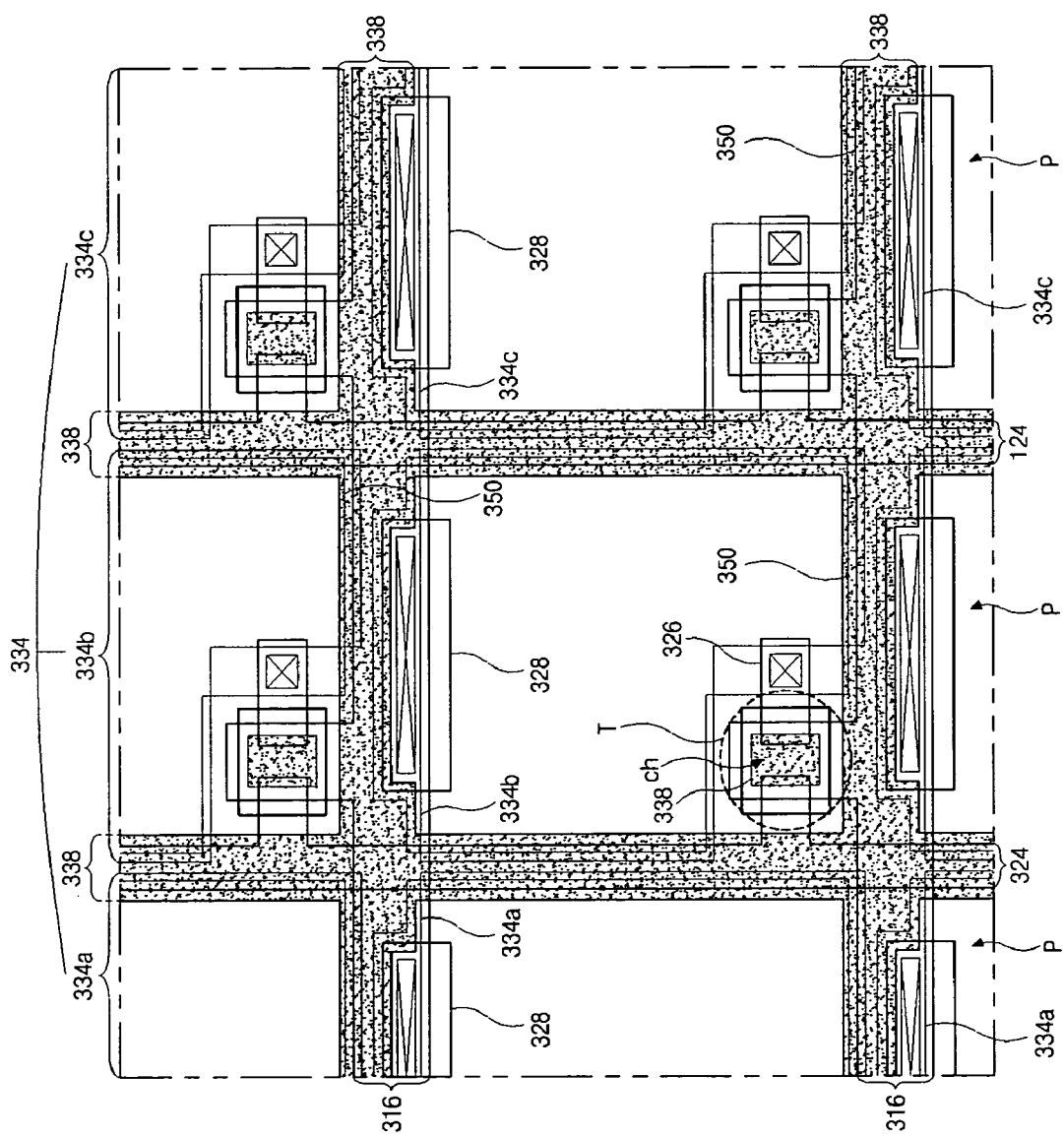
FIG. 10 shows a partial enlarged plane view of an array substrate having a color filter on a thin film transistor (COT) structure according to a third embodiment of the invention.

FIG. 10 shows a partial enlarged plane view of an array substrate having a color filter on a thin film transistor (COT) structure according to a third embodiment of the invention. Since the array substrate of the third embodiment is very similar to that of the first or second embodiment, some of the detailed explanations are omitted hereinafter.

FIG. 10 shows an array substrate that includes multiple gate lines 316 disposed in a transverse direction and multiple data lines 324 disposed in a longitudinal direction. The gate lines 316 and the data lines 324 cross one another and define pixel regions P. A thin film transistor T is formed at each intersection of the gate line 316 and the data line 324. The thin film transistor T includes a channel ch, through which charge carriers are transferred. A capacitor electrode 328 overlaps a portion of the gate line 316 and constitutes a storage capacitor with the overlapped portion. The capacitor electrode 328 functions as one electrode of the storage capacitor and the overlapped portion of the gate electrode 316 functions as the other electrode of the storage capacitor.

In the pixel regions P defined by the gate and data lines 316 and 324, a color filter layer 334 having multiple color filters 334a, 334b, and 334c is located therein. In the third embodiment of the invention, each of the color filters 334a-334c corresponds to the pixel region P and overlaps portions of the gate and data lines 316 and 324, but the color filter layer 334 does not overlap the thin film transistors T. Namely, each of the color filters 334a-334c exposes a drain electrode 326 of the thin film transistor T and the capacitor electrode 328.

Additionally, a pixel electrode 350 is disposed corresponding to each pixel region P. The pixel electrode 350 contacts the drain electrode 326 and the capacitor electrode 328, respectively, through a drain contact hole and a capacitor contact hole, which are formed in an insulator (not shown). In the invention, the pixel electrode 350 overlaps portions of the neighboring gate and data lines 316 and 324 in order to increase the aperture ratio.

Meanwhile, a black matrix 338 is disposed over the gate and data lines 316 and 324. The black matrix 338 is also disposed over the thin film transistor T to cover the channel ch such that it prevents an undesirable photo current from occurring in the thin film transistor T. Unlike the second embodiment, the black matrix 338 and the color filter layer 334 are formed together in the array substrate. Namely, the color filters 334a-334c correspond to the pixel region P, and the black matrix 338 corresponds to not only the thin film transistors T but also to the gate and the data lines 316 and 324, so that it prevents light leakage in the LCD device. The black matrix 338 blocks the light incident to the thin film transistors T, and it also protects the thin film transistors T from external impact.

Figure 11A:
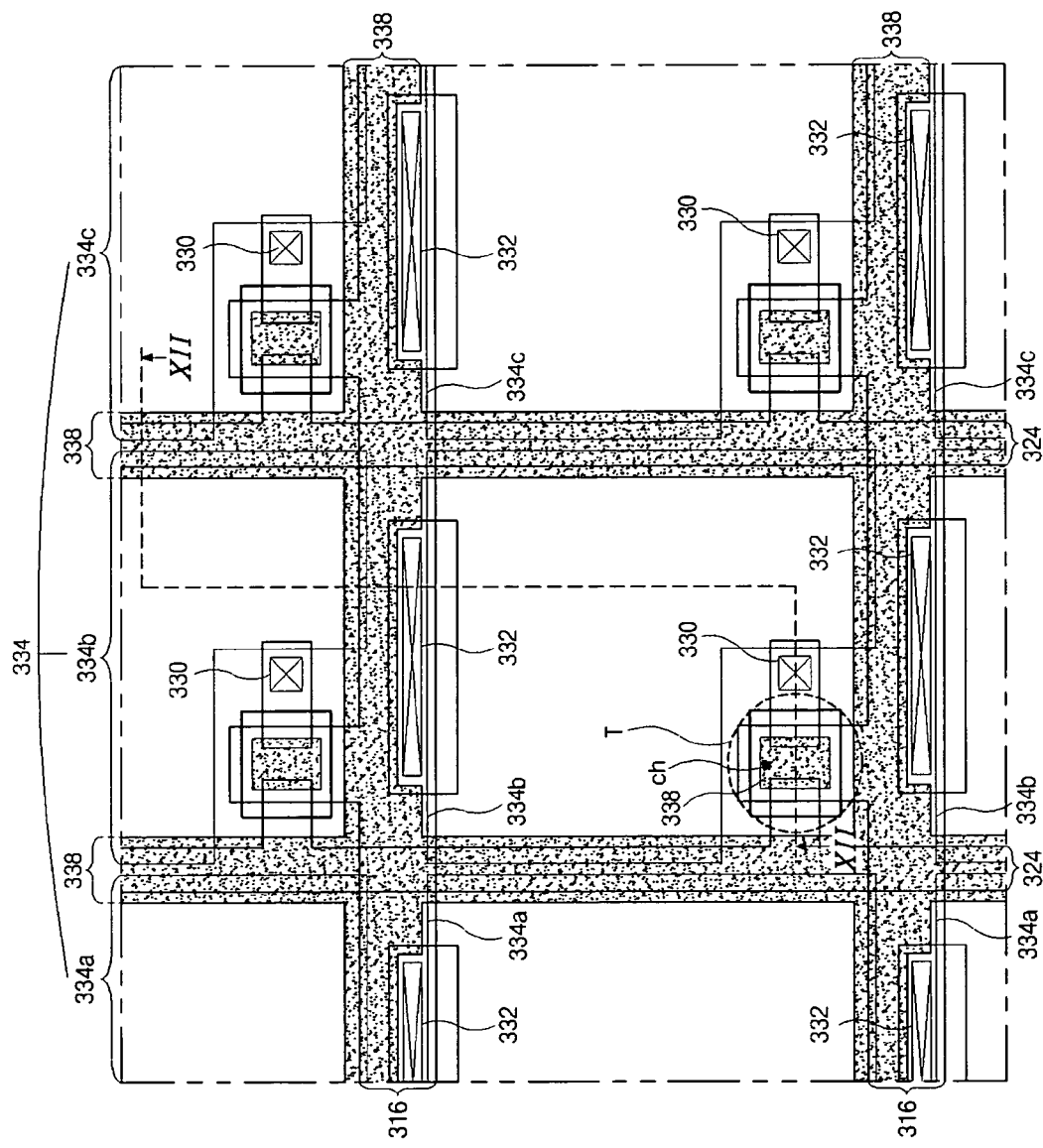
FIGS. 11A-11C show plan views illustrating the process steps of forming the array substrate of FIG. 10.
Figure 11B:
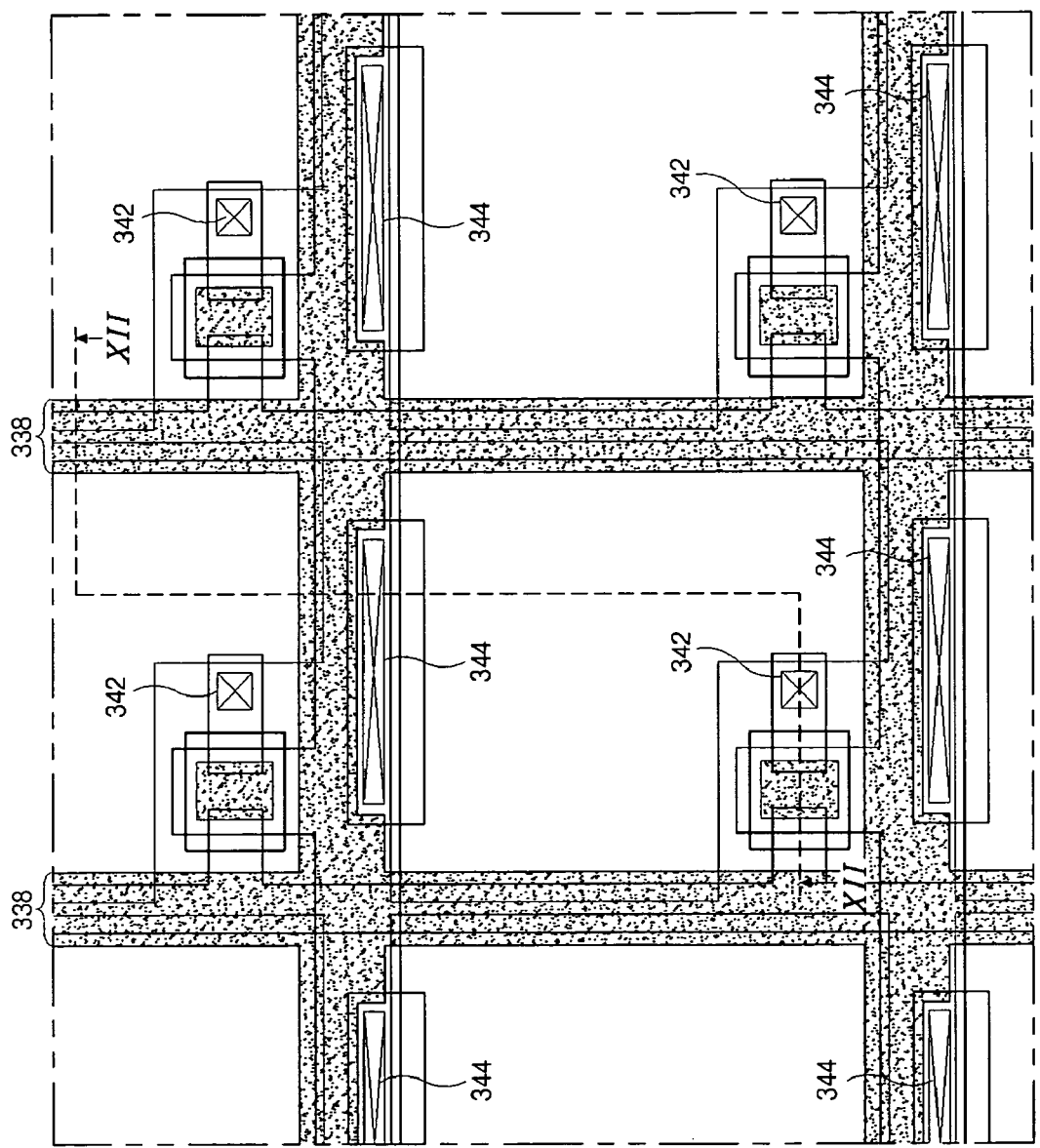
Figure 11C:
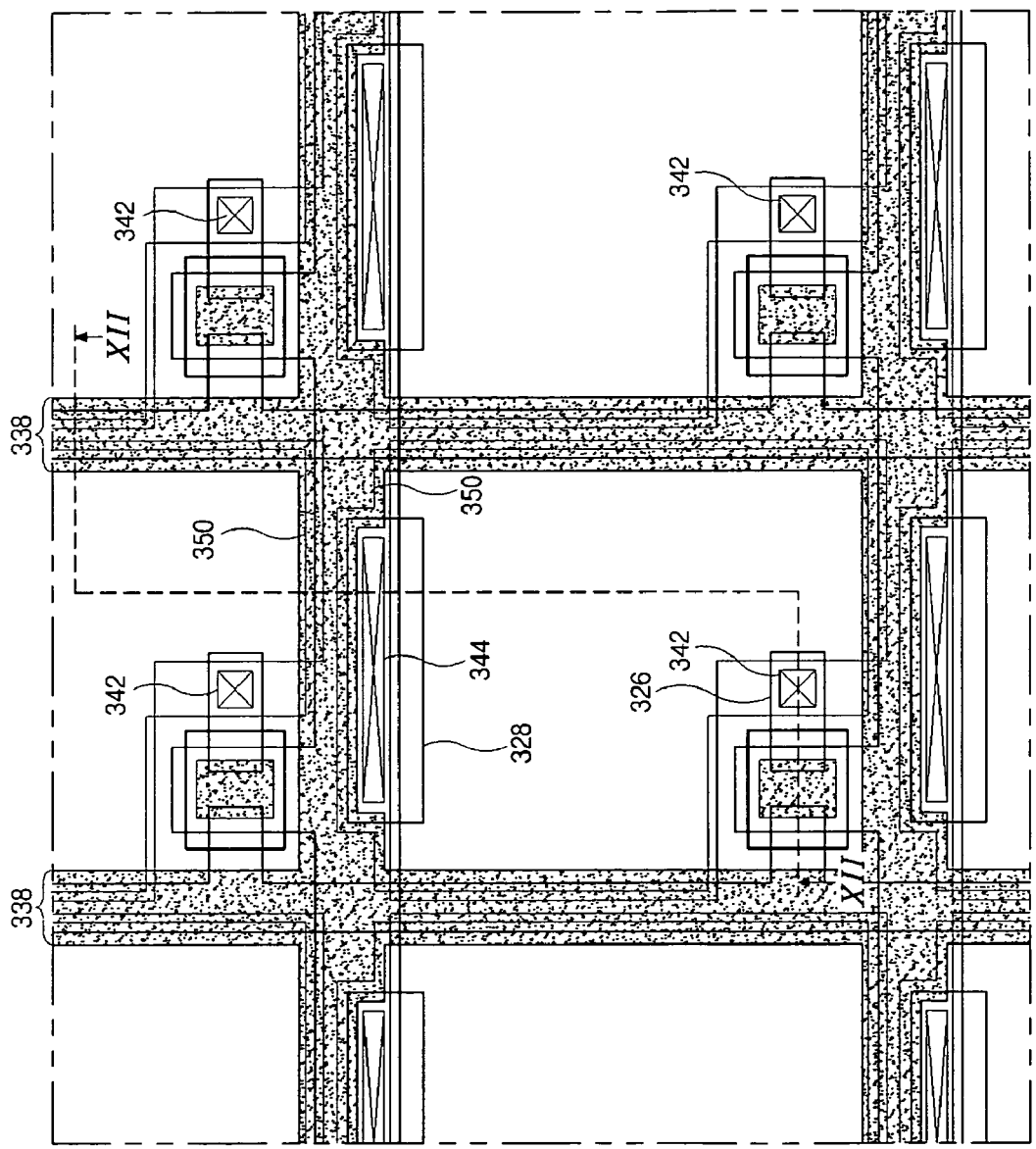

FIGS. 11A-11C show plan views illustrating the process steps of forming the array substrate of FIG. 10, and FIGS. 12A-12C are cross-sectional views taken along lines XII-XII of FIGS. 11A-11C, respectively, illustrating the process steps of fabricating the array substrate having a color filter on a thin film transistor (COT) structure according to the third embodiment of the invention.

Figure 12A:
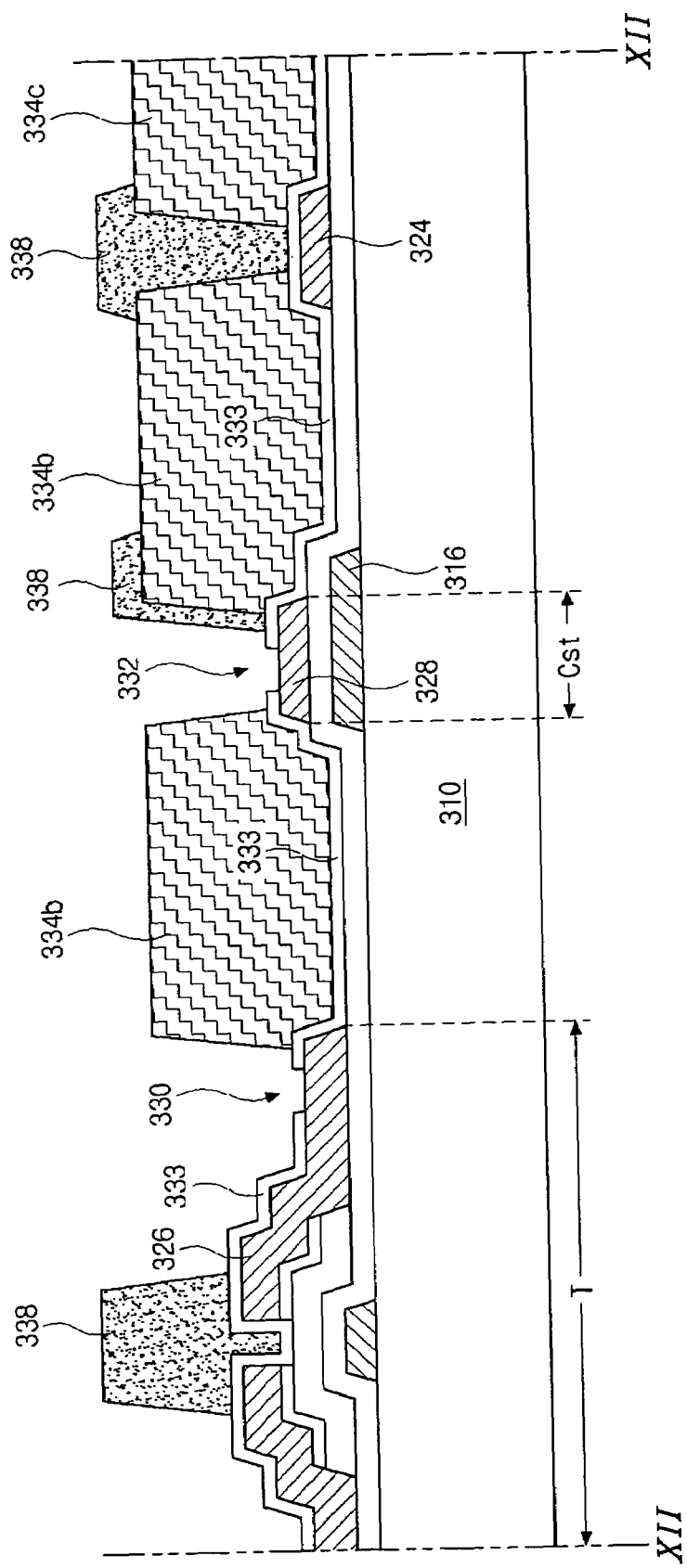
FIGS. 12A-12C show cross-sectional views taken along lines XII-XII of FIGS. 11A-11C, respectively, illustrating the process steps of fabricating the array substrate having a color filter on a thin film transistor (COT) structure according to the third embodiment of the invention.

FIGS. 11A and 12A show that there is first provided the array substrate fabricated with reference to FIGS. 8A-8C and 9A-9C. Namely, the array substrate includes a thin film transistor T and a storage capacitor $C_{ST}$, and then a second insulating layer 333 is disposed over a substrate 310 to cover the thin transistor T and the storage capacitor $C_{ST}$. The second insulating layer 333 has a first drain contact hole 330 exposing a portion of a drain electrode 326 and a first capacitor contact hole 332 exposing a portion of a capacitor electrode 328. A color filter layer 334 includes red, green and blue color filters 334a-334c that are disposed over the second insulating layer 333. Each of the color filters 334a-334c corresponds to each pixel region P defined by gate and data lines 316 and 324. The color filter layer 334 also exposes the portions of the drain electrode 326 and capacitor electrode 328.

Thereafter, a black matrix 338 is formed to correspond to the thin film transistor T and the gate and data lines 316 and 324. Namely, an opaque material is coated over an entire surface of the substrate 310 to cover the color filter layer 334, and the opaque material is then patterned to form the black matrix 338. As shown in FIGS. 11A and 12A, the black matrix 338 is disposed over the gate and data lines 316 and 324 and over the thin film transistor T. A portion of the black matrix 338 over the thin film transistor T protects the thin film transistor T and blocks incident light so as to prevent the photo current from occurring in the channel ch. Furthermore, the black matrix 338 does not cover the first drain contact hole 330 and the first capacitor contact hole 332.

Figure 12B:
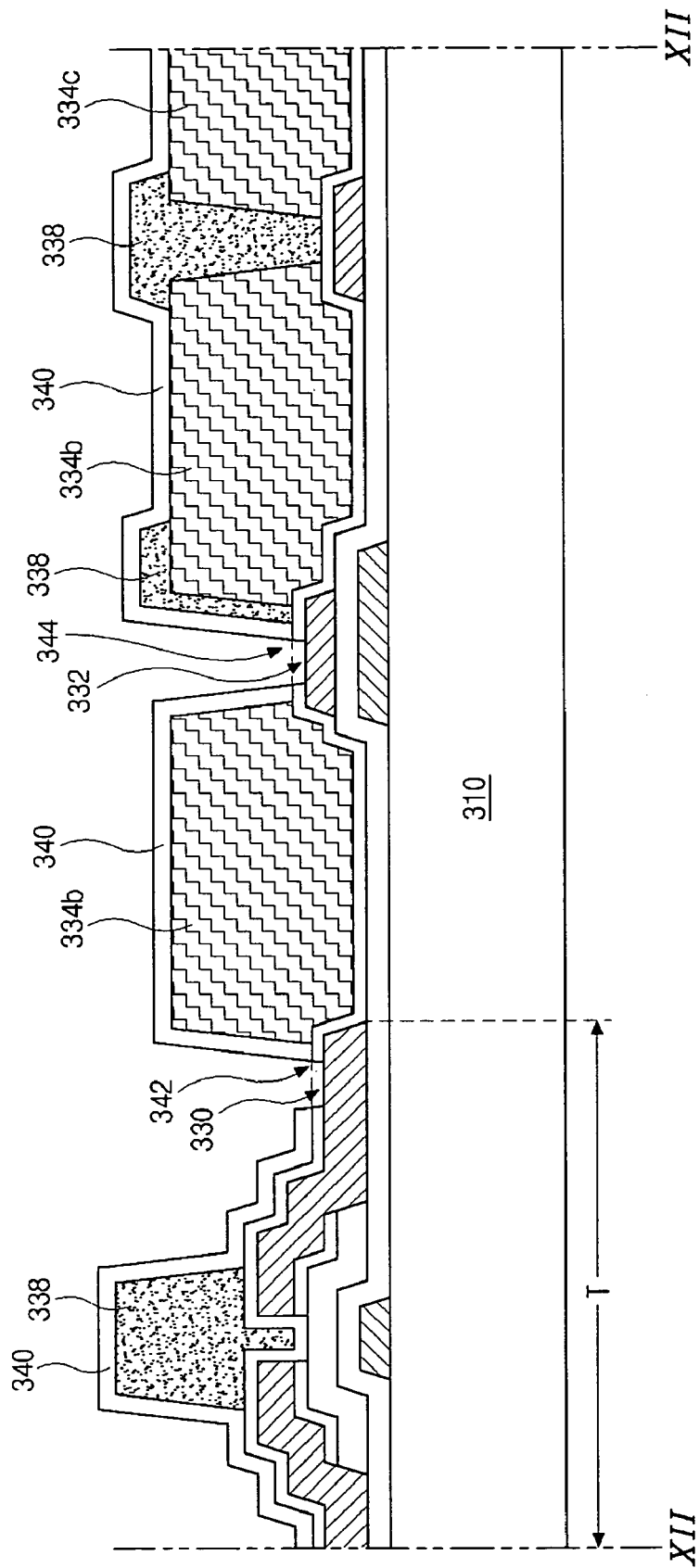

FIGS. 11B and 12B show a third insulating layer 340 having a low dielectric constant that is formed over the entire surface of the substrate 310 to cover the black matrix 338 and the color filter layer 334. Similar to the first embodiment, the third insulating layer 340 may be formed of an inorganic insulating material, such as silicon nitride ($SiN_x$) or silicon oxide ($SiO_2$), or an organic material insulating material, such as benzocyclobutene (BCB), acrylic resin, methacrylic resin or polyolefin. Thereafter, patterning the third insulating layer 340 forms a second drain contact hole 342 and a second capacitor contact hole 344. The second drain contact hole 342 corresponds to the first drain contact hole 330 such that it exposes the portion of the drain electrode 326. The second capacitor contact hole 344 corresponds to the first contact hole 332 such that it exposes the portion of the capacitor electrode 328.

Figure 12C:
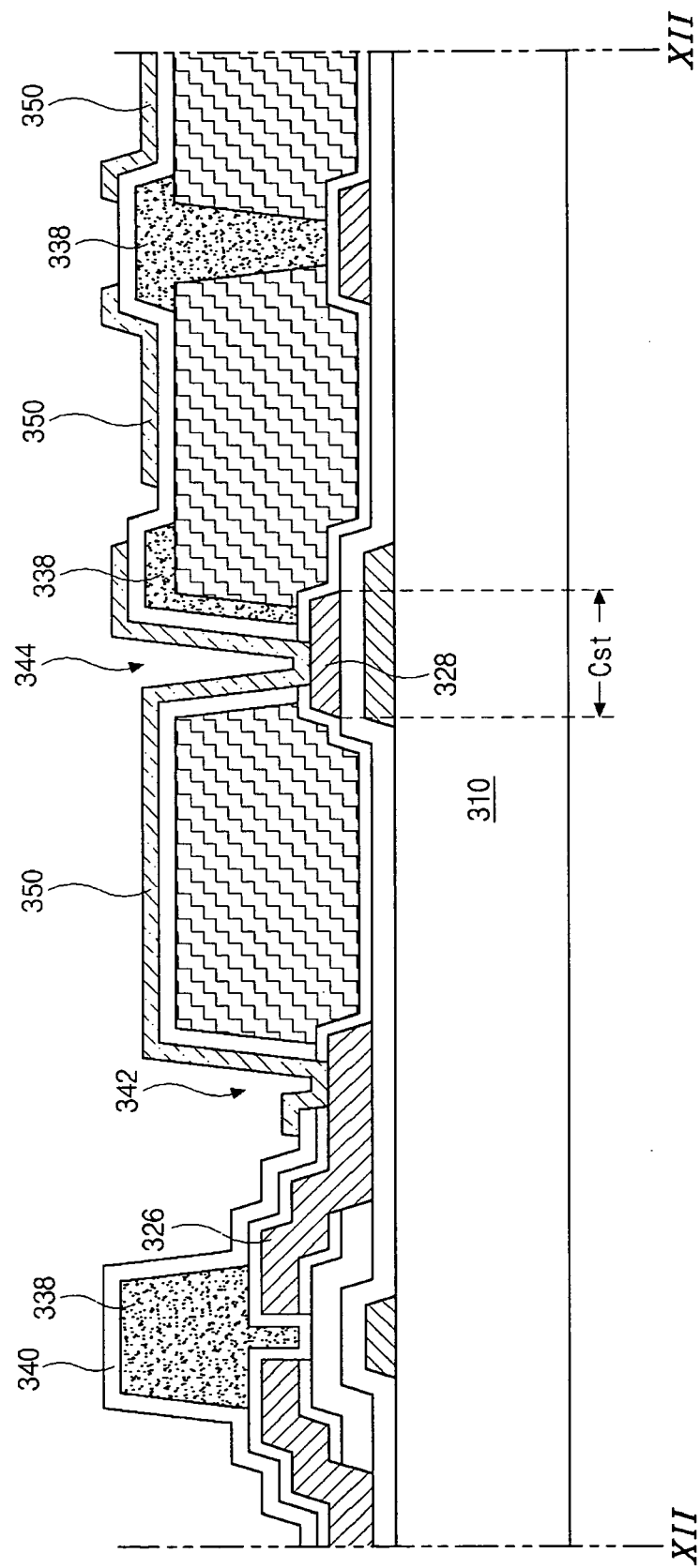

FIGS. 11C and 12C show that a transparent conductive material, such as indium tin oxide (ITO) or indium zinc oxide (IZO), is deposited over the entire surface of the patterned third insulating layer 340, and then the transparent conductive material is patterned to form a pixel electrode 350 that corresponds to the pixel region P. The pixel electrode 350 contacts the drain electrode 326 and the capacitor electrode 328, respectively, through the drain contact hole 342 and through the capacitor contact hole 344. In order to obtain a high aperture ratio, the pixel electrode 350 is designed to overlap portions of the neighboring data lines 324 and the capacitor electrode 328. Namely, the pixel electrode 350 overlaps portion of the black matrix 338 over the gate and data lines 316 and 324. Meanwhile, as previously described above, the storage capacitor 328 forms a storage capacitor $C_{ST}$ with the overlapped portion of the gate line 316, and the pixel electrode 350 is parallel-connected with the storage capacitor $C_{ST}$ by way of contacting the capacitor electrode 328.

Figure 13:
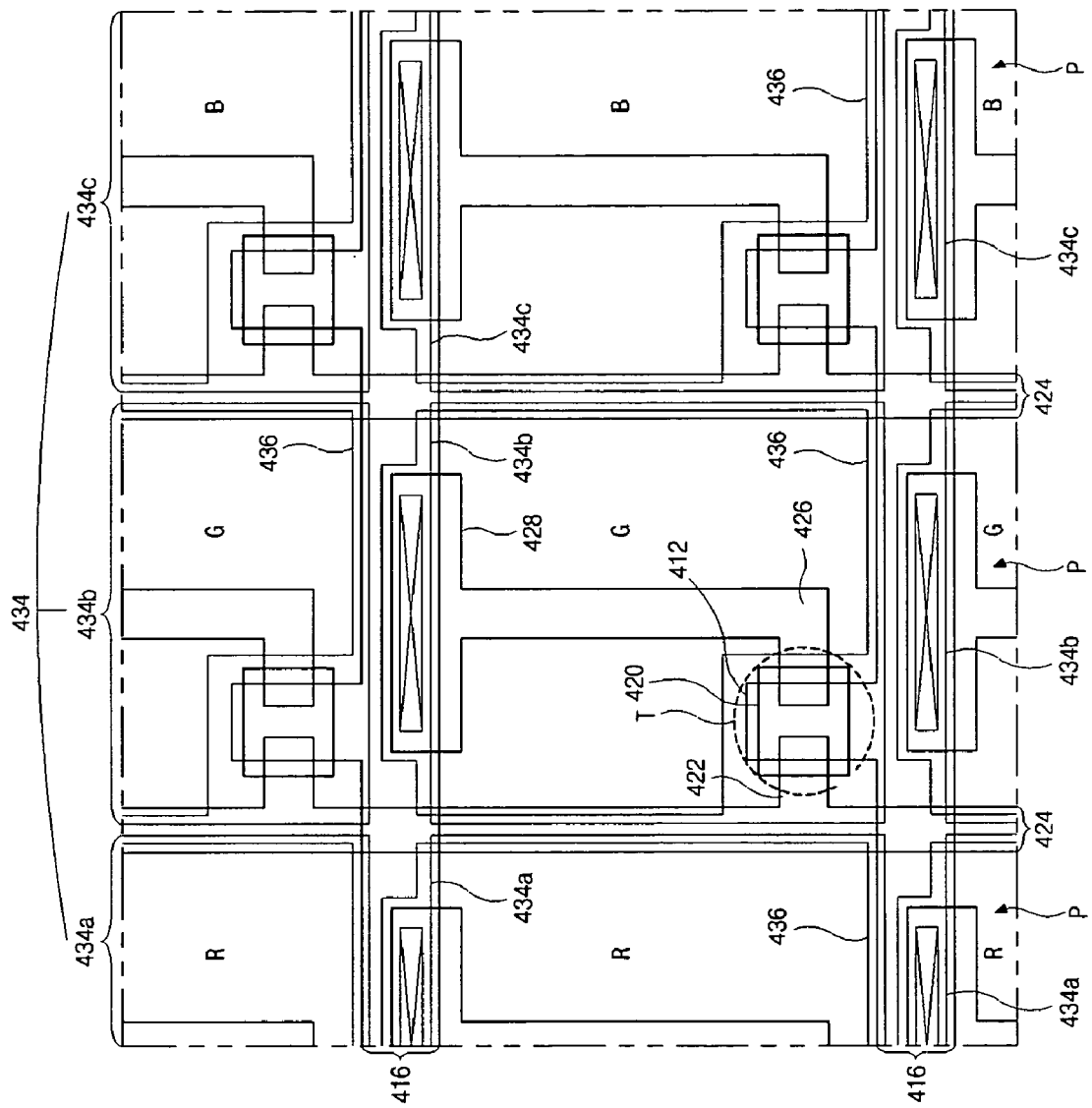
FIG. 13 shows a partial enlarged plane view of an array substrate having a color filter on a thin film transistor structure according to a fourth embodiment of the invention.

FIG. 13 shows a partial enlarged plane view of an array substrate having a color filter on a thin film transistor structure according to a fourth embodiment of the invention. The array substrate of this fourth embodiment has a structure similar to the previously described embodiments. However, the drain electrode has a different profile, and the drain contact hole does not exist.

As shown in FIG. 13, the array substrate includes multiple gate lines 416 disposed in a transverse i.e., latitudinal, direction and multiple data lines 424 disposed in a longitudinal direction. The gate lines 416 and the data lines 424 cross one another and define pixel regions P. A thin film transistor T is formed at each intersection of the gate line 416 and the data line 424. The thin film transistor T includes a gate electrode 412, an active layer 420, a source electrode 422, and a drain electrode 426. The drain electrode can have an "L" shape. A capacitor electrode .428 overlaps a portion of the gate line 416 and constitutes a storage capacitor with that overlapped portion and an interposed insulator. The capacitor electrode 328 functions as one electrode of the storage capacitor, and the overlapped portion of the gate electrode 416 functions as the other electrode of the storage capacitor.

In the fourth embodiment, the gate electrode 412 extends from the gate line 416, and the source electrode 422 extends from the data line 424, similar to the previous embodiments. However, the drain electrode 426 has a different shape. The drain electrode 426 is spaced apart from the source electrode 422 across the gate electrode 412, and the drain electrode 426 also extends to cross the pixel region P to the capacitor electrode 428. Namely, the drain electrode 426 is connected to the capacitor electrode 428.

FIG. 13 also shows, a color filter layer 434 having multiple color filters 434a, 434b, and 434c that is located in the pixel regions P defined by the gate and data lines 416 and 424. Each of the color filters 434a-434c corresponds to each pixel region P and overlaps the thin film transistor T. In this embodiment, each of the color filters fully covers the pixel region P without the drain contact hole, and each of the color filters overlaps edge portions of the gate and data lines 416 and 424. Furthermore in the COT structure of the fourth embodiment, a black matrix is not used, but the color filter layer 434 covers and protects the thin film transistor T.

Figure 14A:
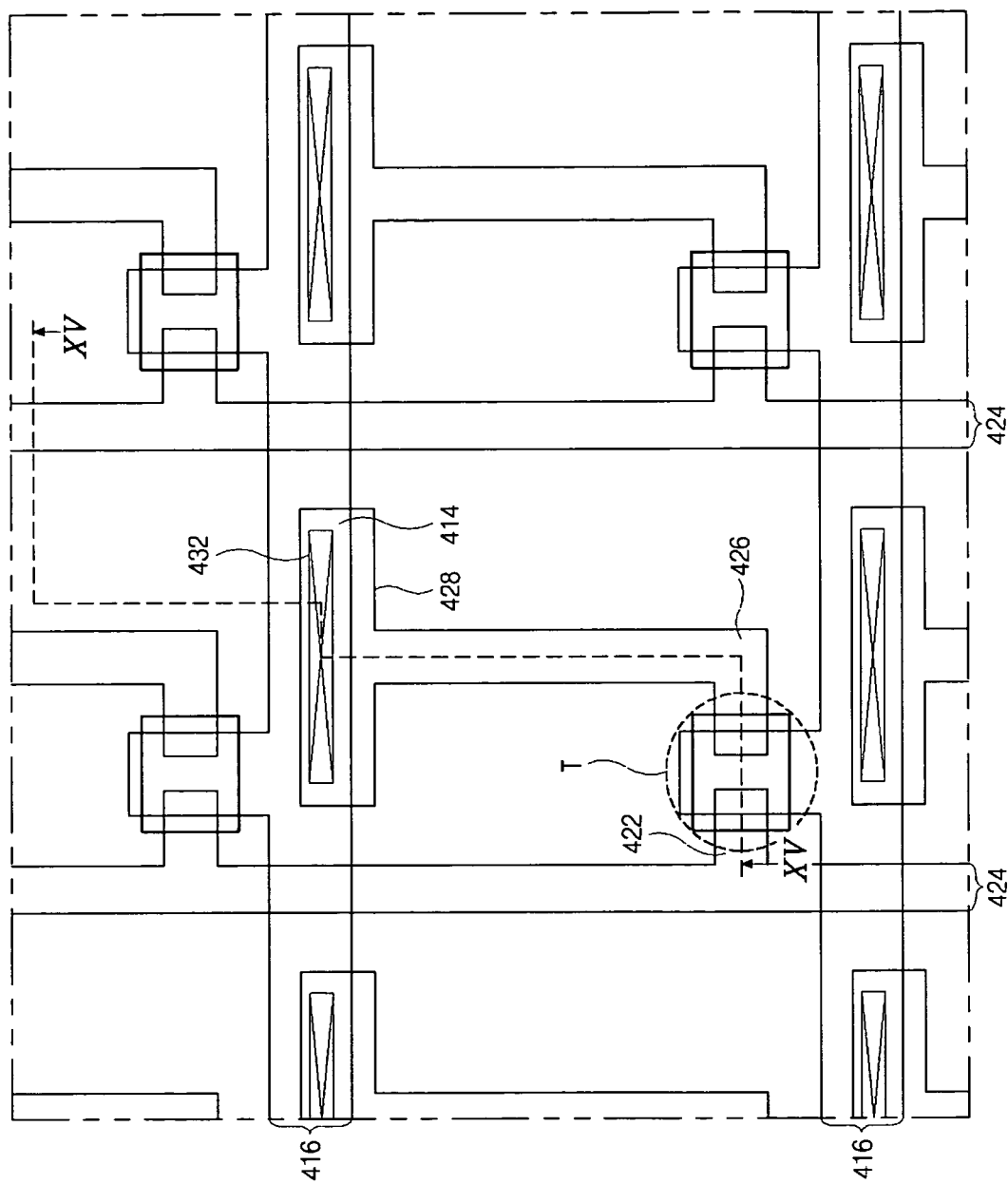
FIGS. 14A-14C show plan views illustrating the process steps of forming the array substrate of FIG. 13.
Figure 14B:
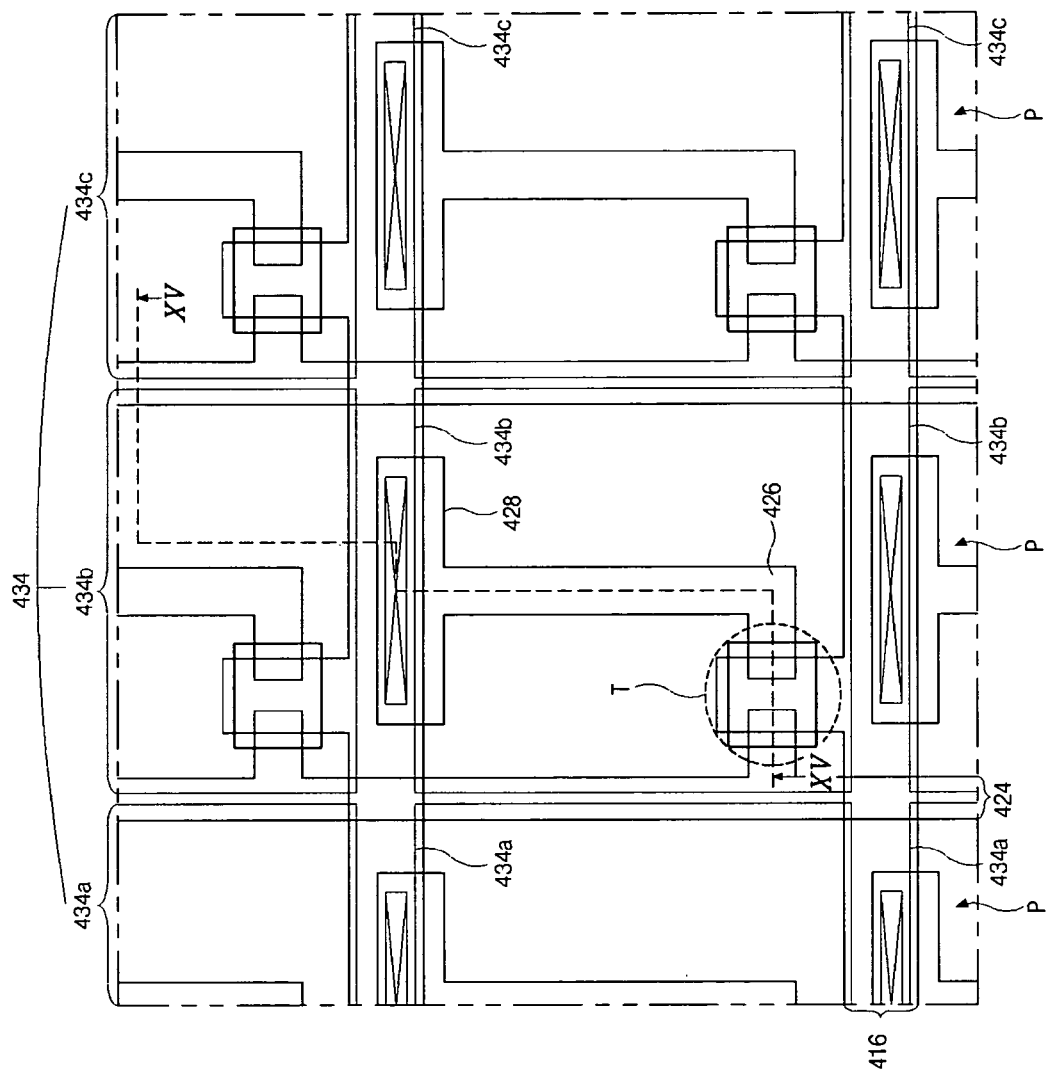
Figure 14C:
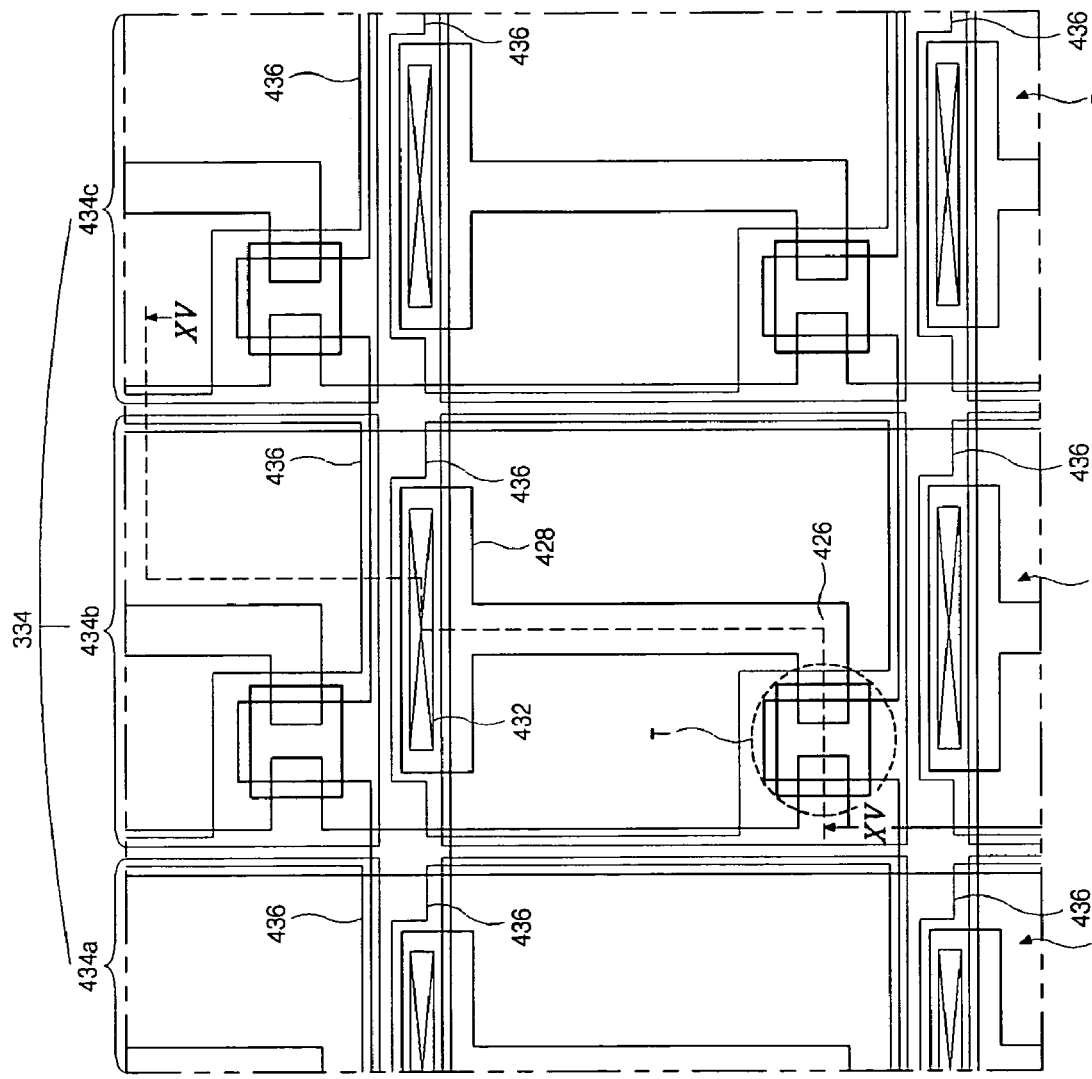

FIGS. 14A-14C show plan views illustrating the process steps of forming the array substrate of FIG. 13, and FIGS. 15A-15C are cross-sectional views taken along lines XV-XV of FIGS. 14A-14C, respectively, illustrating the process steps of fabricating the array substrate having a color filter on a thin film transistor (COT) structure according to the fourth embodiment of the invention.

Figure 15A:
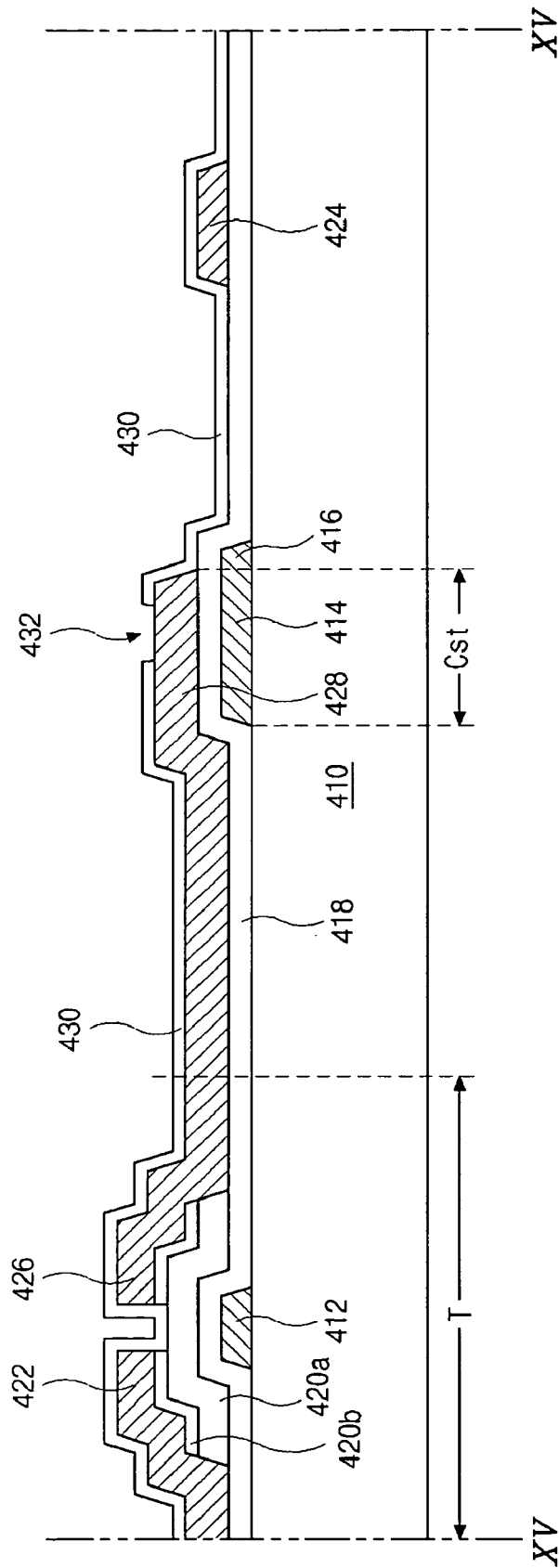
FIGS. 15A-15C show cross-sectional views taken along lines XV-XV of FIGS. 14A-14C, respectively, illustrating the process steps of fabricating the array substrate having a color filter on a thin film transistor (COT) structure according to the fourth embodiment of the invention.

FIGS. 14A and 15A show a first metal layer that is disposed over a substrate 410, and then patterned to from a gate line 416 and a gate electrode 412. Thereafter, a gate insulation layer 418 (a first insulating layer) is formed over the substrate 410 to cover the gate line 416 and the gate electrode 412. After that, an intrinsic amorphous silicon layer (a-Si:H) and then an n+-doped amorphous silicon layer (n+a-Si:H) are sequentially deposited over the entire surface of the gate insulation layer 418, and then the layers are simultaneously patterned to form an active layer 420a and an ohmic contact layer 420b. The active layer 420a is over the gate insulation layer 418, especially over the gate electrode 412, and the ohmic contact layer 420b is then located on the active layer 420a.

After forming the active layer 420a and the ohmic contact layer 420b, a second metal layer is deposited over the substrate 410, and the second metal layer is patterned to form a source electrode 422, a drain electrode 426, a data line 424, and a capacitor electrode 428. The second metal layer may be formed of one of chromium (Cr), copper (Cu), molybdenum (Mo), or an alloy of any combination thereof. The data line 424 crosses the gate line 416 and defines a pixel region P with the gate line 416. The source electrode 422 extends from the data line 424 and contacts one portion of the ohmic contact layer 420b. The drain electrode 426 is spaced apart from the source electrode 422, across from the gate electrode 412 and then contacts the other portion of the ohmic contact layer 420b. Additionally, the drain electrode 426 extends along through the pixel region P and connects to the capacitor electrode 428 that overlaps a portion 414 of the gate line 416. Unlike the previously described drain electrodes, the drain electrode 426 of the fourth embodiment communicates with the capacitor electrode 428.

After patterning the second metal layer, a portion of the ohmic contact layer 420b between the source and drain electrodes 422 and 426 is etched by using the source and drain electrodes 422 and 426 as masks, and a thin film transistor T and a storage capacitor $C_{ST}$ are complete. Wet or dry etching methods can be used. As described with reference to FIG. 13, the thin film transistor T includes the gate electrode 412, the active layer 420a, the ohmic contact layer 420b, the source electrode 422, and the drain electrode 426. Also, the storage capacitor $C_{ST}$ includes the portion 414 of the gate line 416, the capacitor electrode 428, and the interposed first insulator 418.

FIGS. 14A and 15A also show a second insulating layer 430 that is deposited over the entirety of the substrate 410 to cover the patterned second metal layer. The second insulating layer 430 may be formed of any suitable material such as silicon nitride ($SiN_x$) or silicon oxide ($SiO_2$). Patterning the second insulating layer 430 forms a capacitor contact hole 432 that exposes a portion of the capacitor electrode 428.

Figure 15B:
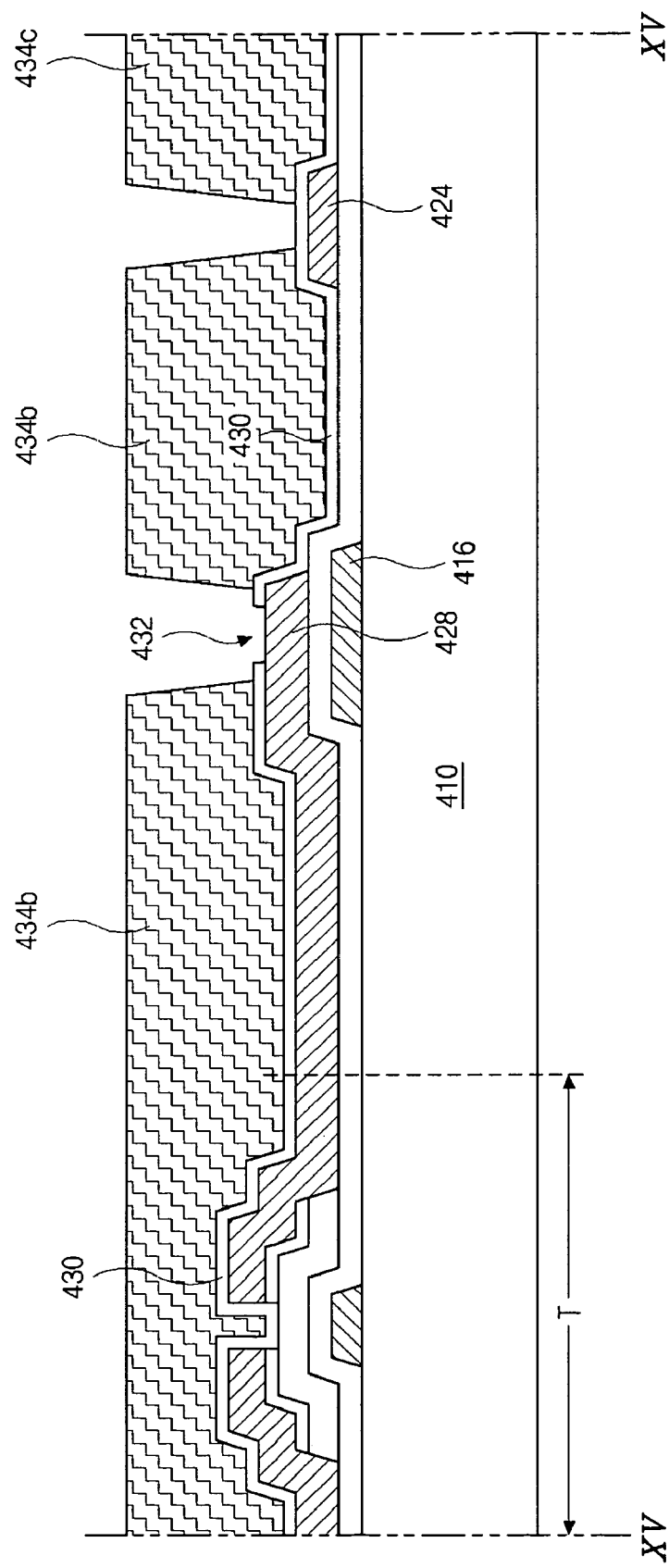
Figure 15C:
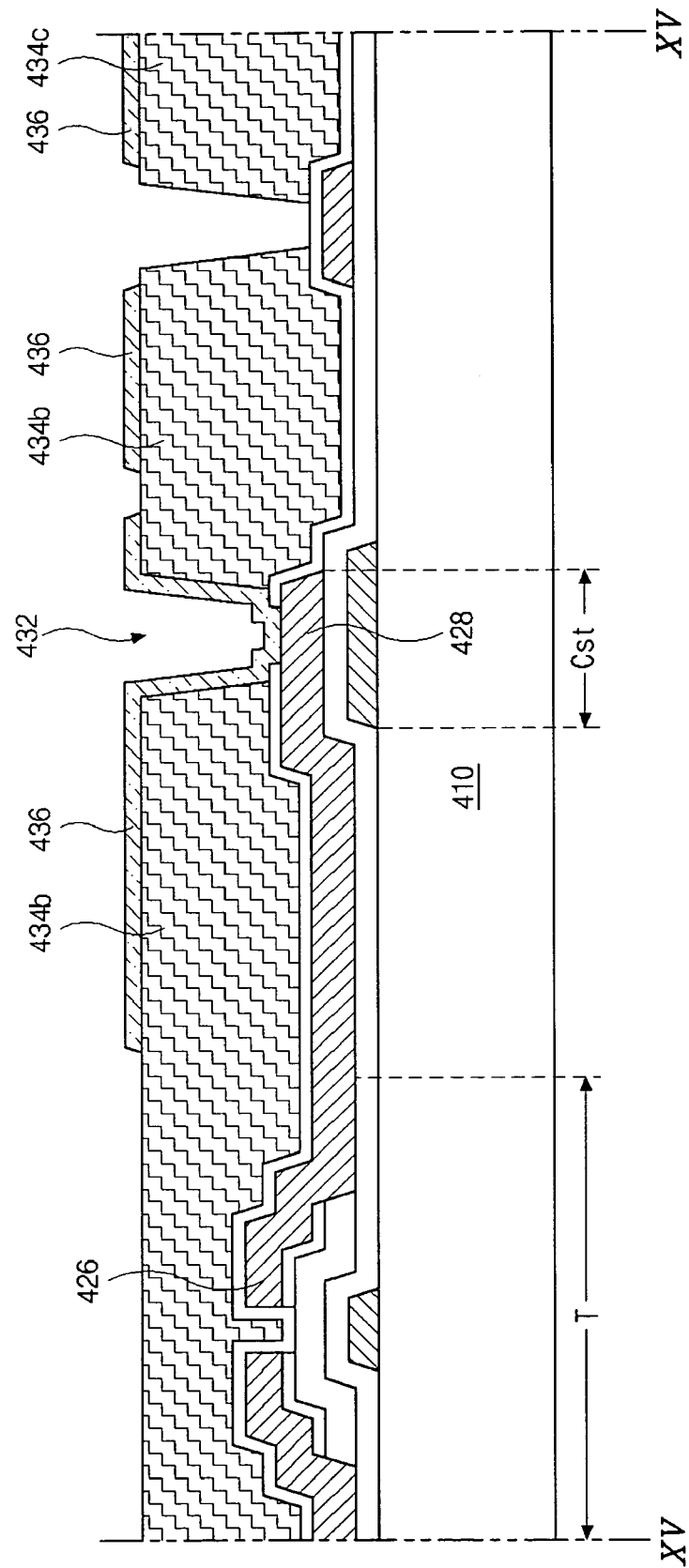

FIGS. 14B and 15B show a color resin that is formed over the second insulating layer 430 and then developed to form a color filter layer 434 having red, green and blue color filters 434a, 434b and 434c. Each of the color filters 434a-434c for displaying the full spectrum of colors has a rectangular pattern shape such that each of the color filters 434a-434c is formed to fully cover each pixel region P. Further, each of the color filters 434a-434c fully covers the thin film transistor T and the edge portions of the gate and data lines 416 and 424. The color filter layer 434 including the red, green and blue color filters 434a-434c does not fully cover the gate and data lines, such that it exposes the capacitor contact hole 432 exposing the portion of the capacitor electrode 428. Now in FIGS. 14C and 15C, a transparent conductive material, such as indium tin oxide (ITO) or indium zinc oxide (IZO), is deposited over the entire surface of the color filter layer 434 and then patterned to form a pixel electrode 436 that corresponds to the pixel region P. The pixel electrode 436 contacts the capacitor electrode 428 through the capacitor contact hole 432, such that pixel electrode 436 electrically communicates with the thin film transistor T through the capacitor electrode 428. In order to obtain a high aperture ratio, the pixel electrode 436 may overlap edge portions of the neighboring gate and data lines 416 and 424. The pixel electrode 436 extending over the previous gate line contacts the capacitor electrode 428 and makes a parallel connection with the storage capacitor $C_{ST}$.

According to the fourth embodiment illustrated with reference to FIGS. 13, 14A-14C and 15A-15C, since the drain electrode 426 is connected to the capacitor electrode 428 that contacts the capacitor electrode 436, the color filter layer 434 can fully cover the pixel region P, and drain contact is not required in both the insulator and the color filters. Furthermore, since each of the color filters 434a-434c covers the thin film transistor T, the black matrix may not be necessary in this embodiment. That is, a black matrix is not required.

Figure 16:
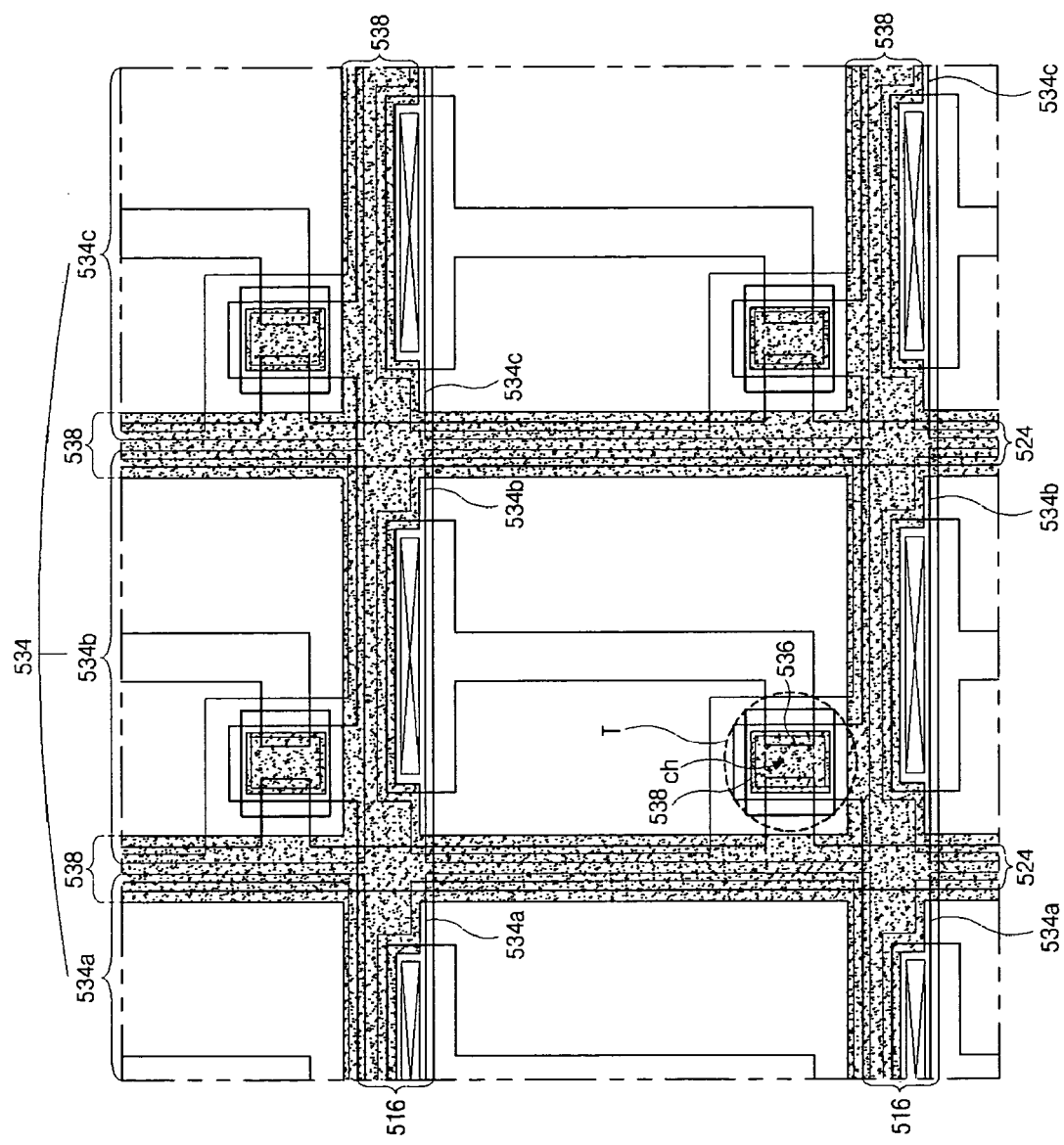
FIG. 16 shows a partial enlarged plane view of an array substrate having a color filter on a thin film transistor (COT) structure according to a fifth embodiment of the invention.

FIG. 16 shows a partial enlarged plane view of an array substrate having a color filter on a thin film transistor (COT) structure according to a fifth embodiment of the invention. Since the array substrate of the fifth embodiment is very similar to that of the forth embodiment, some of the detailed explanations are omitted.

FIG. 16 shows an array substrate that includes multiple gate lines 516 disposed in a transverse, i.e., latitudinal, direction and multiple data lines 524 disposed in a longitudinal direction. The gate lines 516 and the data lines 524 cross one another and define pixel regions P. A thin film transistor T is formed at each intersection of the gate line 516 and the data line 524. The thin film transistor T includes a channel ch through which carriers are transferred.

In the pixel regions P defined by the gate and data lines 516 and 524, a color filter layer 534 having color filters 534a, 534b, and 534c is located therein. In the fifth embodiment of the invention, each of the color filters 534a-534c corresponds to each pixel region P and overlaps portions of the gate and data lines 516 and 524, but the color filter layer 534 has an opening 536 exposing the channel ch of the thin film transistors T. Then, a black matrix 538 is disposed to cover the channel ch and the gate and data lines 516 and 524. Namely, the black matrix 538 fits into the opening 536 and into the spaces among the color filters 534a-534c along the gate and data lines 516 and 524. Unlike the fourth embodiment, the black matrix 538 and the color filter layer 534 are formed together in the array substrate. The black matrix 538 blocks the light incident to the thin film transistors T such that it protects the thin film transistors T from external impact and restrains undesirable photo-current occurrence in the thin film transistor.

FIGS. 17A-17D show plan views illustrating the process steps of forming the array substrate of FIG. 16, and FIGS. 18A-18D show cross-sectional views taken along lines XVIII-XVIII of FIGS. 17A-17D, respectively, illustrating the process steps of fabricating the array substrate having a color filter on a thin film transistor (COT) structure according to the fifth embodiment of the invention.

Figure 17A:
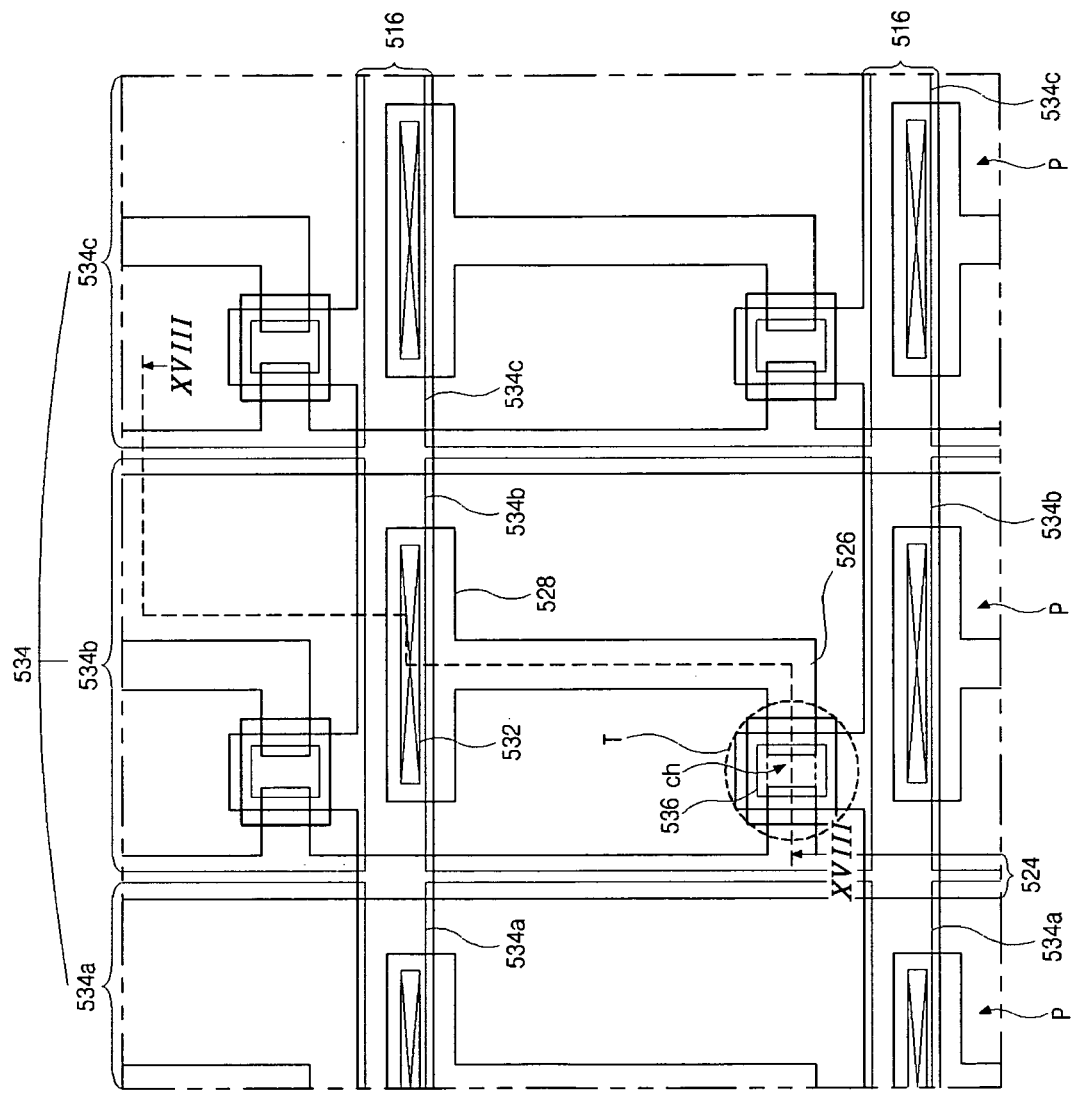
FIGS. 17A-17D show plan views illustrating the process steps of forming the array substrate of FIG. 16.
Figure 18A:
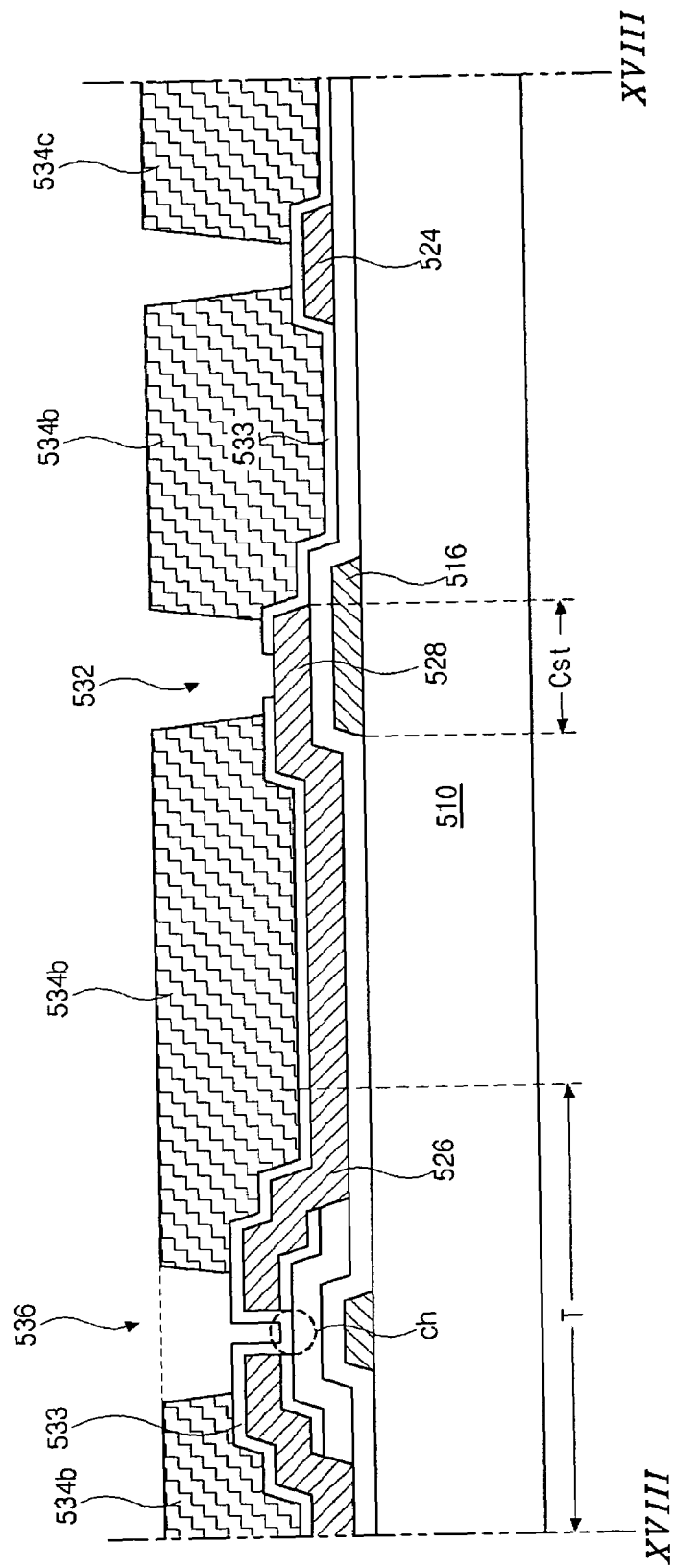
FIGS. 18A-18D show cross-sectional views taken along lines XVIII-XVIII of FIGS. 17A-17D, respectively, illustrating the process steps of fabricating the array substrate having a color filter on a thin film transistor (COT) structure according to the fifth embodiment of the invention.

In FIGS. 17A and 18A, there is first provided the array substrate fabricated in accordance to FIGS. 14A and 15A. Namely, the array substrate includes a thin film transistor T and a storage capacitor $C_{ST}$, and then a second insulating layer 533 is disposed over an entire surface of a substrate 510 to cover the thin transistor T and the storage capacitor $C_{ST}$. Similar to the fourth embodiment, a drain electrode 526 of the thin film transistor T extends along through the pixel region P and connects to a capacitor electrode 528 of the storage capacitor $C_{ST}$. The second insulating layer 533 has a first capacitor contact hole 532 exposing a portion of the capacitor electrode 528. A color filter layer 534 including red, green and blue color filters 534a-534c is disposed over the second insulating layer 533. Each of the color filters 534a-534c corresponds to and fully covers each pixel region P defined by gate and data lines 516 and 524, but also has an opening 536 that corresponds to the thin film transistor T. Especially, the opening 536 exposes the channel ch of the thin film transistor T. Moreover, the color filter layer 534 does not fully cover the gate line 516, and the capacitor electrode 528 is exposed by the first capacitor contact hole 532 and by the space between the color filters.

Figure 17B:
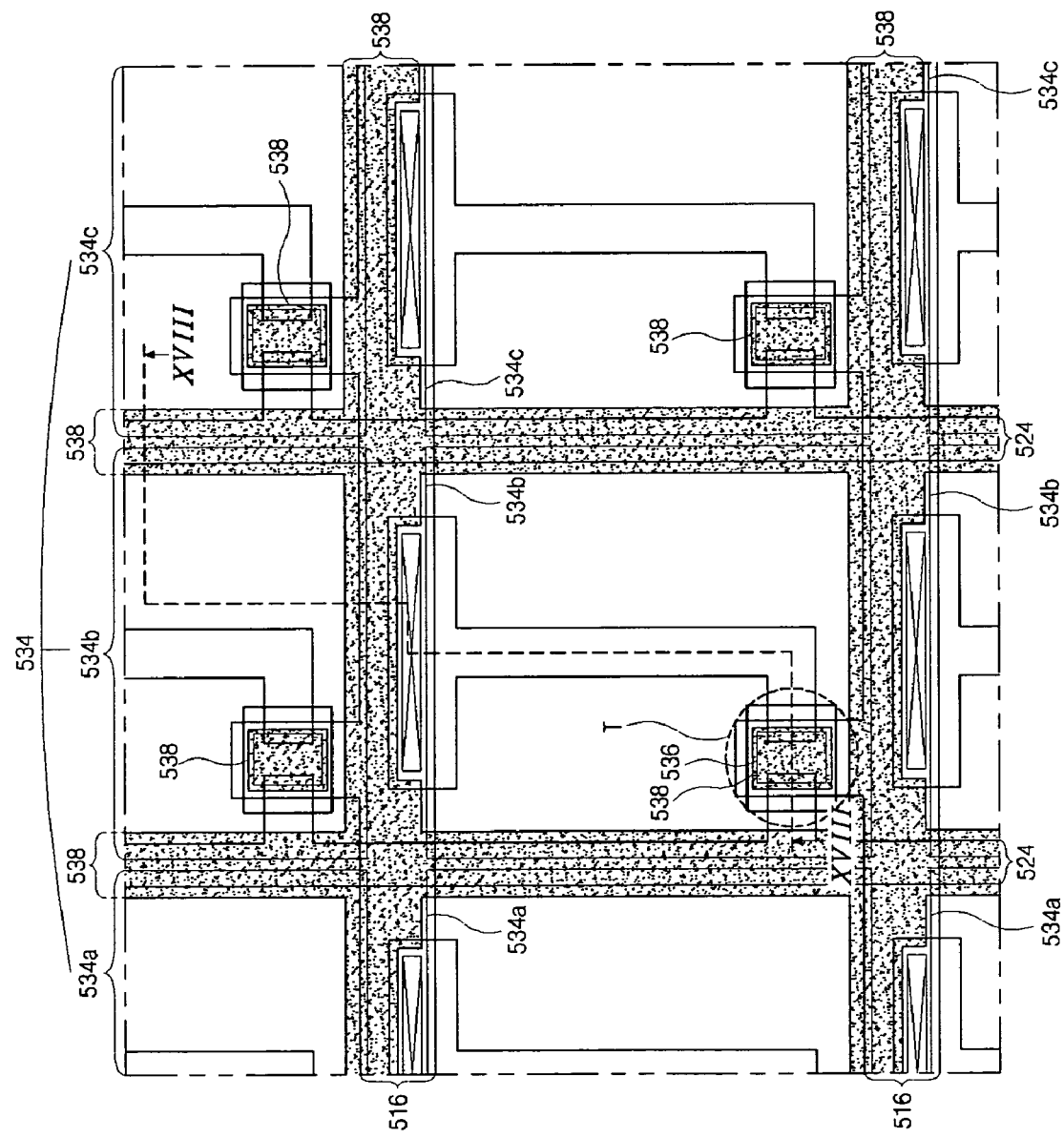
Figure 18B:
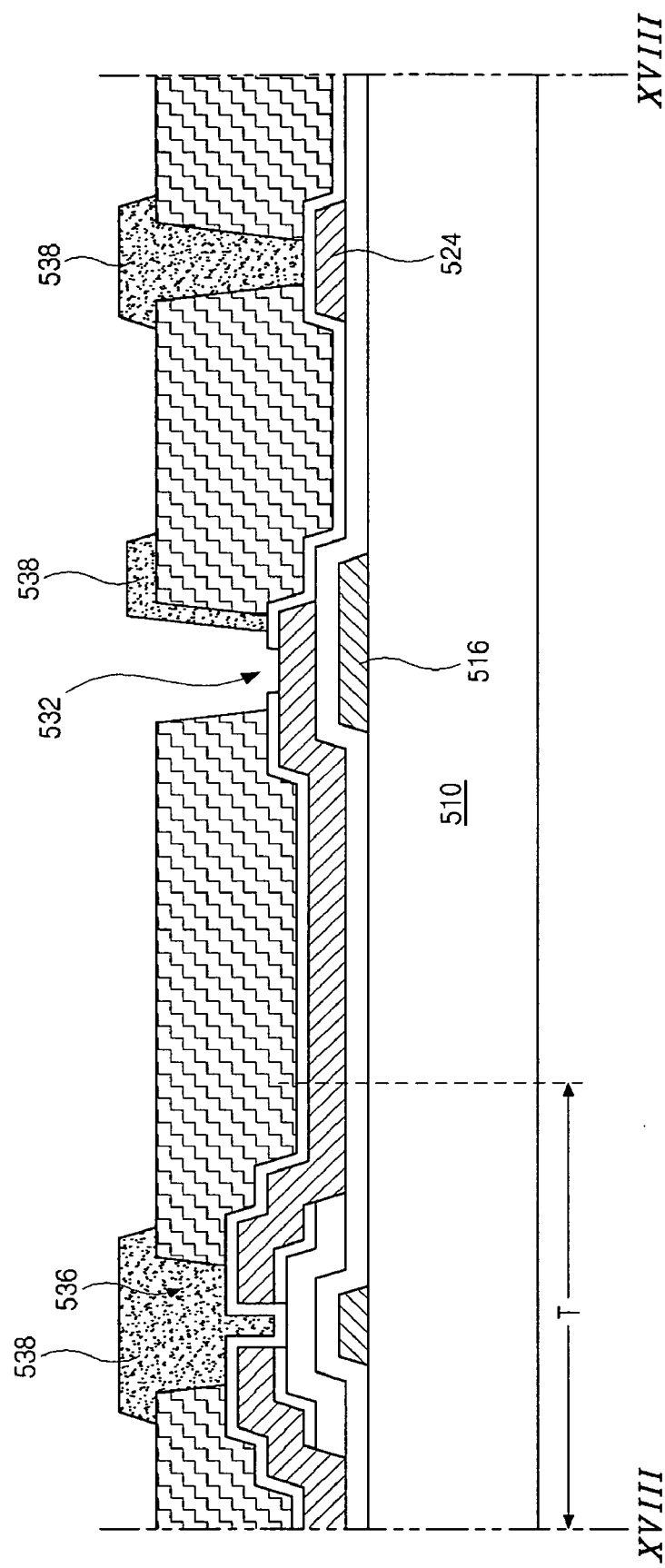

FIGS. 17B and 18B show a black matrix 538 that is formed to correspond to the thin film transistor T and the gate and data lines 516 and 524. Namely, an opaque material is formed over an entire of the substrate 510 to cover the color filter layer 534, and the opaque material is then patterned to form the black matrix 538. As shown in FIGS. 17B and 18B, the black matrix 538 fits into the opening 536 and into the space over the data line 524, but the black matrix 538 does not fit into the first capacitor contact hole 532. A portion of the black matrix 538 over the thin film transistor T protects the thin film transistor T and blocks incident light to prevent undesirable photo current from occurring in the channel ch.

Figure 17C:
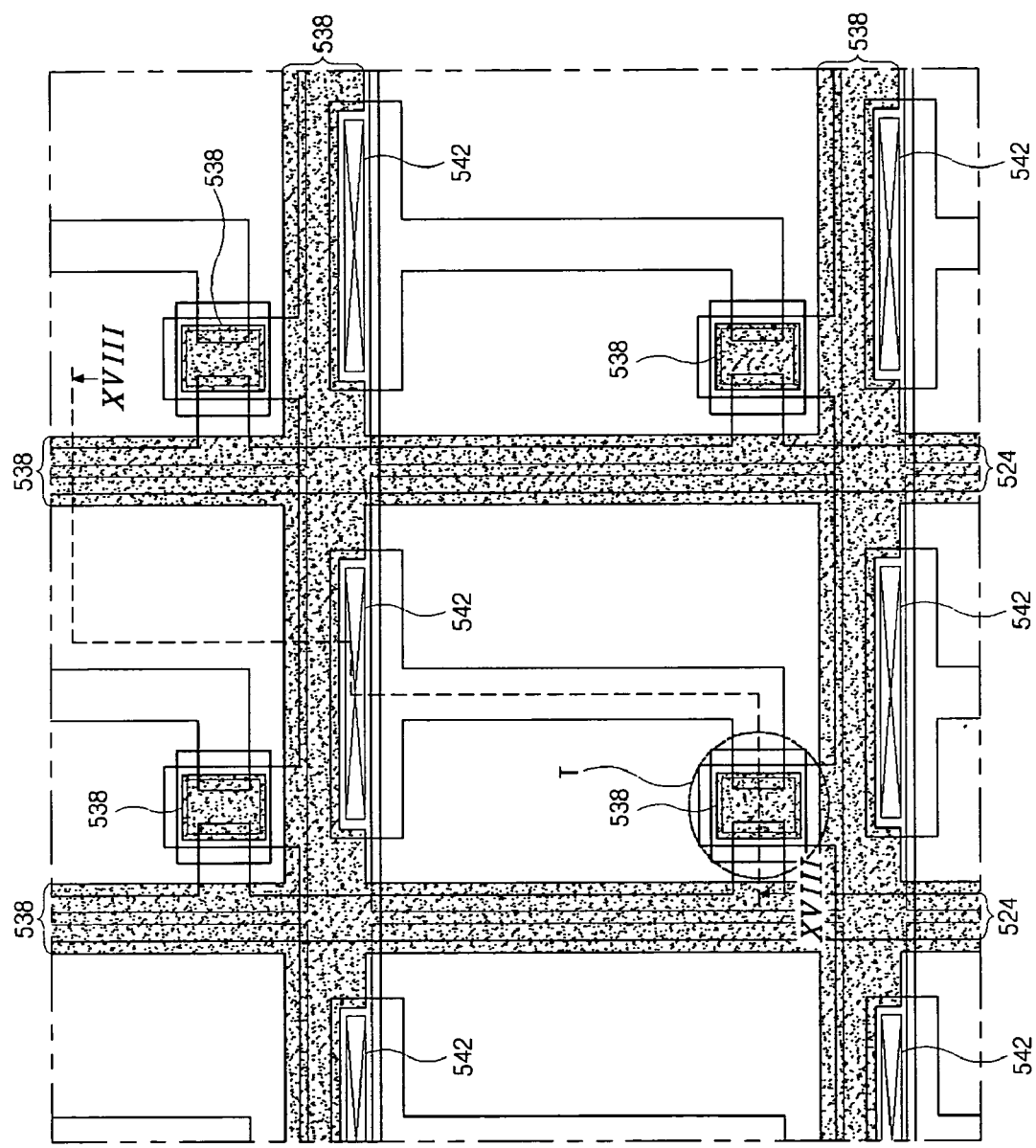
Figure 18C:
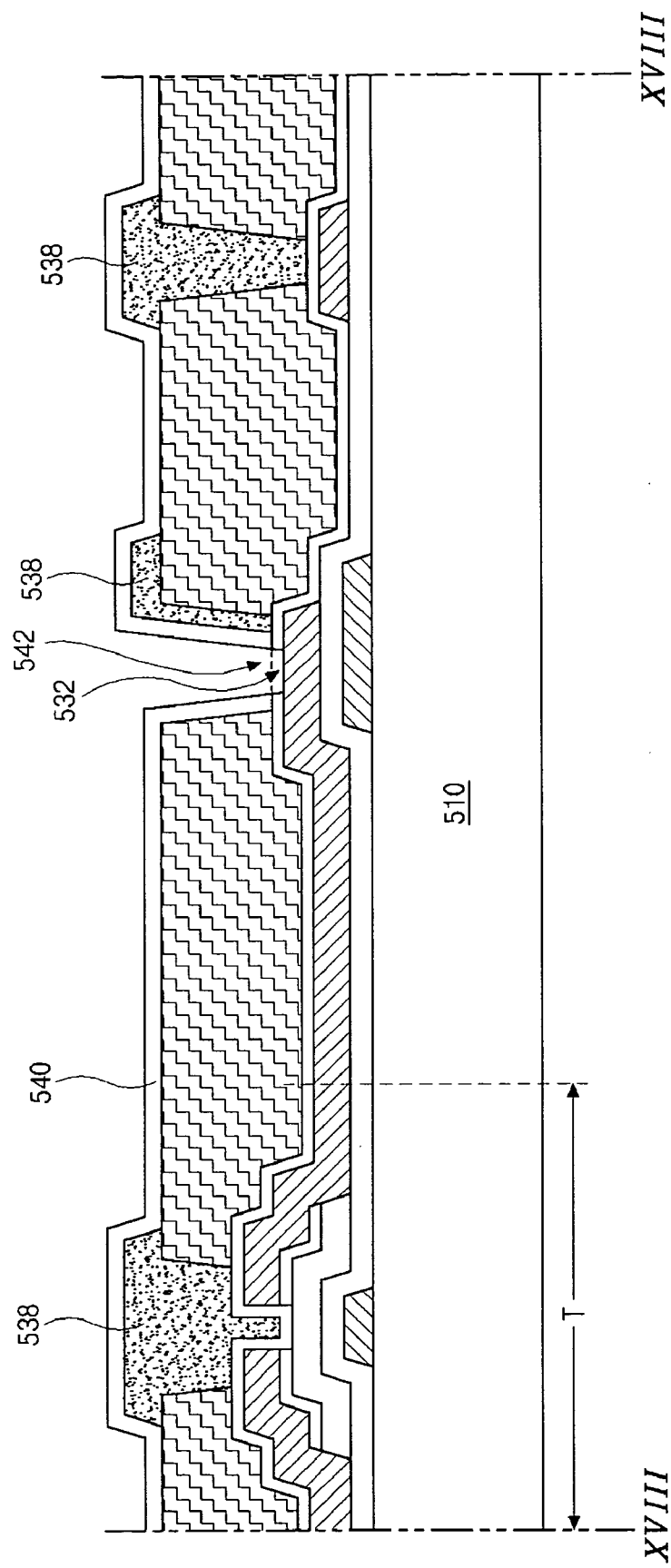

FIGS. 17C and 18C show a third insulating layer 540 having a low dielectric constant that is formed over the entire surface of the substrate 510 to cover the black matrix 538 and the color filter layer 534. Similar to the third embodiment, the third insulating layer 540 may be formed of any suitable inorganic insulating material, such as silicon nitride ($SiN_x$) or silicon oxide ($SiO_2$), or an organic material insulating material, such as benzocyclobutene (BCB), acrylic resin, methacrylic resin or polyolefin. Thereafter, the third insulating layer 540 is patterned to form a second capacitor contact hole 542 that corresponds to the first capacitor contact hole 532 such that it exposes the portion of the capacitor electrode 528.

Figure 17D:
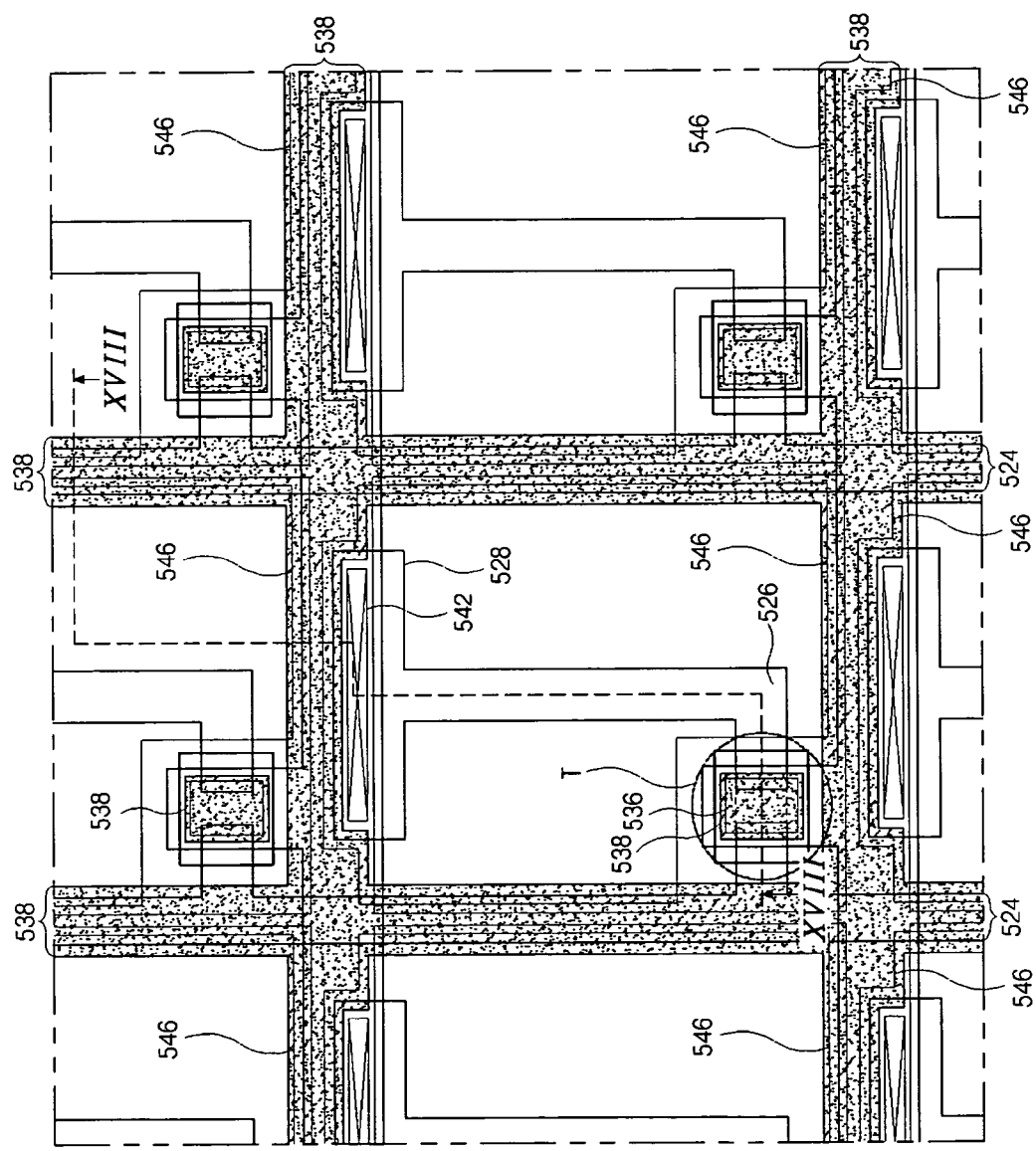
Figure 18D:
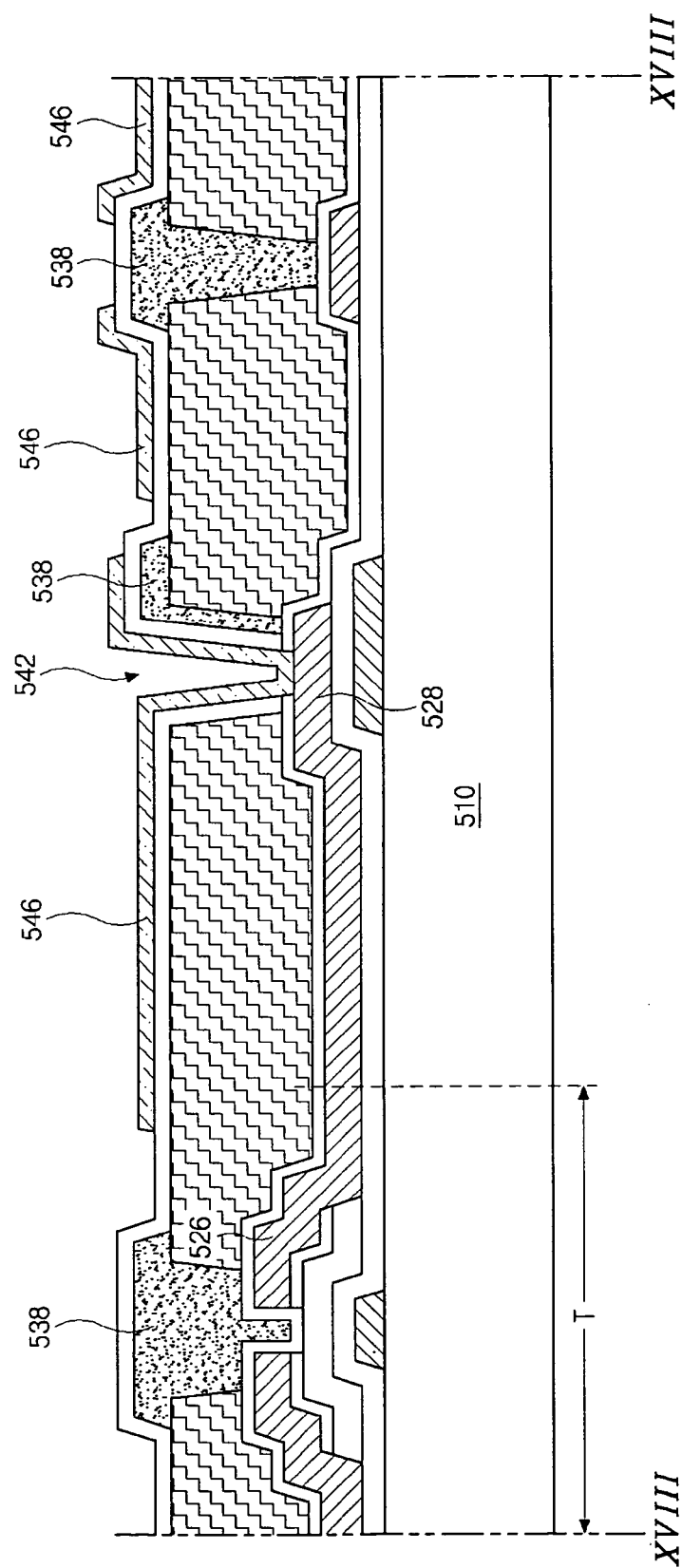

FIGS. 17D and 18D show that next a transparent conductive material, typically indium tin oxide (ITO) or indium zinc oxide (IZO), is deposited over the entire of the patterned third insulating layer 540, and the transparent conductive material is then patterned to form a pixel electrode 546 that corresponds to the pixel region P. The pixel electrode 546 contacts the capacitor electrode 528 through the capacitor contact hole 542. In order to obtain a high aperture ratio, the pixel electrode 546 overlaps edge portions of the neighboring gate and data lines 516 and 524. The pixel electrode 546 extending over the previous gate line contacts the capacitor electrode 528 and makes a parallel connection with the storage capacitor $C_{ST}$.

According to the fifth embodiment illustrated with reference to FIGS. 16, 17A-17D and 18A-18D, the drain electrode 526 is connected to the capacitor electrode 528 that is in contact with the capacitor electrode 546, and the color filter layer 534 and the underlying insulator therefore do not need to contact the drain. Therefore, the fabrication process can be more simplified.

Figure 19:
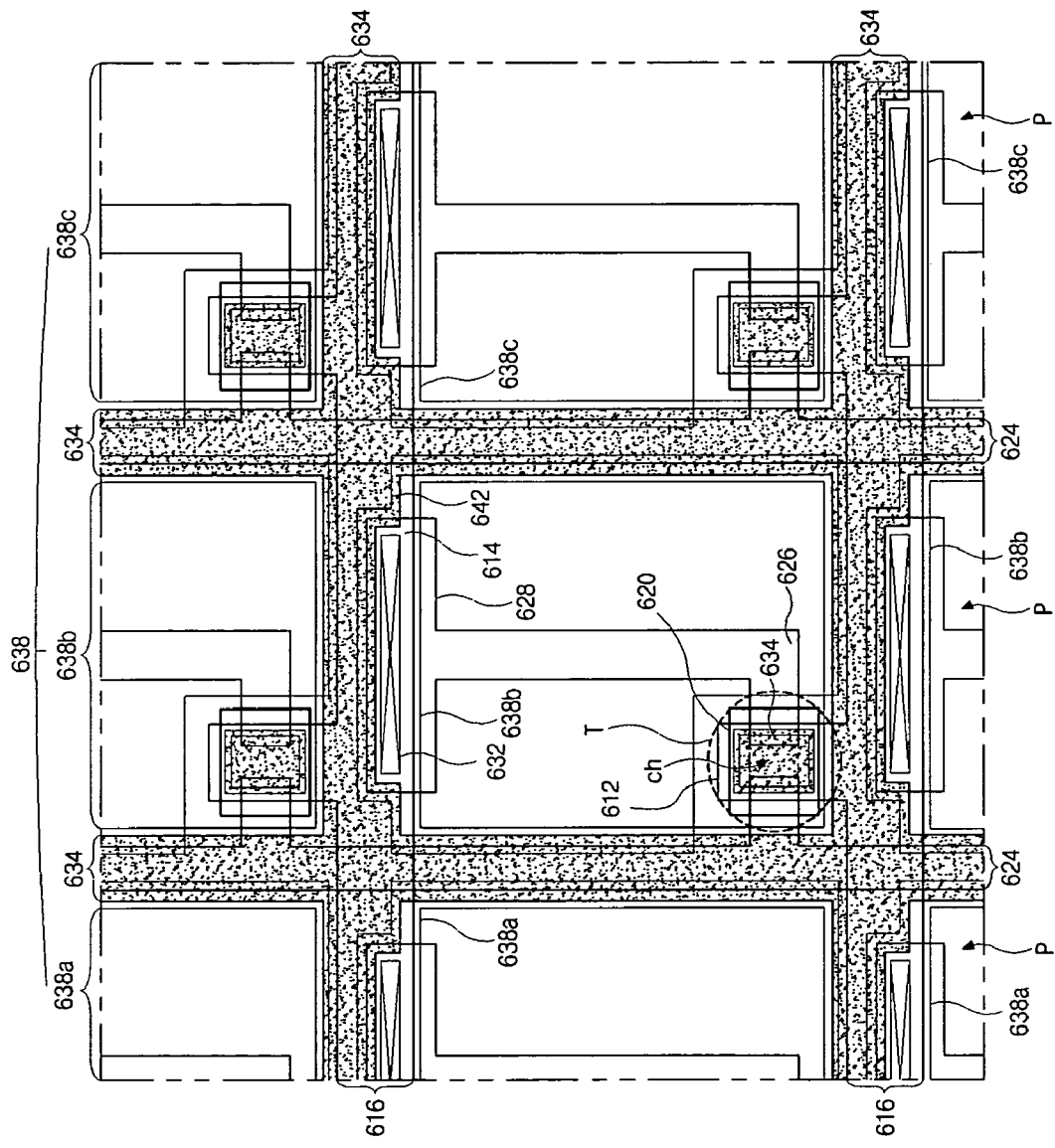
FIG. 19 shows a partial enlarged plane view of an array substrate having a color filter on a thin film transistor structure according to a sixth embodiment of the invention.

FIG. 19 shows a partial enlarged plane view of an array substrate having a color filter on a thin film transistor structure according to a sixth embodiment of the invention. The array substrate of this sixth embodiment has a structure similar to the fifth, but the drain electrode has different structure and profile.

FIG. 19 shows an array substrate that includes multiple gate lines 616 disposed in a transverse direction and multiple data lines 624 disposed in a longitudinal direction. The gate lines 616 and the data lines 624 cross one another and define pixel regions P. A thin film transistor T is formed at each intersection of the gate line 616 and the data line 624. The thin film transistor T includes a gate electrode 612, an active layer 620, a source electrode 622, and a drain electrode 626. A capacitor electrode 628 overlaps a portion of the gate line 616 and constitutes a storage capacitor with that overlapped portion and an interposed insulator interposed. The storage electrode 628 functions as one electrode of the storage capacitor, and the overlapped portion of the gate electrode 616 functions as the other electrode of the storage capacitor. The gate electrode 612 extends from the gate line 616, and the source electrode 622 extends from the data line 624. The drain electrode 426 is spaced apart from the source electrode 622 across the gate electrode 612, and the drain electrode 626 also crosses through the pixel region P and extends to the capacitor electrode 628. Namely, the drain electrode 626 connects to the capacitor electrode 628.

A black matrix 634 is disposed over the gate and data lines 616 and 624. The black matrix 634 is also disposed over the thin film transistor T while covering the channel ch such that it prevents undesirable photo current from occurring in the thin film transistor T. A portion of the black matrix 634 disposed over the thin film transistor T prevents entry of the incident light and protects the thin film transistor T from external impact.

Within the pixel regions P, which are defined by the gate lines and data lines 616 and 624, red (R), green (G), and blue (B) color filters 638a, 638b, and 638c may be located therein. Each of the color filters 638a-638c covers the thin film transistor T, but the color filters do not overlap the channel ch between the source and drain electrodes 622 and 626. Instead the color filter layer 638, a portion of the black matrix 634 overlaps the channel ch of the thin film transistor T.

In addition, a pixel electrode 642 is disposed to correspond to each pixel region P. In this sixth embodiment of the invention, the pixel electrode 642 has a double-layered structure that includes first and second pixel electrodes. The first pixel electrode and the second pixel electrode may superficially appear to have similar shapes, but they may have dissimilar cross sectional shapes, as shown in FIG. 21D. That is, the first pixel electrode 636 has an indented or bowl shape, but the second pixel electrode 640 has a planar or lid shape. The edges of the first and second pixel electrodes are bent at angles so as to allow them to readily fit together.

Although not shown in FIG. 19, but shown in FIG. 21D, the first pixel electrode 636 may be disposed beneath each of the color filters 638a-638c and may also contact the capacitor electrode 628, and the second pixel electrode 640 may be disposed over each of the color filters 638a-638c and may contact the first pixel electrode 636. For example, each of the color filters 638a-638c may be located between the first and second pixel electrodes 636 and 640, and the second pixel electrode 640 may electrically communicate with the thin film transistor T through the first pixel electrode 636 and through the capacitor electrode 628.

In FIG. 19, a storage capacitor $C_{ST}$ may be included within a portion of the gate line 616 and the capacitor electrode 628. Accordingly, the portion of the gate line 616 may function as a first electrode of the storage capacitor $C_{ST}$, and the capacitor electrode 628 may function as a second electrode of the storage capacitor $C_{ST}$. In addition, since the pixel electrode 642 electrically contacts the capacitor electrode 628, it has a parallel electric connection with the storage capacitor $C_{ST}$.

FIGS. 20A-20DC show plan views illustrating the process steps of forming the array substrate of FIG. 19, and FIGS. 21A-21D show cross-sectional views taken along lines XXI-XXI of FIGS. 20A-20D, respectively, illustrating the process steps of fabricating the array substrate having a color filter on a thin film transistor (COT) structure according to the sixth embodiment of the invention.

Figure 20A:
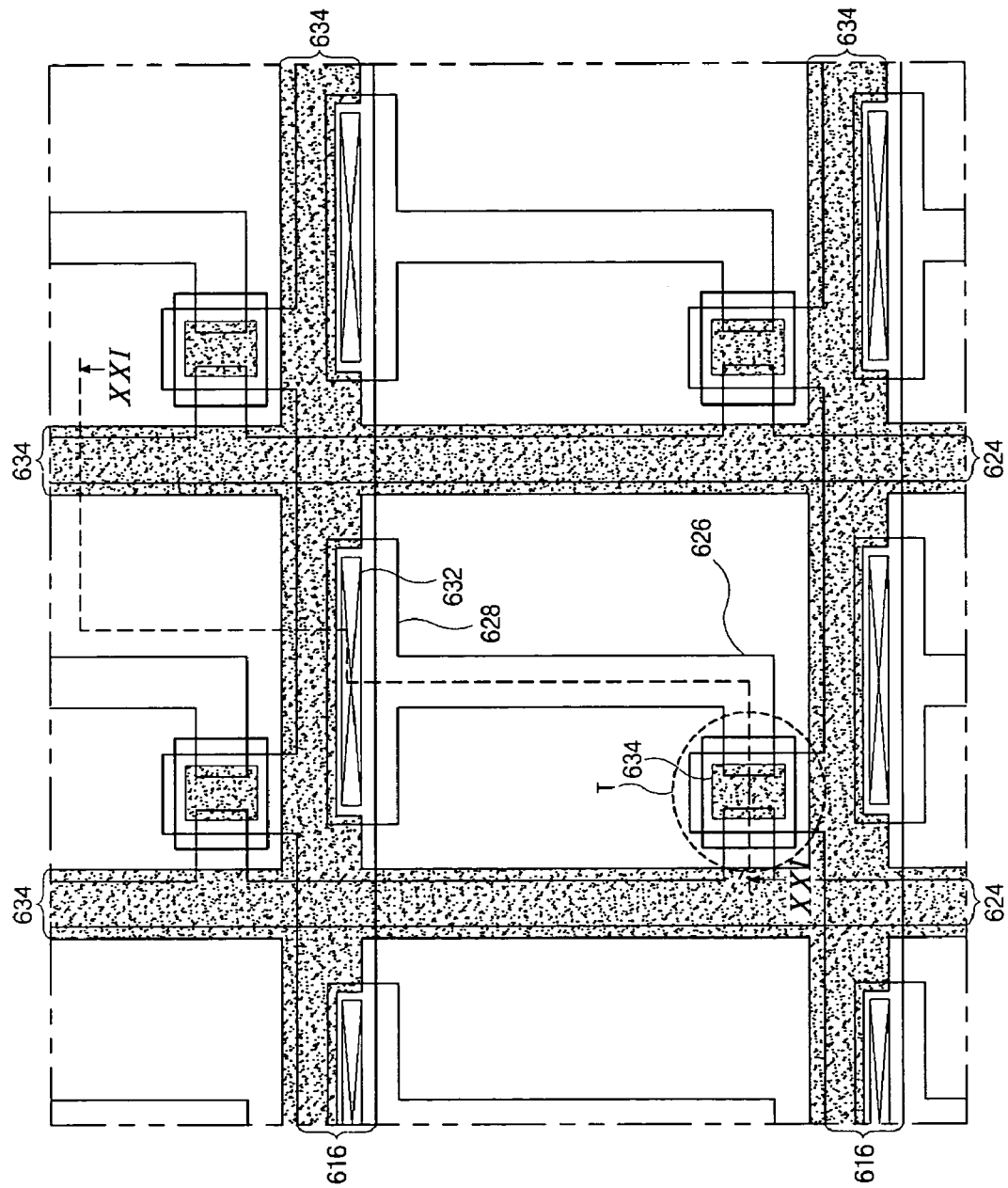
FIGS. 20A-20D show plan views illustrating the process steps of forming the array substrate of FIG. 19.
Figure 21A:
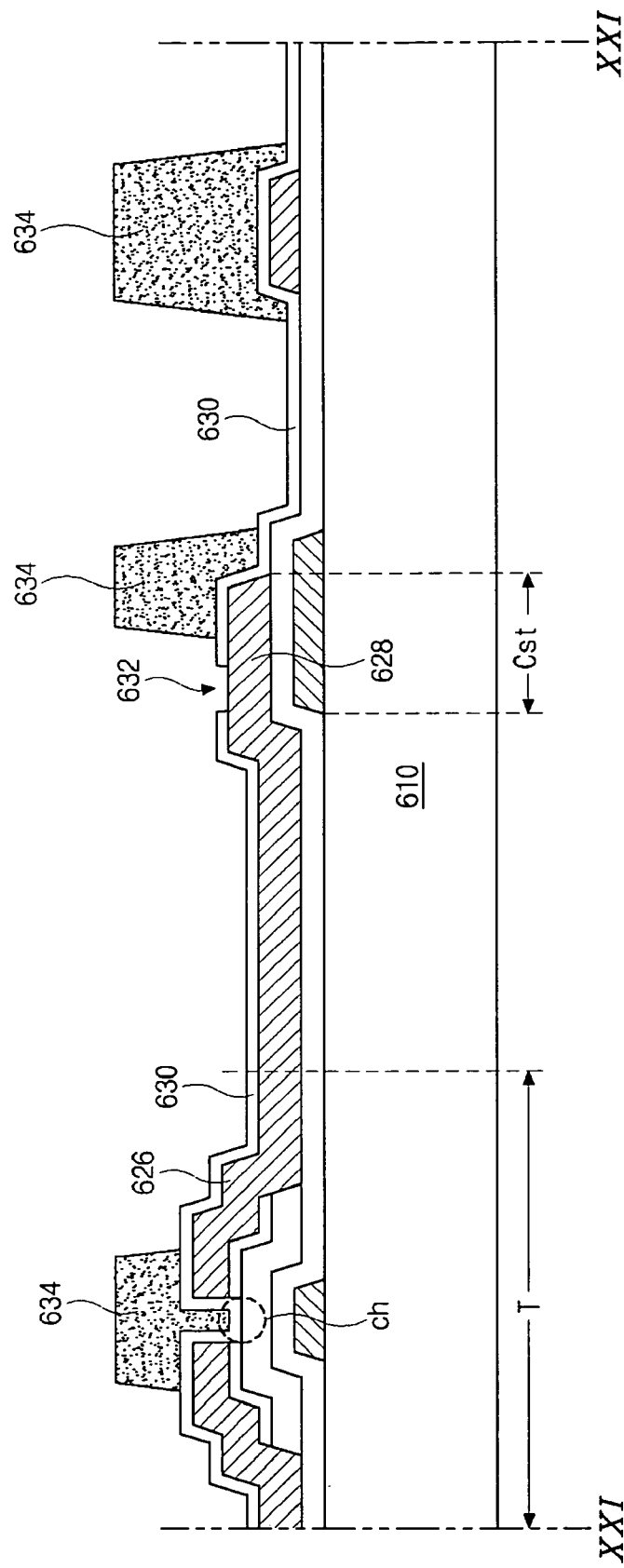
FIGS. 21A-21D show cross-sectional views taken along lines XXI-XXI of FIGS. 20A-20D, respectively, illustrating the process steps of fabricating the array substrate having a color filter on a thin film transistor (COT) structure according to the sixth embodiment of the present invention.

In FIGS. 20A and 21A, there is first provided the array substrate fabricated in accordance with FIGS. 14A and 15A. Namely, the array substrate includes a thin film transistor T and a storage capacitor $C_{ST}$, and then a second insulating layer 630 is disposed over an entire surface of a substrate 610 to cover the thin transistor T and the storage capacitor $C_{ST}$. Similar to the fourth and fifth embodiments, a drain electrode 626 of the thin film transistor T extends along through the pixel region P and is connected to a capacitor electrode 628 of the storage capacitor $C_{ST}$. The second insulating layer 630 has a capacitor contact hole 632 exposing a portion of the capacitor electrode 628. After patterning the second insulating layer 630, a black resin is formed over the second insulation layer 630, and the black resin is then developed to form a black matrix 634 on the second insulating layer 630. The black matrix 634 positionally corresponds to the thin film transistor T and the gate and data lines 616 and 624, but the black matrix does not overlap or fit into the capacitor contact hole 632, and a portion of the capacitor electrode 628 remains exposed. A portion of the black matrix 634 over the thin film transistor T protects the thin film transistor T and blocks incident light to prevent undesirable photo current from occurring in the channel ch.

Figure 20B:
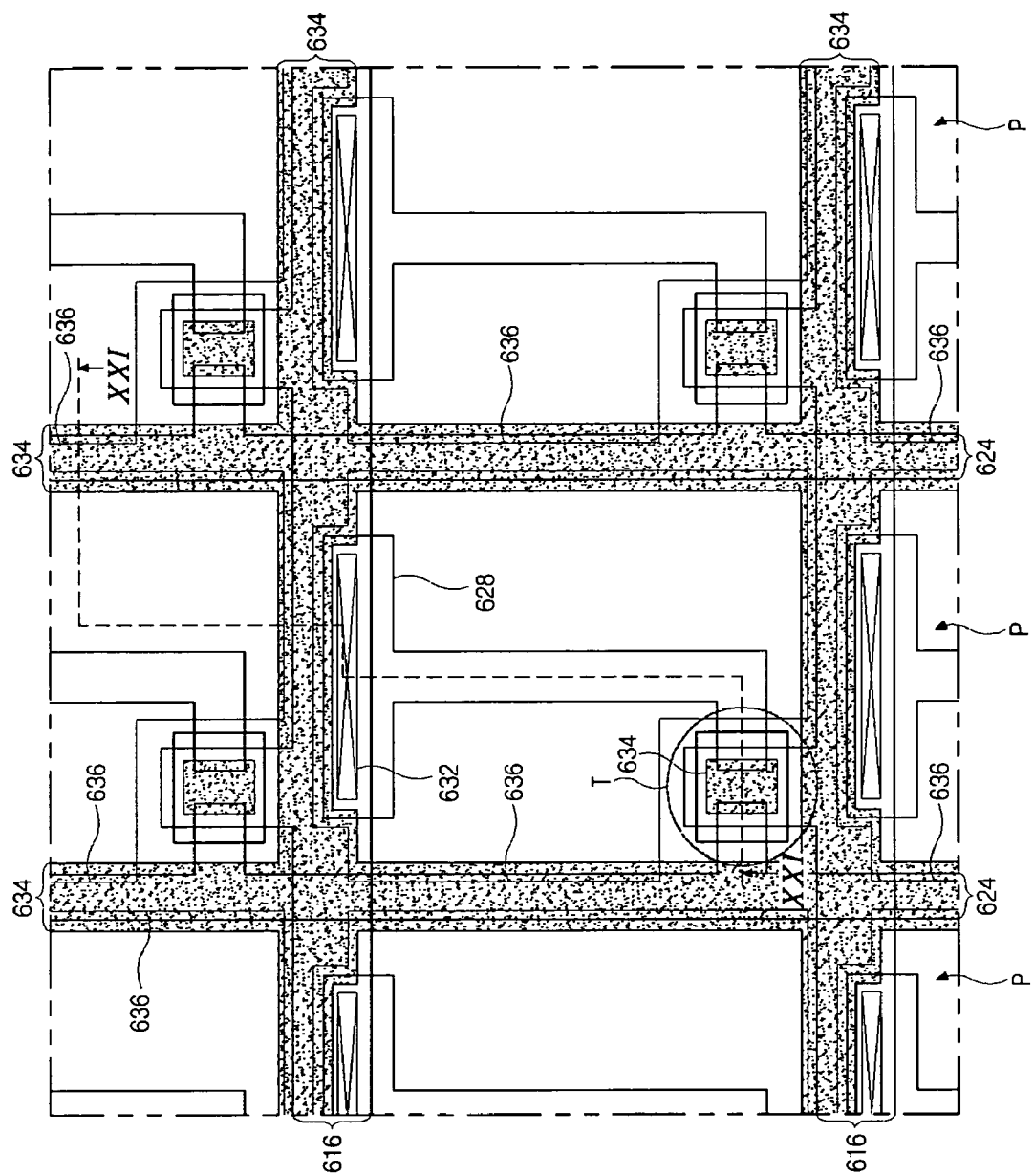
Figure 21B:
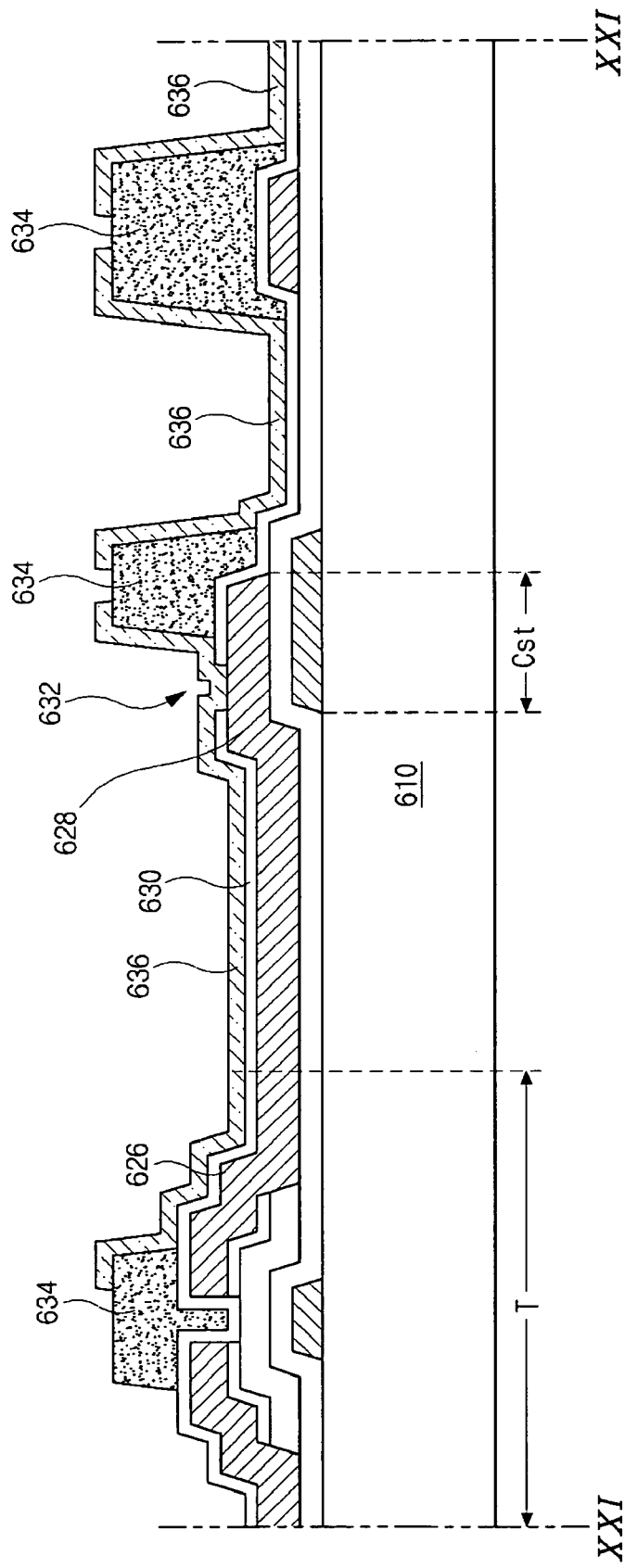

FIGS. 20B and 21B show a first transparent conductive material that is deposited on and over an entire of the second insulating layer 630 to cover the black matrix 634. Thereafter, the deposited first transparent conductive material is patterned to form a first pixel electrode 636. The first pixel electrode 636 has a position corresponding to, i.e., opposite to, the pixel region P, and overlaps edge portions of the black matrix 634. Additionally, the first pixel electrode 636 overlaps and contacts the capacitor electrode 628 through the capacitor contact hole 632 of the storage capacitor $C_{ST}$.

Figure 20C:
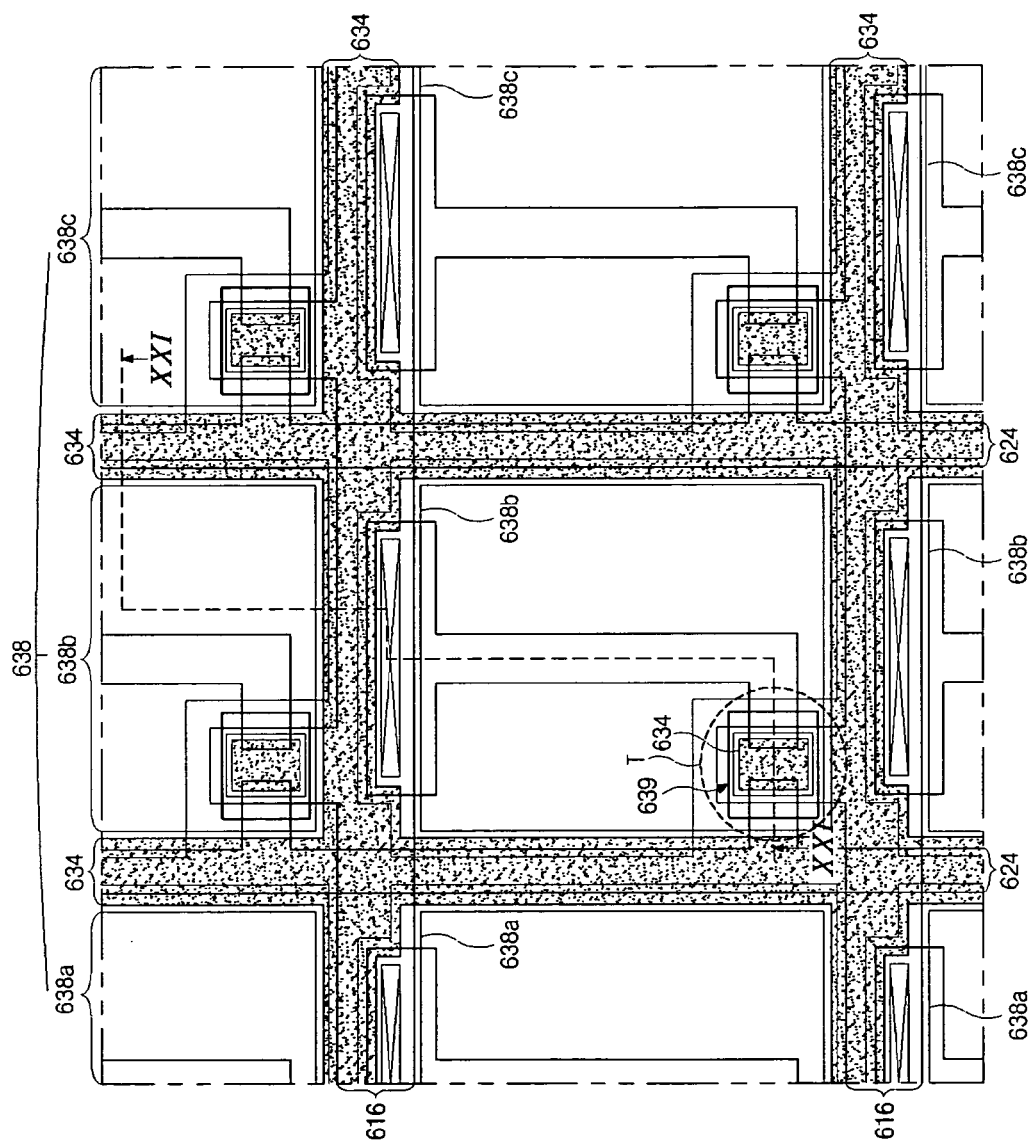
Figure 21C:
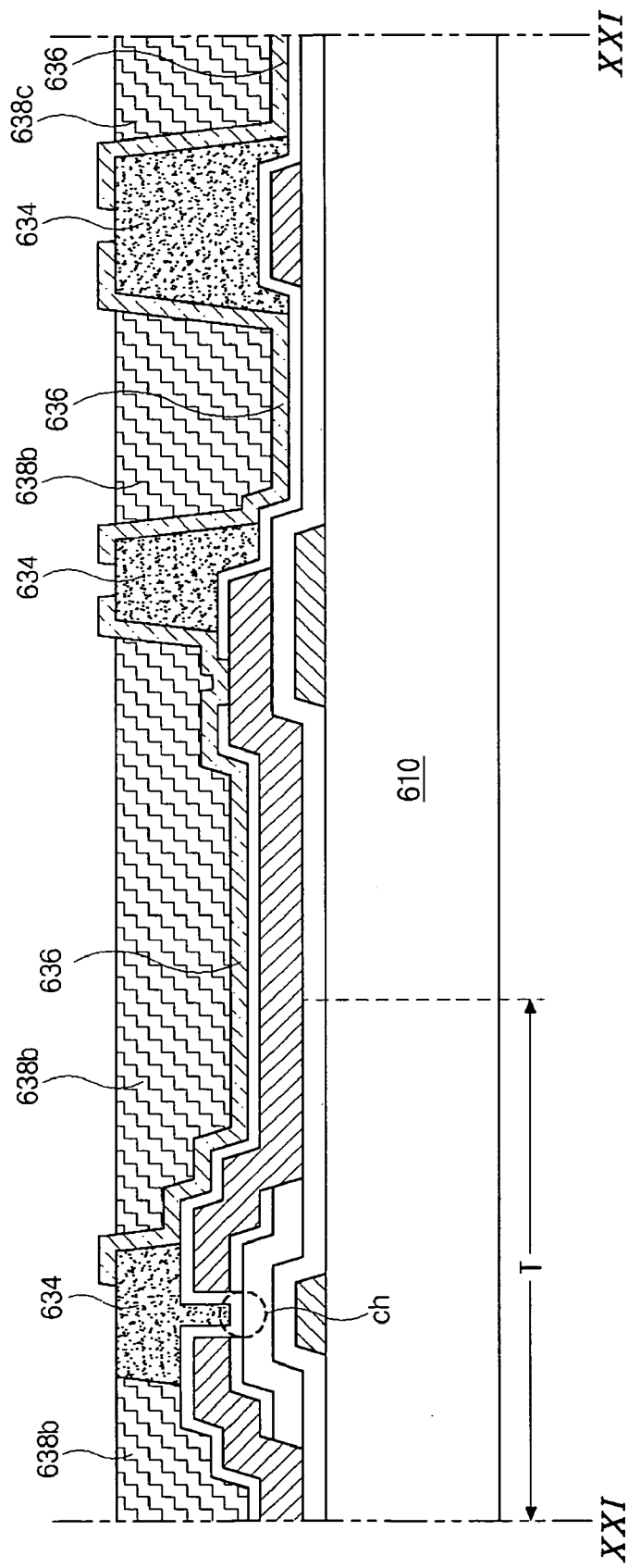
Figure 21D:
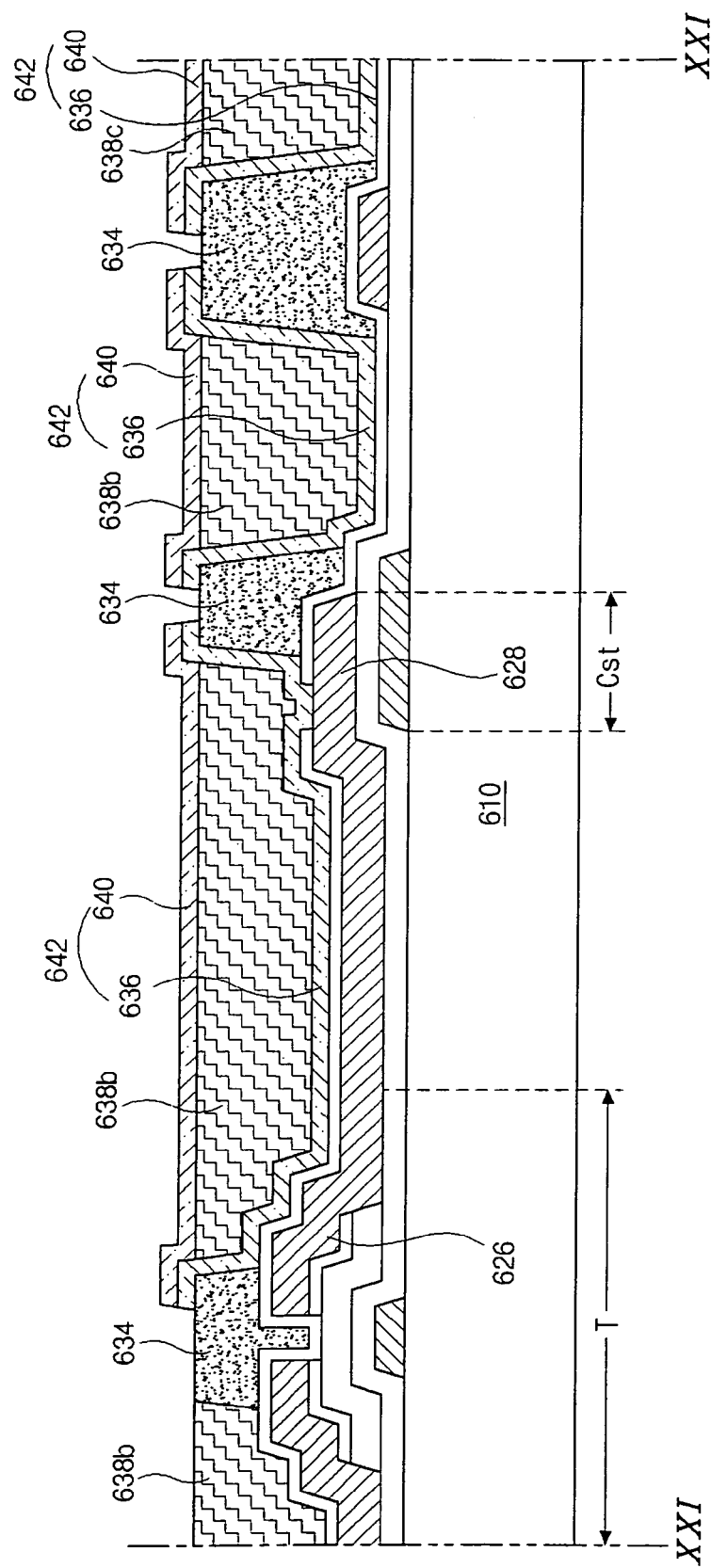

FIGS. 20C and 21C show a color filter layer 638 that includes red, green and blue color filters 638a-638c formed over the first electrodes 636. Each of the color filters 638a-638c corresponds to each pixel region P defined by gate and data lines 616 and 624, but each does not cover the channel ch of the thin film transistor T. Additionally, each of the color filters 638a-638c has a smaller width than each pixel electrode 636 such that peripheral portions of the first pixel electrode 636 are exposed.

Figure 20D:
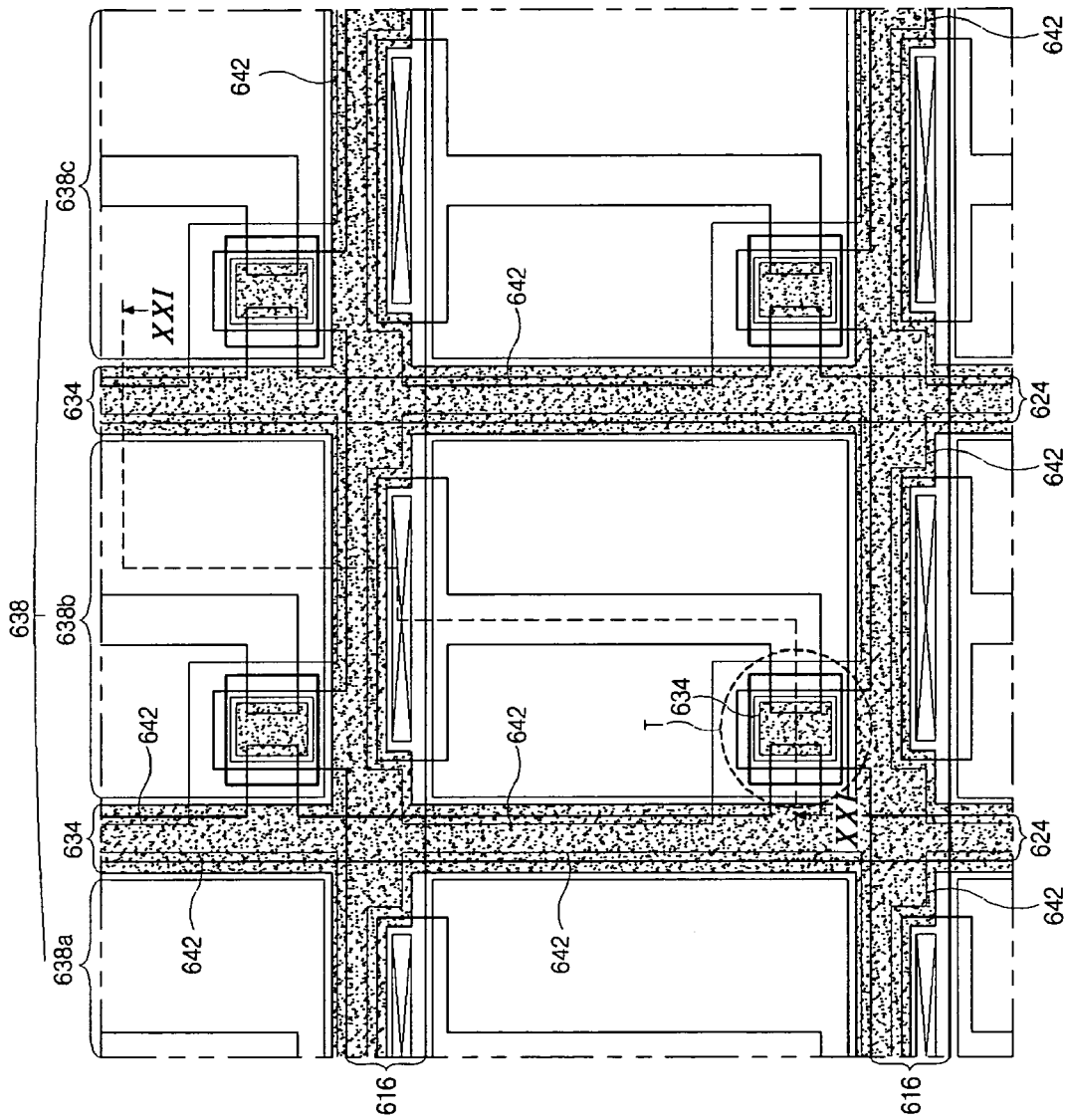

FIGS. 20D and 21D show a second transparent conductive material that is deposited over the entire of the substrate 610 to cover the color filters 638a-638c, and then the material is patterned to form a second pixel electrode 640 in each pixel region P. The second pixel electrode 640 contacts with each of the color filters 638a-638c in the pixel region P, and the second pixel electrode also contacts the first pixel electrode 636 at the peripheries. The first and second pixel electrode 636 and 640 constitute the double-layered pixel electrode 642, that is often referred to as a sandwich pixel electrode, because the color filter 638 is interposed between the first and second pixel electrodes 636 and 640. Since the first pixel electrode 636 contacts the capacitor electrode 628 that is connected to the drain electrode 626, the double-layered pixel electrode 642 can have electrical communication with the thin film transistor T.

Accordingly in the invention, it is possible to minimize process defects when forming the contact hole through the color filter layer, because each of the color filters can be formed by each pixel region P. The process stability is therefore improved during the fabricating process of the array substrate having the COT structure. Further, since the drain electrode can be formed as one unified body with the capacitor electrode, the process of forming the drain contact hole can be omitted. Additionally, the process time decreases.

Therefore, the invention simplifies the fabrication process and reduces the production cost. Furthermore, since the black matrix is formed in the array substrate, it is not required to consider an aligning margin when designing and aligning the lower and upper substrates, thereby increasing an aperture ratio.

It will be apparent to those skilled in the art that various modifications and variations can be made in the method for fabricating the array substrate having a color filter on a thin film transistor structure for the liquid crystal display device of the present invention without departing from the spirit or scope of the inventions. Thus, it is intended that the present invention covers the modifications and variations of this invention provided they come within the scope of the appended claims and their equivalents.

What is claimed is:

1. An array substrate device comprising:
    a substrate;
    a gate line disposed in a first direction over the substrate;
    a data line disposed over the substrate in a second direction, the data line perpendicularly crossing the gate line to define a pixel region;
    a thin film transistor near a crossing of the gate and data lines, the thin film transistor including a gate electrode, a semiconductor layer, a source electrode and a drain electrode;
    a capacitor electrode overlapping the gate line;
    a color filter having an island shaped pattern corresponding to the pixel region, the color filter exposing portions of the drain electrode and the capacitor electrode;
    a pixel electrode disposed over the color filter, corresponding to the pixel region and contacting the portions of the drain electrode and the capacitor electrode;
    a second insulating layer underneath the color filter, the second insulating layer covering the source and drain electrodes and the capacitor electrode, wherein the second insulating layer has a first drain contact hole exposing the portion of the drain electrode and a first capacitor contact hole exposing the portion of the capacitor electrode:
    a black matrix over the second insulating layer, the black matrix corresponding in position to the thin film transistor and the gate and data line except a portion of the gate line overlapped by the capacitor electrode; and
    a third insulating layer covering the black matrix and the color filter,
    wherein the third insulating layer has a second drain contact hole corresponding to the first drain contact hole and a second capacitor contact hole corresponding to the first capacitor contact hole, and
    wherein the pixel electrode is on the third insulating layer and in contact with the drain electrode through the first and second drain contact holes and with the capacitor electrode through the first and second capacitor contact holes.

2. The device according to claim 1, further comprising a first insulating layer over the substrate, the first insulating layer being interposed between the gate electrode and the semiconductor layer and between the gate line and the capacitor electrode, wherein the capacitor electrode, the gate line and the first insulating layer comprise a storage capacitor.

3. The device according to claim 1, further comprising a second insulating layer underneath the color filter, the second insulating layer covering the source and drain electrodes and the capacitor electrode, wherein the second insulating layer has a drain contact hole exposing the portion of the drain electrode and a capacitor contact hole exposing the portion of the capacitor electrode.

4. The device according to claim 3, wherein the pixel electrode contacts the drain electrode and the capacitor electrode, respectively, through the drain contact hole and through the capacitor contact hole.

5. The device according to claim 1, wherein the color filter does not overlap the thin film transistor, but the color filter overlaps edge portions of the gate and data lines, and the pixel electrode overlaps edge portions of the gate and data lines.

6. A method of forming an array substrate for a liquid crystal display device, comprising:

providing a substrate;

forming a gate line and a gate electrode over the substrate;

forming a semiconductor layer over the gate electrode;

forming a data line, a source electrode, a drain electrode and a capacitor electrode over the substrate, the data line perpendicularly crossing the gate line to define a pixel region, the source and drain electrodes overlapping portions of the semiconductor layer, the capacitor electrode overlapping the gate line, thereby forming a thin film transistor near a crossing of the gate and data lines, wherein the thin film transistor includes the gate electrode, the semiconductor layer, the source electrode and the drain electrode;

forming a color filter into an island pattern shape to correspond to the pixel region, the color filter exposing portions of the drain electrode and the capacitor electrode;

forming a pixel electrode over the color filter to correspond to the pixel region, the pixel electrode contacting the portions of both the drain electrode and the capacitor electrode;

forming a first insulating layer over the substrate to cover the gate line and the gate electrode, the first insulating layer being interposed between the gate electrode and the semiconductor layer and between the gate line and the capacitor electrode, wherein the capacitor electrode, the gate line and the first insulating layer comprise a storage capacitor;

forming a second insulating layer over the first insulating layer to cover the data line, the source and drain electrodes and the capacitor electrode;

patterning the second insulating layer to form a first drain contact hole exposing the portion of the drain electrode and a first capacitor contact hole exposing the portion of the capacitor electrode;

forming a black matrix over the second insulating layer, the black matrix corresponding in position to the thin film transistor and the gate and data line except a portion of the gate line overlapped by the capacitor electrode;

forming a third insulating layer covering the black matrix and the color filter; and patterning the third insulating to have a second drain contact hole corresponding to the first drain contact hole and a second capacitor contact hole corresponding to the first capacitor contact hole, wherein the pixel electrode is on the third insulating layer and in contact with the drain electrode through the first and second drain contact holes and with the capacitor electrode through the first and second capacitor contact holes.

7. The method according to claim 6, further comprising forming a first insulating layer over the substrate to cover the gate line and the gate electrode, the first insulating layer being interposed between the gate electrode and the semiconductor layer and between the gate line and the capacitor electrode, wherein the capacitor electrode, the gate line and the first insulating layer comprise a storage capacitor.

8. The method according to claim 7, further comprising;

forming a second insulating layer to cover the data line, the source and drain electrodes and the capacitor electrode; and patterning the second insulating layer to form a drain contact hole exposing the portion of the drain electrode and a capacitor contact hole exposing the portion of the capacitor electrode.

wherein the pixel electrode contacts the drain electrode and the capacitor electrode, respectively, through the drain contact hole and through the capacitor contact hole.

9. The method according to claim 6, wherein the color filter does not overlap the thin film transistor, and the color filter overlaps edge portions of the gate and data lines, and the pixel electrode overlaps edge portions of the gate and data lines.

* * * * *